(12) United States Patent
Mizuta

(10) Patent No.: US 10,187,345 B2
(45) Date of Patent: Jan. 22, 2019

(54) ELECTRONIC MAIL COMMUNICATION SYSTEM

(71) Applicant: PLATFIELD INC., Takarazuka-shi, Hyogo (JP)

(72) Inventor: Takeshi Mizuta, Takarazuka (JP)

(73) Assignee: PLATFIELD INC., Takarazuka-shi, Hyogo (JP)

( * ) Notice: Subject to any disclaimer, the term of this patent is extended or adjusted under 35 U.S.C. 154(b) by 950 days.

(21) Appl. No.: 14/264,447

(22) Filed: Apr. 29, 2014

(65) Prior Publication Data

US 2014/0337444 A1    Nov. 13, 2014

(30) Foreign Application Priority Data

May 8, 2013   (JP) ................................. 2013-098224
Nov. 15, 2013  (JP) ................................. 2013-236940

(51) Int. Cl.
*H04L 12/58* (2006.01)

(52) U.S. Cl.
CPC .............. *H04L 51/28* (2013.01); *H04L 51/14* (2013.01); *H04L 51/16* (2013.01)

(58) Field of Classification Search
CPC .......... H04L 51/28; H04L 51/16; H04L 51/14
See application file for complete search history.

(56) References Cited

U.S. PATENT DOCUMENTS

| | | | | |
|---|---|---|---|---|
| 2004/0107262 A1* | 6/2004 | Suzuki | ................ | G06Q 10/107 709/207 |
| 2007/0067400 A1* | 3/2007 | Kawakami | ........... | G06Q 10/107 709/206 |
| 2014/0047043 A1* | 2/2014 | Esfahani | .............. | G06Q 10/107 709/206 |

FOREIGN PATENT DOCUMENTS

JP    2002-123470 A    4/2002

OTHER PUBLICATIONS

Notification of Reason(s) for Refusal dated May 16, 2017 in counterpart Japanese patent application No. 2013-236940 (w/ English machine translations; 10 pages).

Office Action dated Dec. 4, 2017 in counterpart Chinese patent application No. 201410191942.2 (w/ English partial translation and machine translation; 18 pages).

* cited by examiner

*Primary Examiner* — Abdulkader M Alriyashi

(74) *Attorney, Agent, or Firm* — Westerman, Hattori, Daniels & Adrian, LLP

(57) ABSTRACT

An electronic mail communication system for transmitting and receiving electronic mail to and from a target who does not have a membership registration without disclosure of a personal electronic mail address and also easy in controlling acceptance or rejection of mail. Where the received electronic mail is determined to be target addressed mail, a target actual address is written as a field value of a destination header without changing the text, so as to generate target addressed transfer mail in which a connection address is written as a field value of the source header. Where the received electronic mail is determined to be the user addressed mail, user addressed transfer mail is generated in which the user actual address is written as a field value of the destination header without changing the text.

12 Claims, 31 Drawing Sheets

Fig. 11A

26: Account master table

| unID account | Password | Name/nickname | Default actual address | Reply destination address setting | Extension period setting value |
|---|---|---|---|---|---|
| | 26a | 26b | 26c | 26d | 26e | 26f |
| mizuta | abc123 | Mizuta | t-mizuta@platfield.com | Source | 30 days |
| yamada | yy12y | Yamada | yamada@mac.com | Default | 30 days |
| ueda | poiuy65 | Ueda Jiro | ueda@gmail.com | Source | 2 weeks |
| plat | rtyu890 | administrator | admin@platfield.com | Default | 365 days |

Fig. 11B

27: Connection table

| Record serial | Connection ID | unID account | Destination actual address | Source actual address | Replay destination address setting | Expiration date | Extension period setting value | Automatic update | Connection name | Nullification |
|---|---|---|---|---|---|---|---|---|---|---|
| 27a | 27b | 27c | 27d | | 27e | 27f | 27g | 27h | 27i | 27j | 27k |
| 12 | a0005 | mizuta | info@e-mate.net | mizuta@docomo.ne.jp | Source | 2013/04/21 | 4 weeks | 1 | e-mate query | 0 |
| 13 | a0006 | mizuta | dummy@gmail.com | manbow@softbank.ne.jp | Default | 2014/01/01 | 365 days | 0 | Generation of account of G company | 1 |

Fig. 15

(transmission)

97 →
```
to: <connection ID>@unid.us
cc: "replyAll"
from: <source actual address>
x-unidto: <reply source actual address>
x-unidcc: <broadcast destination actual
address>
title: <subject>
body: <text>
```

↓

Header decode processing

↓

98 →
```
from: <connection ID>@unid.us
to: <reply source actual address>
cc: <broadcast destination actual address>
title: <subject>
body: <text>
```

Fig. 16

37: Local connection table

| Record serial | Connection ID | Destination actual address | Source actual address | Reply destination address setting | Expiration date | Extension period setting value | Automatic update | Connection name | Nullification |
|---|---|---|---|---|---|---|---|---|---|
| 12 | a0005 | info@e-mate.net | mizuta@docomo.ne.jp | Source | 2013/04/21 | 4 weeks | 1 | e-mate query | 0 |
| 13 | a0006 | dummy@gmail.com | manbow@softbank.ne.jp | Default | 2014/01/01 | 365 days | 0 | Generation of account of G company | 1 |

28: References table

| message-ID: | References: |
|---|---|
| A | <null> |
| 1 | XA |
| B | A, 1 |
| 2 | XA, 1, XB |
| C | A, 1, B, 2 |
| 3 | XA, 1, XB, 2, XC |

ELECTRONIC MAIL COMMUNICATION SYSTEM

CROSS REFERENCE OF RELATED APPLICATIONS

Each of the disclosures of Japanese Patent Applications No. 2013-098224 (filed May 8, 2013) and No. 2013-236940 (filed Nov. 15, 2013) including the specification, claims, drawings and abstract is incorporated herein by reference in its entirety.

BACKGROUND OF THE INVENTION

1. Technical Field

The present disclosure relates to an electronic mail communication system and, in particular, to a technology which enables electronic mail communications without disclosing a personal electronic mail address.

2. Background Art

In order to make available a service offered via the Internet such as Internet shopping, there is often found such a case that registration of a personal electronic mail address (may be, hereinafter, simply referred to as "mail address") is required at a site which offers the service.

However, once the mail address has been registered, there is found such a case that unwanted advertisement mail is thereafter transmitted to this mail address. Further, there is a possibility that personal behavior on the Internet may be tracked and analyzed based on the mail address and information thereof may be provided to third parties. In this case, unsolicited bulk electronic mail such as advertisement mail is transmitted more frequently.

In order to avoid the above described situation, it may be possible to change the mail address. However, a mail address is often used for other purposes. Thus, in most cases, it is actually impossible to change a mail address.

Therefore, such a system has been proposed that on registration of membership, a client-specific special mail address is allocated to a client. Thereafter, where the client exchanges information with other clients via electronic mail or tries to find a target for exchanging information, a personal carrier mail address is automatically converted to the client-specific special mail address and mail is then transmitted to a designated recipient or the special mail address is made public on a website or others (refer to FIG. 3 to FIG. 5 in Patent Document 1).

According to this system, since the carrier mail address of the client is not made public, it is possible to eliminate harassment such as tampering and annoyance and also to realize a safe and brief exchange of information with many people via electronic mail.

However, in the above described system, both a sender and a recipient are assumed to have membership registration. Thus, this system is not usable on transmission and receiving of electronic mail to and from a target who does not have a membership registration.

Further, a personal client-specific special mail address is accessible only to the client. Thus, when the client wants to block messages from an unwanted source, the client has to personally identify the source, in order to set up the message blocking. However, this process becomes burdensome and complicated when there are multiple unwanted sources, in particular, after the client's personal client-specific special mail address has been made public on a website or the like.

Patent Document 1
Japanese Unexamined Patent Application Publication No. 2002-123470

DISCLOSURE OF THE INVENTION

The present disclosure is to provide an electronic mail communication technology, which solves the above described problems associated with conventional electronic mail technologies, enables the transmission and receiving of electronic mail to and from a target who does not have a membership registration, without requiring disclosure of the client's personal electronic mail address, and which is also easy in controlling the receipt or blocking of electronic mail.

The electronic mail communication system of the present disclosure is provided with a plurality of mail transmitting/receiving devices and a mail service device that is configured to communicate with the plurality of mail transmitting/receiving devices via an information communication means. Each mail transmitting/receiving device has a mail processing portion with functions to transmit and receive electronic mail.

The mail server device is provided with a database that stores a target actual address, which is an electronic mail address of a target to which electronic mail is transmitted, and a user actual address, which is an electronic mail address of a registered user for receiving the electronic mail replied by the target in association with a connection identification indicator corresponding to a connection address which is a temporary electronic mail address of the registered user and an electronic mail address under control of the mail server device.

The mail server device is also provided with a transfer processing portion which executes transfer and processing of the electronic mail based on data stored in the database. The transfer processing portion is provided with a mail receiving means which receives electronic mail from the mail transmitting/receiving device via the information communication means. The transfer processing portion is also provided with a mail determination means which determines whether or not the electronic mail received by the mail receiving means is a target addressed mail that is to be transmitted from a registered user to a target, or user addressed mail that is to be transmitted to the registered user from the target, based on header information of the electronic mail.

The transfer processing portion is also provided with a decode means which generates a target addressed forwarding mail, which is electronic mail in which a field value in a destination header indicating a destination of the target addressed mail identifies a target actual address, and a field value in a source header indicating a source identifies a connection address corresponding to a connection identification indicator by which the mail determination means determines that the electronic mail is the target addressed mail.

The transfer processing portion is also provided with an encode means, which generates user addressed forwarding mail. A field value in a destination header of the user addressed mail identifies a user actual address, when the mail determination means determines that the electronic mail is a user addressed mail, that is, user addressed forwarding mail which is given as target addressed mail if replied after a text of the user addressed forwarding mail is rewritten by the mail transmitting/receiving device which has received the user addressed forwarding mail.

The transfer processing portion is also provided with a mail transmitting means, which transmits electronic mail generated by the decode means or the encode means via the information communication means in accordance with the header information of the electronic mail.

Features of the present disclosure can be broadly described above. Arrangements and content thereof, together with an object and features, will be further clarified by the following disclosure, with drawings taken into account.

BRIEF DESCRIPTION OF THE DRAWINGS

FIG. 11A is a drawing which shows one example of a data arrangement of an account master table 26. FIG. 11B is a drawing which shows one example of a data arrangement of a connection table 27.

FIG. 15 is a drawing which describes processing content of the header decode processing in FIG. 8 on retransmission (reply from a registered user to a target).

FIG. 16 is a drawing which shows one example of a data arrangement of a local connection table 37.

FIG. 26 is a drawing which shows one example of a data arrangement of a References table 28 used in reply original mail identification history header adjustment processing.

BEST MODE FOR CARRYING OUT THE INVENTION

Figure 1:
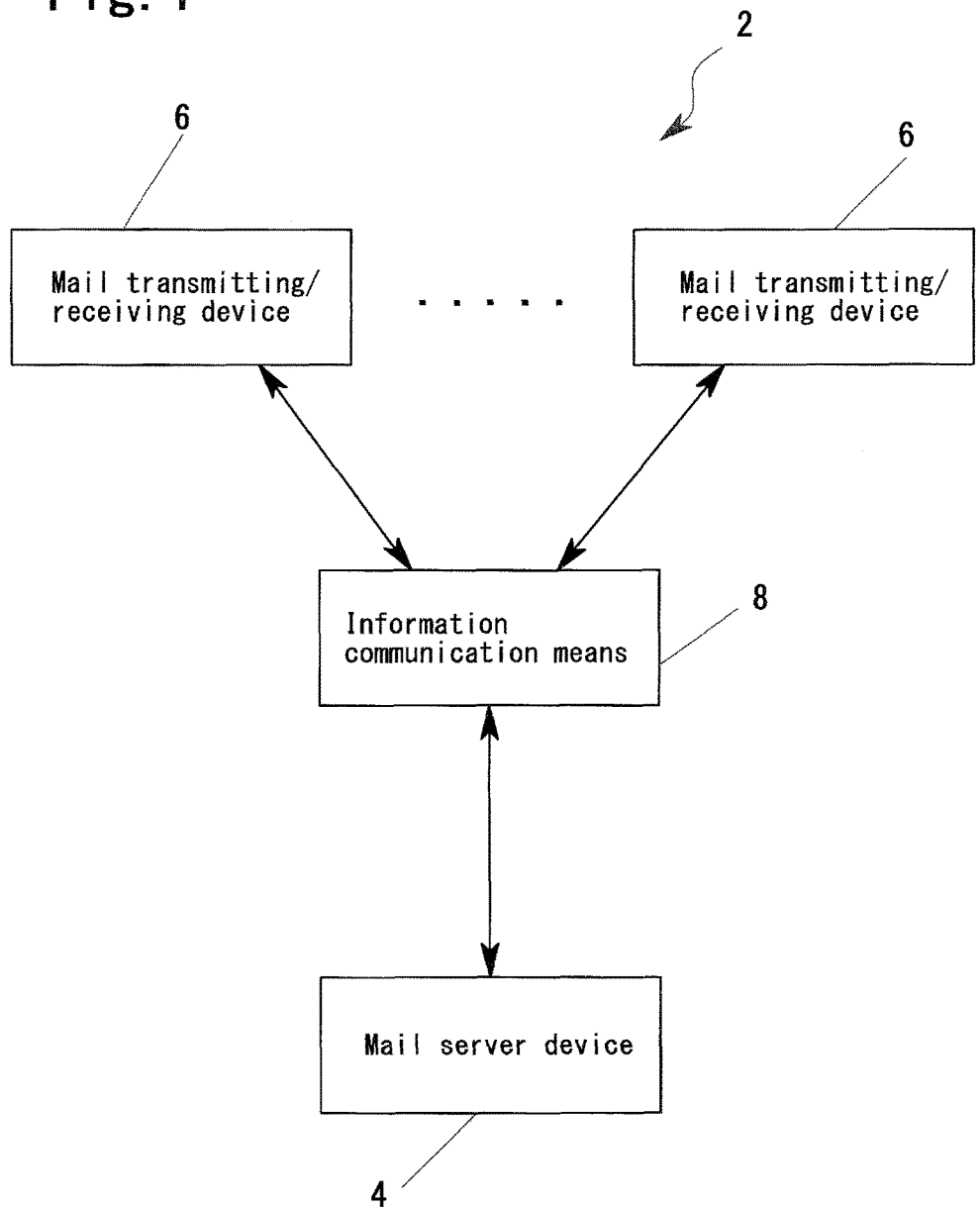
FIG. 1 is a block diagram which shows an arrangement of an electronic mail communication system 2 according to one embodiment of the present disclosure.

FIG. 1 is a block diagram which shows an arrangement of the electronic mail communication system according to one embodiment of the present disclosure.

The electronic mail communication system 2 is provided with the mail server device 4 and the plurality of mail transmitting/receiving devices 6, 6, . . . . The mail server device 4 is configured to communicate with each of the mail transmitting/receiving devices 6 via the information communication means 8. Each of the mail transmitting/receiving devices 6 is configured to transmit and receive electronic mail.

In addition, in this embodiment, the registered user and the target may use mail transmitting/receiving devices that are similar in configuration, or the registered user and the target may use mail transmitting/receiving devices that are different in configuration. The registered user and the target may also use mail transmitting/receiving devices that are different in configuration at one time, and use mail transmitting/receiving devices that are similar in configuration at another time.

Therefore, for convenience, the mail transmitting/receiving devices of the registered user and the target are not distinguished in the present disclosure, but rather, they are all expressed as the mail transmitting/receiving device 6. Whenever necessary, they are expressed as the mail transmitting/receiving device 6 of the registered user and the mail transmitting/receiving device 6 of the target.

Figure 2:
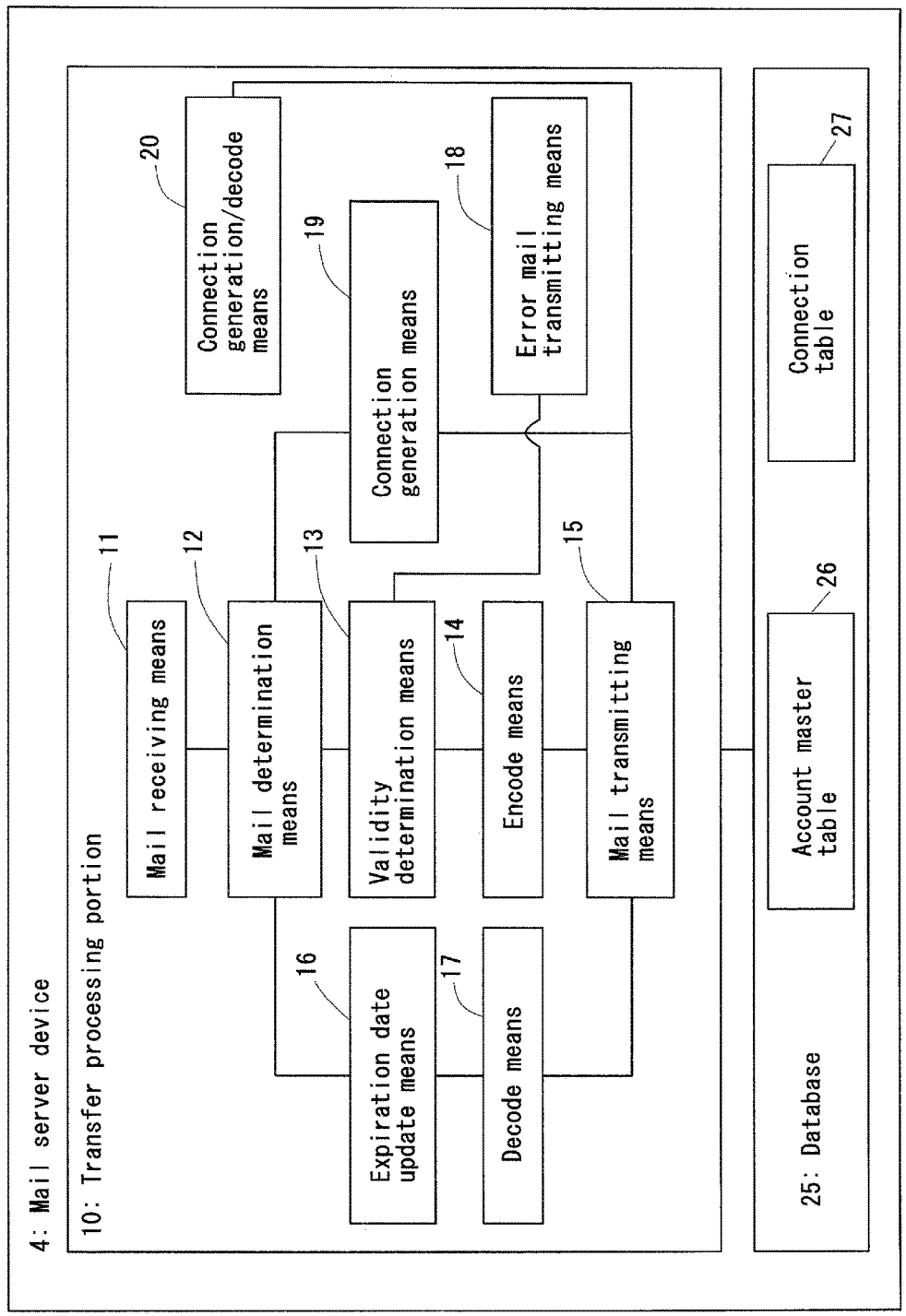
FIG. 2 is a block diagram which illustrates an arrangement of a mail server device 4.

FIG. 2 is a block diagram which illustrates an arrangement of the mail server device 4.

As shown in FIG. 2, the mail server device 4 is provided with a database 25 and a transfer processing portion 10.

The database 25 stores a target actual address, which is an electronic mail address of a target to which electronic mail is transmitted. The database 25 also stores a user actual address, which is an electronic mail address of a registered user of this system 2 for receiving an electronic mail from the target (for example, in reply to the electronic mail transmitted to the target from the registered user) in association with a connection identification indicator (hereinafter referred to as "connection ID") corresponding to a connection address. The connection address is a temporary electronic mail address of the registered user and an electronic mail address under control of the mail server device 4.

Further, the database 25 stores a connection ID expiration date, which is set for each connection ID, and also stores information on whether or not the expiration date of a connection ID is to be automatically updated.

In the above described example, the database 25 is provided with an account master table 26 and a connection table 27.

The transfer processing portion 10 is configured to execute transfer processing of electronic mail based on data stored in the database 25. The transfer processing portion is provided with mail receiving means 11, mail determination means 12, validity determination means 13, encode means 14, mail transmitting means 15, expiration date update means 16, decode means 17, error mail transmitting means 18, connection generation means 19, and connection generation/decode means 20.

The mail receiving means 11 receives electronic mail from the mail transmitting/receiving device 6 via the information communication means 8.

The mail determination means 12 determines whether or not electronic mail received by the mail receiving means 11 is target addressed mail or user addressed mail, based on header information of the electronic mail. Target addressed mail is to be transmitted to a target from a registered user. User addressed mail is to be transmitted from the target to the registered user.

In this case, the header information of the electronic mail includes a header name (i.e., a field name) that makes up the header of an electronic mail, and/or a field value.

There are no particular restrictions on how the determination of target addressed mail or user addressed mail is made based on header information. The determination, for example, may be made based on the presence or absence of a dedicated header for determining whether the mail is target addressed mail or user addressed mail. The determination may also be made based on a field value of the dedicated header.

In this embodiment, a dedicated header (for example, an "x-unidto:" header shown in FIG. 13) having a target actual address as a field value is newly set as the dedicated header, and whether an electronic mail received by the mail receiving means 11 is a target addressed mail or a user addressed mail is determined based on the presence or absence of this dedicated header.

That is, whether the electronic mail received by the mail receiving means 11 is a target addressed mail or user addressed mail is determined based on whether or not the received electronic mail has the "x-unidto:" header. When the electronic mail has the header, the electronic mail is determined to be target addressed mail. When the electronic mail does not have the header, the electronic mail is determined not to be target addressed mail. In particular, as will be described later, in embodiments where the mail determination means 12 is configured to determine in advance whether the received electronic mail is a connection issuance requesting mail, that is, whether the received electronic mail is the target addressed mail or the user addressed mail, it is possible to make the determination of a target addressed mail or a user addressed mail based only on the presence or absence of the "x-unidto:" header.

In addition, for example, embodiments where the determination is made based on header information in a general header (commonly used header), such as a source header and a destination header, are also possible.

The determination may be made, for example, based on a field value in a source header (for example, a "from:" header shown in FIG. 13) of a received electronic mail, that is, an electronic mail address which identifies the source of the electronic mail. If the field value conforms to a user actual address stored in the database 25, the mail determination means 12 is configured to determine that the electronic mail is a target addressed mail. If the field value conforms to a target actual address, then the mail determination means 12 is configured to determine that the electronic mail is a user addressed mail.

However, when determination is made based on the field value of the source header, and if the source is an electronic mail address other than a user actual address or a target actual address stored in the database 25, it is impossible to determine whether the electronic mail is a target addressed mail or a user addressed mail.

Therefore, for example, when a target has received electronic mail from a registered user through an electronic mail communication system 2 according to the present disclosure, and then replies from a different electronic mail address, the electronic mail is in principle not determined to be a user addressed mail. This also holds true for target addressed mails.

However, when the determination is based on the above described "x-unidto:" header, no such problem will arise. Therefore, a determination based on a dedicated header, such as the "x-unidto:" header may be preferable.

In this embodiment, the mail receiving means 11 is configured to also receive connection issuance requesting mail from a registered user. A connection issuance requesting mail is an electronic mail which identifies a target actual address and requests that the mail server device 4 issue a connection ID. And, the mail determination means 12 is configured to determine whether or not the electronic mail received by the mail receiving means 11 is a connection issuance requesting mail also based on the header information of the electronic mail.

There are no particular restrictions on how such determination is made based on the header information. In this embodiment, the mail determination means 12 is configured to make the determination based on a field value of a destination header of received electronic mail (for example, the "to:" header shown in FIG. 12), that is, an electronic mail address which identifies a destination of the electronic mail.

For example, determination is made as to whether or not a local part of an electronic mail address constituting the field value corresponds to a user identification indicator stored in the database 25. The user identification indicator is a unique identification indicator given for each registered user to identify the registered user. If the local part corresponds to a user identification indicator stored in the database 25, the electronic mail is determined to be a connection issuance requesting mail from the corresponding registered user.

If the received electronic mail does not have the above described "x-unidto:" header, and the local part of the electronic mail address indicated by the destination header does not correspond to a user identification indicator stored in the database 25, then the electronic mail is determined to be a user addressed mail.

Next, when the mail determination means 12 has determined that the electronic mail is a target addressed mail, the decode means 17 writes a target actual address as a field value in the destination header, which indicates the destination, and generates a target addressed forwarding mail without changing the text or the subject of the target addressed mail. A target addressed forwarding mail is electronic mail having a written connection address corresponding to a connection ID as a field value in the source header, which indicates the source.

In addition, in this example, the text and subject of the target addressed forwarding mail are provided without changing the text or the subject of the target addressed mail. The present disclosure shall not be, however, limited thereto.

For example, it is possible to add a comment and/or a symbol to the text and/or the subject of the target addressed mail, and use the modified text and/or subject as the text and/or the subject of the target addressed forwarding mail. That is, the text of the target addressed forwarding mail may include the text of the target addressed mail in its entirety, and/or the subject of the target addressed forwarding mail may include the subject of the target addressed mail in its entirety.

Further, when the text or the subject of the target addressed mail does not meet requirements of the electronic mail communication system according to the present disclosure, for example, by exceeding a length limit etc., it is possible to partially delete and/or change the text and/or the subject of the target addressed mail, and use the modified text and/or subject as the text and/or subject of the target addressed forwarding mail. That is, the text of the target addressed forwarding mail may substantially include the text of the target addressed mail, and/or the subject of the target addressed forwarding mail may substantially include the subject of the target addressed mail.

In brief, it is possible that the text and the subject of the target addressed forwarding mail are generated without substantially changing the text and the subject of the target addressed mail.

In this embodiment, the decode means 17 is configured so that that upon generation of the target addressed forwarding mail, the "x-unidto:" header described in the target addressed mail is deleted.

When the mail determination means 12 has determined that the electronic mail is a user addressed mail, the encode means 14 generates a user addressed forwarding mail, without changing the text and the subject of the user addressed mail. A user addressed forwarding mail is electronic mail having a written user actual address as a field value in the destination header. The header information of the user addressed forwarding mail is configured so that in the mail transmitting/receiving device 6, which has received the user addressed forwarding mail, the text of the user addressed forwarding mail is rewritten and replied, thereby generating a target addressed mail (in this case, retransmission mail addressed to a target).

When electronic mail is replied by the mail transmitting/receiving device 6, which has received the user addressed forwarding mail, in order for the electronic mail to be generated as a target addressed mail, the user actual address is written as a field value in the destination header of the user addressed forwarding mail and, for example, the target actual address is written as a field value in the source header.

However, in this case, in order for the target addressed mail retransmitted to a target as a reply to the user addressed forwarding mail to be processed by the decode means 17, the electronic mail is required to pass through the mail server device 4. For this reason, for example, as the user actual address, there are required restrictions such as use of an electronic mail address under control of the mail server device 4.

In this embodiment, the encode means 14 is configured so that a connection address is written as a field value in the source header of the user addressed forwarding mail. Therefore, such restrictions as described above are not required.

In this example, the text and/or the subject of the user addressed forwarding mail may be provided without changing the text and/or the subject of the user addressed mail. The present disclosure shall not be, however, limited thereto.

For example, a comment and/or a symbol can be added to the text and/or the subject of the user addressed mail, and the modified text may be used as the text and/or the subject of the user addressed forwarding mail. That is, the text of the user addressed forwarding mail may include the text of the user addressed mail in its entirety, and/or the subject of the user addressed forwarding mail may include the subject of the user addressed mail in its entirety.

Further, where the text and/or the subject of the user addressed mail does not meet the requirements of an electronic mail communication system according to the present disclosure, for example, by exceeding a length limit etc., it is possible to partially delete and/or change the text and/or the subject of the user addressed mail, and used the modified text as the text and/or the subject of the user addressed forwarding mail. That is, the text of the user addressed forwarding mail may substantially include the text of the user addressed mail, and/or the subject of the user addressed forwarding mail may substantially include the subject of the user addressed mail.

In brief, it is acceptable for the text and/or the subject of the user addressed forwarding mail to be generated without substantially changing the text or the subject of the user addressed mail.

In this embodiment, the encode means 14 adds the "x-unidto:" header as a dedicated header when generating the user addressed forwarding mail. As the target actual address constituting a field value in the "x-unidto:" header, a field value from the source header of the user addressed mail (that is, an electronic mail address which indicates the source of the user addressed mail) may be used. The electronic mail address which indicates the source of the user addressed mail is referred to as a reply source actual address.

Therefore, in the user addressed forwarding mail, the reply source actual address, which is a target actual address, is a field value in the dedicated header.

When the mail determination means 12 determines that the electronic mail is a target addressed mail, the expiration date update means 16 determines whether or not an expiration date of a connection ID corresponding to the target addressed mail is automatically updated, based on data stored in the database 25. When the expiration date update means 16 determines to update the expiration date, the expiration date update means 16 updates the expiration date of connection ID stored in the database 25. On the other hand, when the expiration date update means 16 determines not to update the expiration date, it will not update the expiration date of connection ID stored in the database 25.

When the mail determination means 12 determines that the electronic mail is a user addressed mail, the validity determination means 13 determines, prior to processing by the encode means 14, whether or not the expiration date of a connection ID corresponding to the user addressed mail has expired, based on data stored in the database 25. When the validity determination means 13 determines that the expiration date of the connection ID has not expired, control of the user addressed mail is shifted to the encode means 14.

When the validity determination means 13 determines that the expiration date of the connection ID has expired, the error mail transmitting means 18 transmits to the source of the user addressed mail an electronic mail communicating that the user addressed mail has been erroneously transmitted.

When the mail determination means 12 determines that the electronic mail is a connection issuance requesting mail, the connection generation means 19 issues a new connection ID.

Next, the target actual address identified by the connection issuance requesting mail, and the user actual address identified by the connection issuance requesting mail, or data stored in advance in the database 25, are associated with the new connection ID and are stored in the database 25.

Further, a template mail is generated. A template mail is an electronic mail having a written user actual address as a field value in the destination header. The mail transmitting/receiving device 6 is configured to receive the template mail, and when a reply from a user is received, in which reply the user rewrites the text of the template mail, the mail transmitting/receiving device 6 is configured to convert the template mail into a target addressed mail.

In this embodiment, the connection generation means 19 is configured so that a connection address is written as a field value in the source header of the template mail.

In this embodiment, when generating the template mail, the connection generation means 19 further adds, as a dedicated header, an "x-unidto:" header in which the target actual address identified by the connection issuance requesting mail is identified as a field value. The target actual address identified by a registered user and stored in the database 25 is referred to as a destination actual address.

Therefore, the destination actual address, which is a target actual address, is a field value in the dedicated header in template mail.

When the connection generation/decode means 20 receives a signal requesting generation of a connection issuance/target addressed forwarding mail, which identifies the target actual address and data to-be-transmitted via the information communication means 8 from the mail transmitting/receiving device 6 of a registered user, the connection generation/decode means 20 issues a new connection ID.

Next, the target actual address identified by the signal requesting generation of a connection issuance/target addressed forwarding mail, and the user actual address identified by the requesting signal or by the data stored in advance in the database 25, are associated with the new connection ID and stored in the database 25.

Further, the target actual address is identified as a field value in the destination header, and a connection address corresponding to the new connection ID is identified as a field value in the source header. Next, an electronic mail in which the data to-be-transmitted is written as the text is generated.

In addition, the target actual address identified by the signal requesting generation of the connection issuance/target addressed forwarding mail is also the target actual address identified by a registered user and stored in the database 25, and is therefore a destination actual address.

The mail transmitting means 15 transmits electronic mail generated in the decode means 17, the encode means 14, the connection generation means 19 or the connection generation/decode means 20, via the information communication means 8 in accordance with the header information in the electronic mail.

Figure 3:
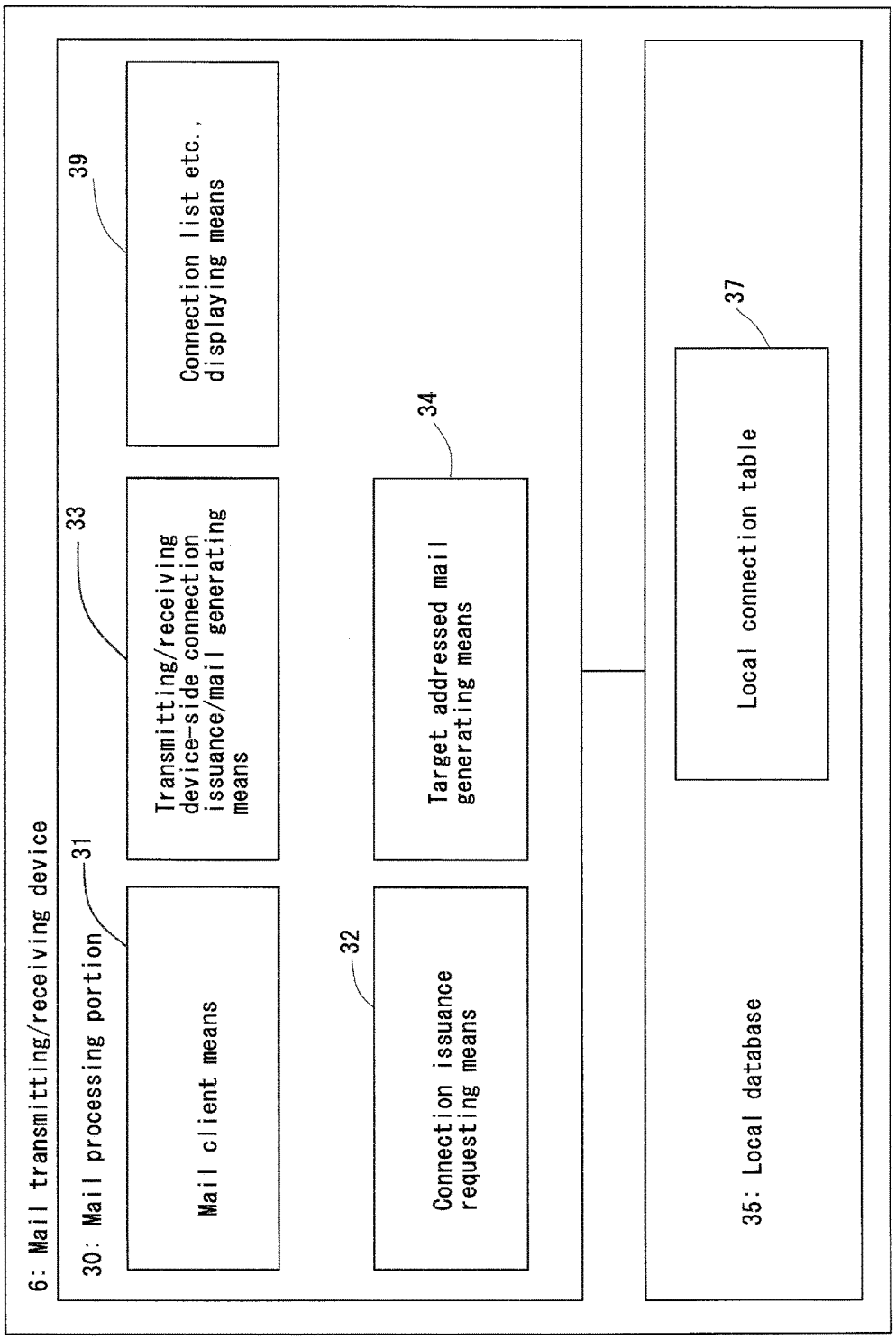
FIG. 3 is a block diagram which illustrates an arrangement of a mail transmitting/receiving device 6.

FIG. 3 is a block diagram which illustrates an arrangement of the mail transmitting/receiving device 6.

As shown in FIG. 3, the mail transmitting/receiving device 6 is provided with a mail processing portion 30 and a local database 35. The local database 35 comprises data which is the same as a part of data stored in the database 25 of the mail server device 4. Use of the local database 35 makes it possible for a part of processing at the mail processing portion 30 of the mail transmitting/receiving devices 6, to be executed without communication with the mail server device 4.

In this example, the local database 35 is provided with a local connection table 37.

No local database 35 is needed in the mail transmitting/receiving device 6 of a target. And, in the mail transmitting/receiving device 6 of a registered user, the local database 35 is not necessarily required for processing in the mail processing portion 30 etc., and may be provided as necessary.

The mail processing portion 30 is provided with mail client means 31, connection issuance requesting means 32, transmitting/receiving device-side connection issuance/mail generating means 33, target addressed mail generating means 34, and displaying means 39.

No means other than the mail client means 31 is required in the mail processing portion 30 of the mail transmitting/receiving device 6 of a target. In the mail processing portion 30 of the mail transmitting/receiving device 6 of a registered user, means other than the mail client means 31 are not required and may be provided as necessary.

Upon input of a signal identifying a target actual address to request issuance of a connection ID, the connection issuance requesting means 32 generates a connection issuance requesting mail and transmits the connection issuance requesting mail to the mail server device 4 via the information communication means 8. The signal identifying the target actual address to request issuance of the connection ID is input, for example, from an input device 66 of the mail transmitting/receiving device 6.

The connection issuance requesting mail is electronic mail which identifies a target actual address and requests the mail server device 4 to issue a new connection ID, to associate the connection ID with the target actual address and the user actual address, and to store them in the database 25. The connection issuance requesting mail also requests the mail server device 4 to generate a template mail and transmit the template mail to the user actual address.

There are no particular restrictions on the electronic mail address that may be identified as a destination of the connection issuance requesting mail. Preferably the electronic mail address is an electronic mail address under control of the mail server device 4 and is capable of identifying the registered user. In this embodiment, a local part made up of the user identification indicator and a domain name indicating the mail server device 4 are may be included in the electronic mail address being identified as a destination of the connection issuance requesting mail.

The transmitting/receiving device-side connection issuance/mail generating means 33 on the side of the mail transmitting/receiving device 6 is configured as a connection issuance/mail generating means. The connection issuance/mail generating means continuously executes, in sequential processing, issuance and registration of new connection ID, and generation and transmission of electronic mail (target addressed mail or target addressed forwarding mail) by using a connection address corresponding to the connection ID.

Next, an embodiment where the electronic mail generated in the connection issuance/mail generating means is target addressed forwarding mail will be described.

The connection issuance/mail generating means is referred to as a connection issuance/target addressed forwarding mail generating means, and the means on the side of the mail transmitting/receiving device 6 is referred to as a transmitting/receiving device-side connection issuance/target addressed forwarding mail generating means. That is, in this embodiment, the transmitting/receiving device-side connection issuance/mail generating means 33 denotes transmitting/receiving device-side connection issuance/target addressed forwarding mail generating means.

Upon input of a signal identifying a target actual address and data to-be-transmitted for requesting generation of a connection issuance/target addressed forwarding mail generation requesting signal, the transmitting/receiving device-side connection issuance/mail generating means 33, as the transmitting/receiving device-side connection issuance/target addressed forwarding mail generating means, generates a connection issuance/target addressed forwarding mail generation requesting signal and transmits the signal via the information communication means 8 to the mail server device 4. The signal identifying a target actual address and data to-be-transmitted for requesting generation of the connection issuance/target addressed forwarding mail generation requesting signal is input, for example, from the input device 66 of the mail transmitting/receiving device 6.

The connection issuance/target addressed forwarding mail generation requesting signal identifies the target actual address and data to-be-transmitted, thereby requesting the mail server device 4 to issue a new connection ID, to associate the connection ID with the target actual address and the user actual address, and to store them in the database 25. The signal also provides the data to-be-transmitted as a text when generating an electronic mail similar to the target addressed forwarding mail generated in the decode means 17. The signal then requests transmission of the mail to the target actual address.

In this embodiment, the connection issuance/target addressed forwarding mail generation requesting signal contains data which identifies a user actual address designated by the registered user.

Upon input of the signal identifying the connection ID and the data to-be-transmitted for requesting generation of target addressed mail, the target addressed mail generating means 34 generates target addressed mail to a target associated with the connection ID. In the target addressed mail, the data to-be-transmitted is provided as the text. The target addressed mail generating means 34 transmits the target addressed mail via the information communication means 8 to the mail server device 4. The signal requesting generation of the target addressed mail is input, for example, from the input device 66 of the mail transmitting/receiving device 6.

The mail client means 31 is configured with, for example, a general (that is, for general use) mail client program (or mail user agent (MUA)). The mail client means 31 is thus configured to execute generation, transmission, receiving, browsing, edit, reply, and the like of an electronic mail.

It is acceptable that transmission/receiving processing of electronic mail in a mail transmitting/receiving device 6 according to the present disclosure is executed by utilizing a whole or a part of functions of the mail client means 31 or by utilizing similar functions which may be provided separately.

Figure 18:
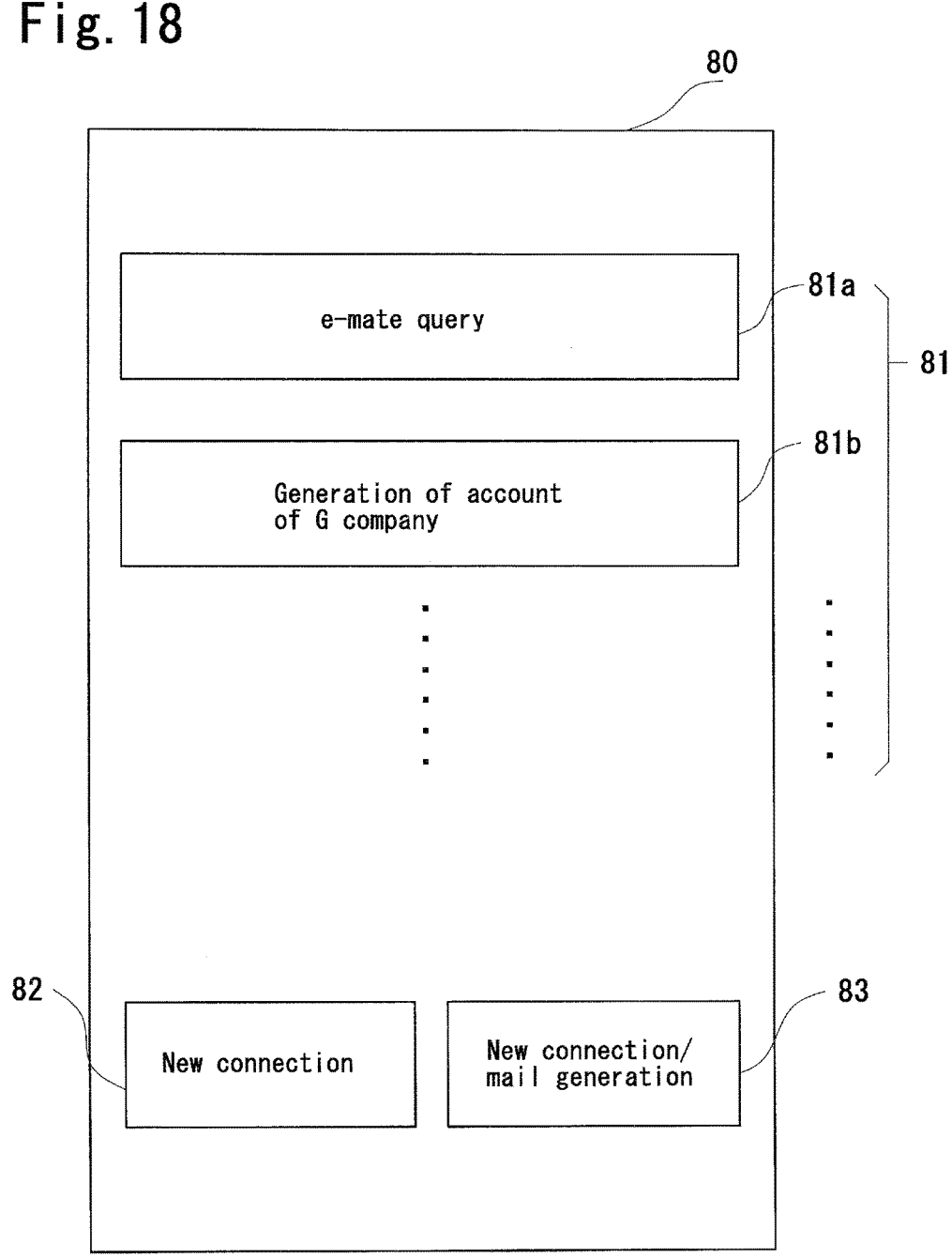
FIG. 18 is a drawing which shows a display screen 80 which is displayed on a display device 64 of the mail transmitting/receiving device 6.

The displaying means 39 displays the display screen 80 on the display device 64 of the mail transmitting/receiving device 6 of a registered user (refer to FIG. 18).

The display screen 80 displays a connection list 81 which lists and displays connection name buttons 81*a*, 81*b*, . . . which describe connection names (titles of connection identified by connection ID) indicating the connection ID associated with the registered user.

The display screen 80 also displays a new connection button 82 and a new connection/mail generating button 83.

The display screen 80 also functions as the input device 66 of the mail transmitting/receiving device 6. When the new connection button 82 is selected (for example, click and tap, the same shall be applied hereinafter), processing is started by the connection issuance requesting means 32.

When the new connection/mail generating button 83 is selected, processing is started by the transmitting/receiving device-side connection issuance/mail generating means 33.

When any one of the connection name buttons 81*a*, 81*b*, . . . is selected, processing is started by the target addressed mail generating means 34 related to the connection ID corresponding to the thus selected connection name button.

Figure 4:
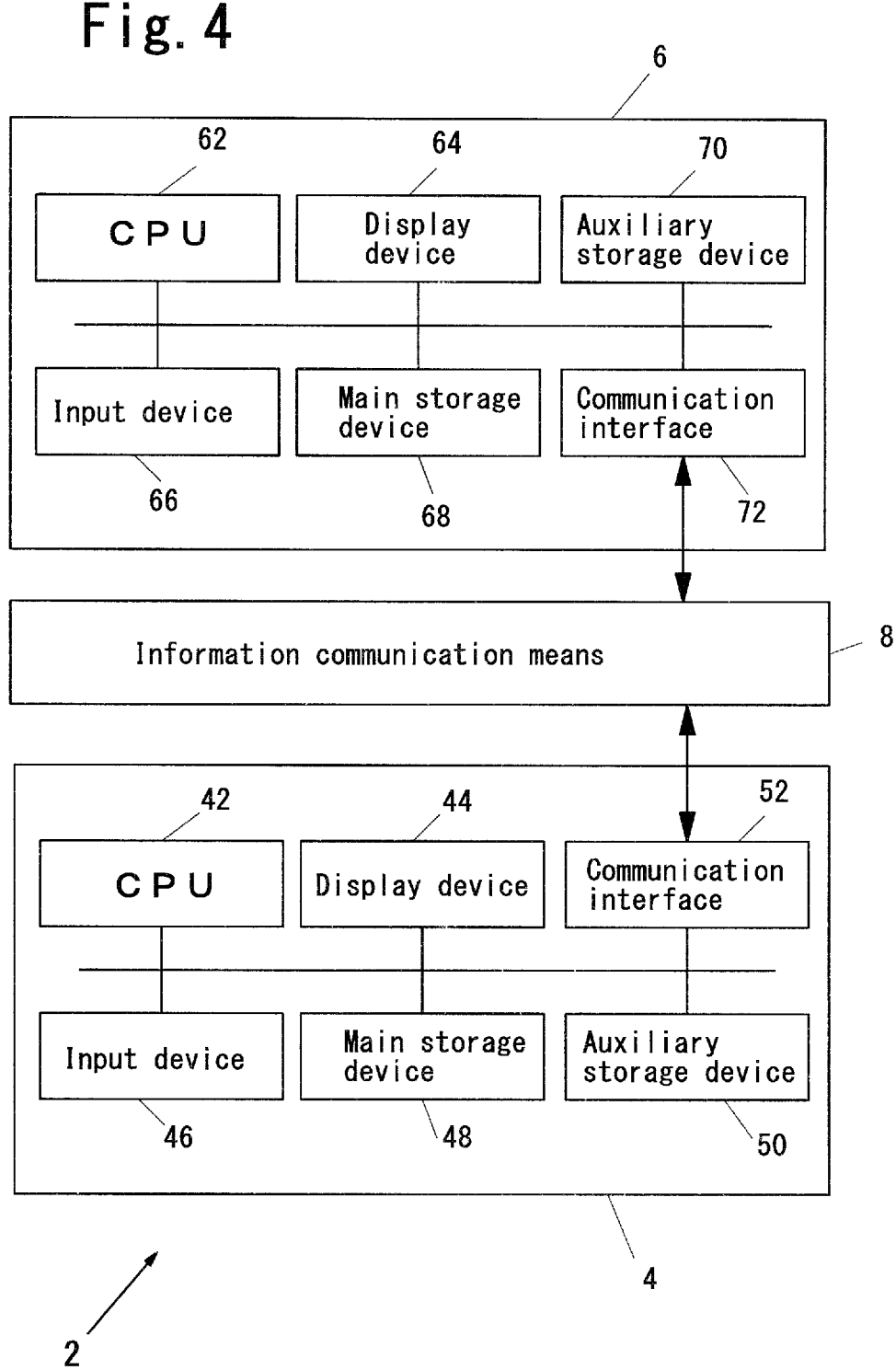
FIG. 4 is a block diagram which shows one example of a hardware arrangement covering the mail server device 4 in FIG. 2 and the mail transmitting/receiving device 6 in FIG. 3, showing a case where one computer is used in each of the mail server device 4 and the mail transmitting/receiving device 6.

FIG. 4 is a block diagram which shows one example of the mail server device 4 shown in FIG. 2 and a hardware arrangement of the mail transmitting/receiving device 6 shown in FIG. 3. This diagram shows an example where each of the mail server device 4 and the mail transmitting/receiving device 6 is a computer.

Although there are no particular restrictions, in this example, the mail server device 4 may be configured in a similar manner as a generally used server computer.

The mail server device 4 is provided with an auxiliary storage device 50. The auxiliary storage device 50 may include a HDD (hard disk drive) having a hard disk. The auxiliary storage device 50 is a record medium storing programs on the side of the mail server device 4 of the electronic mail communication system 2, and is also a storage medium of the database 25. The mail server device 4 is also provided with a main storage device 48 into which a program stored in the auxiliary storage device 50 is loaded. The mail server device 4 is also provided with a CPU 42 corresponding to the forwarding processing portion 10, which executes the program loaded into the main storage device 48. The mail server device 4 is also provided with a display device 44 such as a LCD (liquid crystal display device); an input device 46 such as a keyboard, a mouse or a track pad; and a communication interface 52 which communicates with the mail transmitting/receiving device 6 via the information communication means 8.

There are no particular restrictions on the mail transmitting/receiving device 6. The transmitting/receiving device 6 may include a personal computer, a tablet-type computer, a personal digital assistant device and a portable cellular phone, a typical example of which is a so-called smart phone.

The mail transmitting/receiving device 6 is provided with an auxiliary storage device 70 such as a SSD (solid state drive) equipped with a flash memory, which is a record medium storing programs on the side of the mail transmitting/receiving device 6 of the electronic mail communication system 2. The mail transmitting/receiving device 6 is also provided with a main storage device 68 into which a program stored in the auxiliary storage device 70 is loaded. The mail transmitting/receiving device 6 is also provided with a CPU 62 corresponding to the mail processing portion 30, which executes the program loaded into the main storage device 68. The mail transmitting/receiving device 6 is also provided with a display device 64 such as a LCD (liquid crystal display device); an input device 66 such as an input key and a touch panel; and a communication interface 72 which communicates with the mail server device 4 via the information communication means 8.

The information communication means 8 delivers information converted to an electrical signal, a light signal, and the like, irrespective of whether it is based on wire or radio communication. The information communication means 8 includes, for example, a computer network such as WAN (wide area network) represented by the Internet or LAN (local area network), a telephone line (including a portable cellular phone line), a communication line such as a dedicated line, a direct connection by communication cables and infrared light etc., or a combination of them.

Each of FIG. 5 to FIG. 10 is a flow chart which shows one example of processing procedures of the mail server device 4 of the electronic mail communication system 2 according to the present disclosure.

Figure 6:
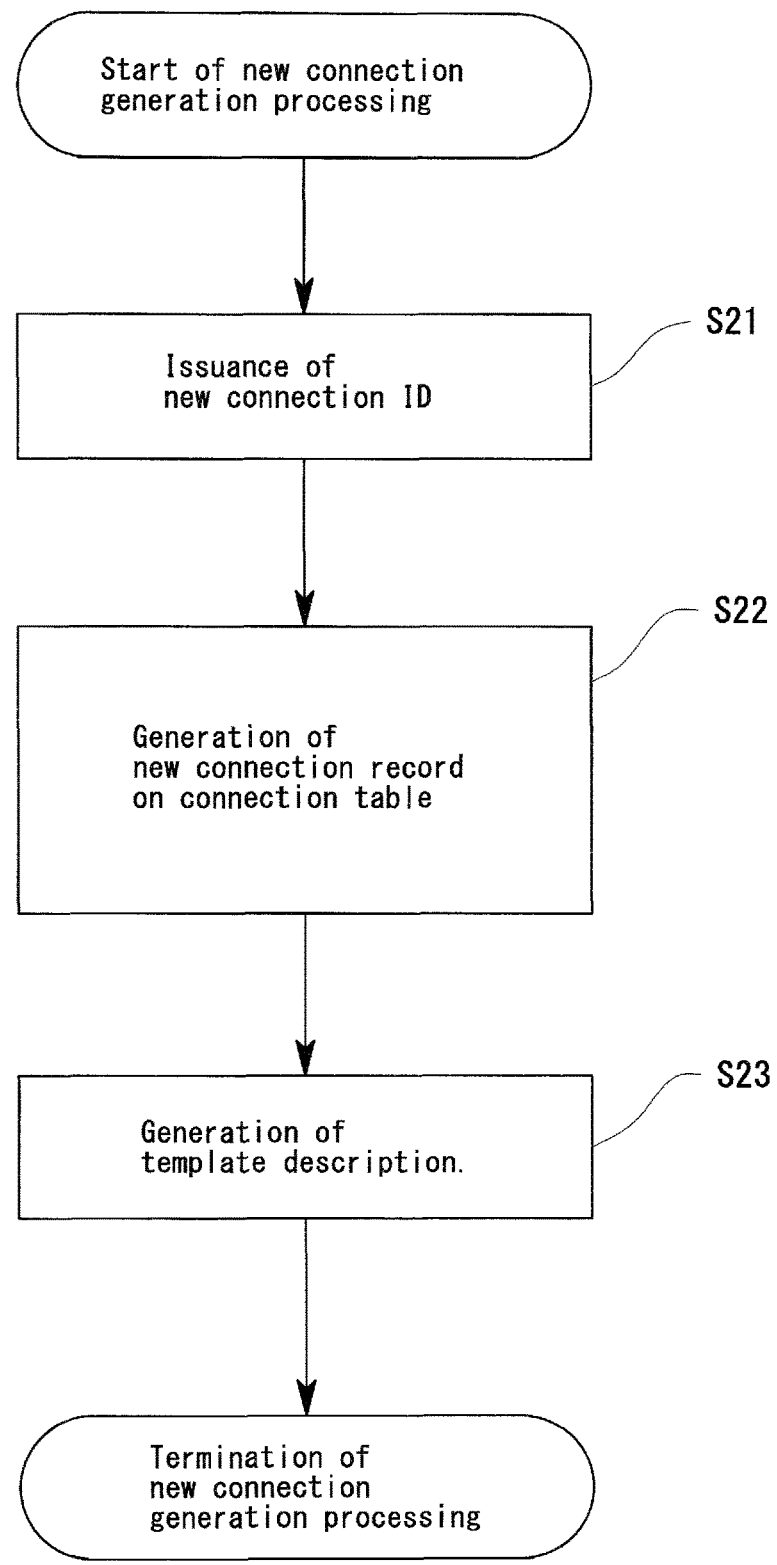
FIG. 6 is a flow chart which shows one example of detailed processing procedures in new connection generation processing shown in FIG. 5.
Figure 12:
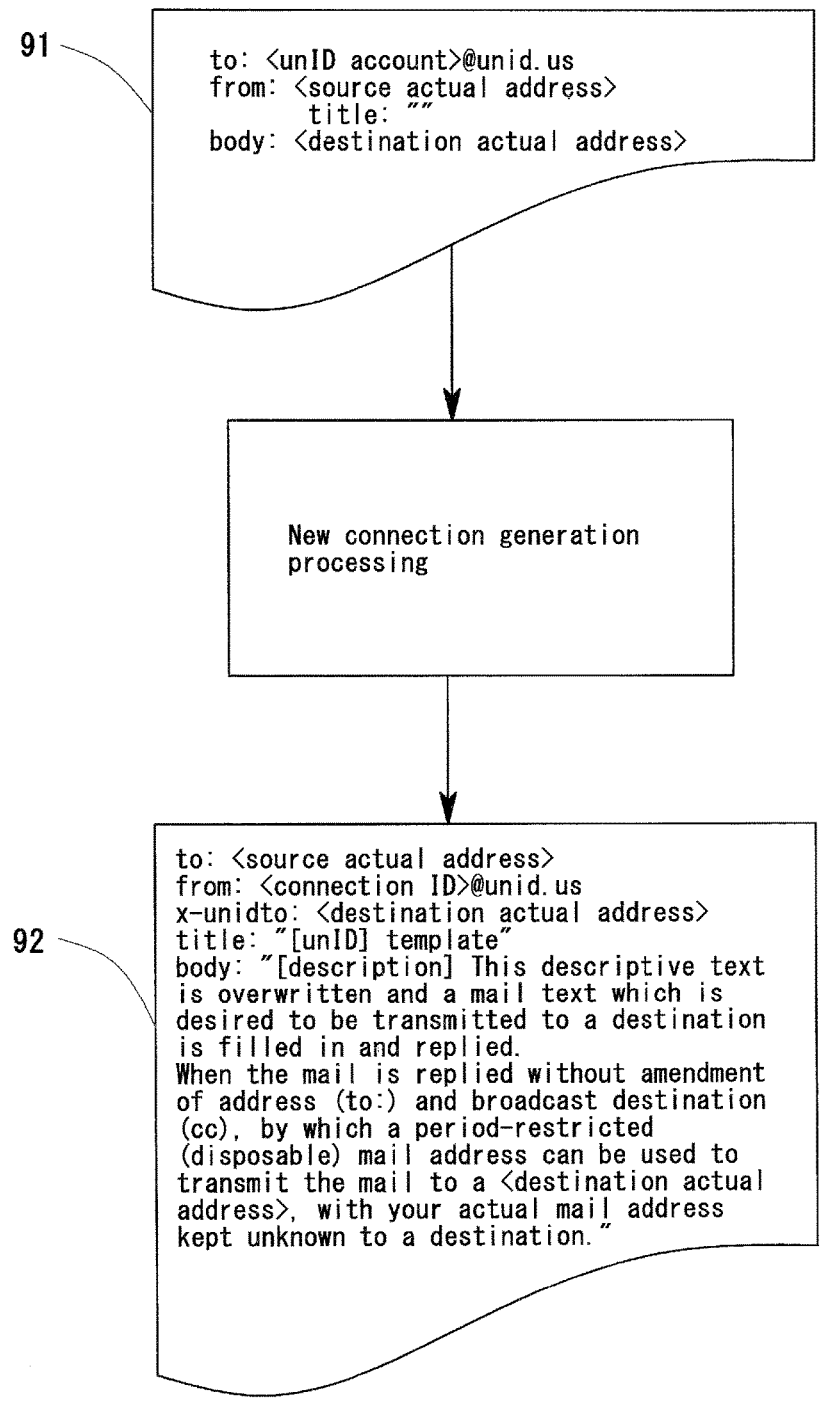
FIG. 12 is a drawing which describes processing content in the new connection generation processing shown in FIG. 6.
Figure 13:
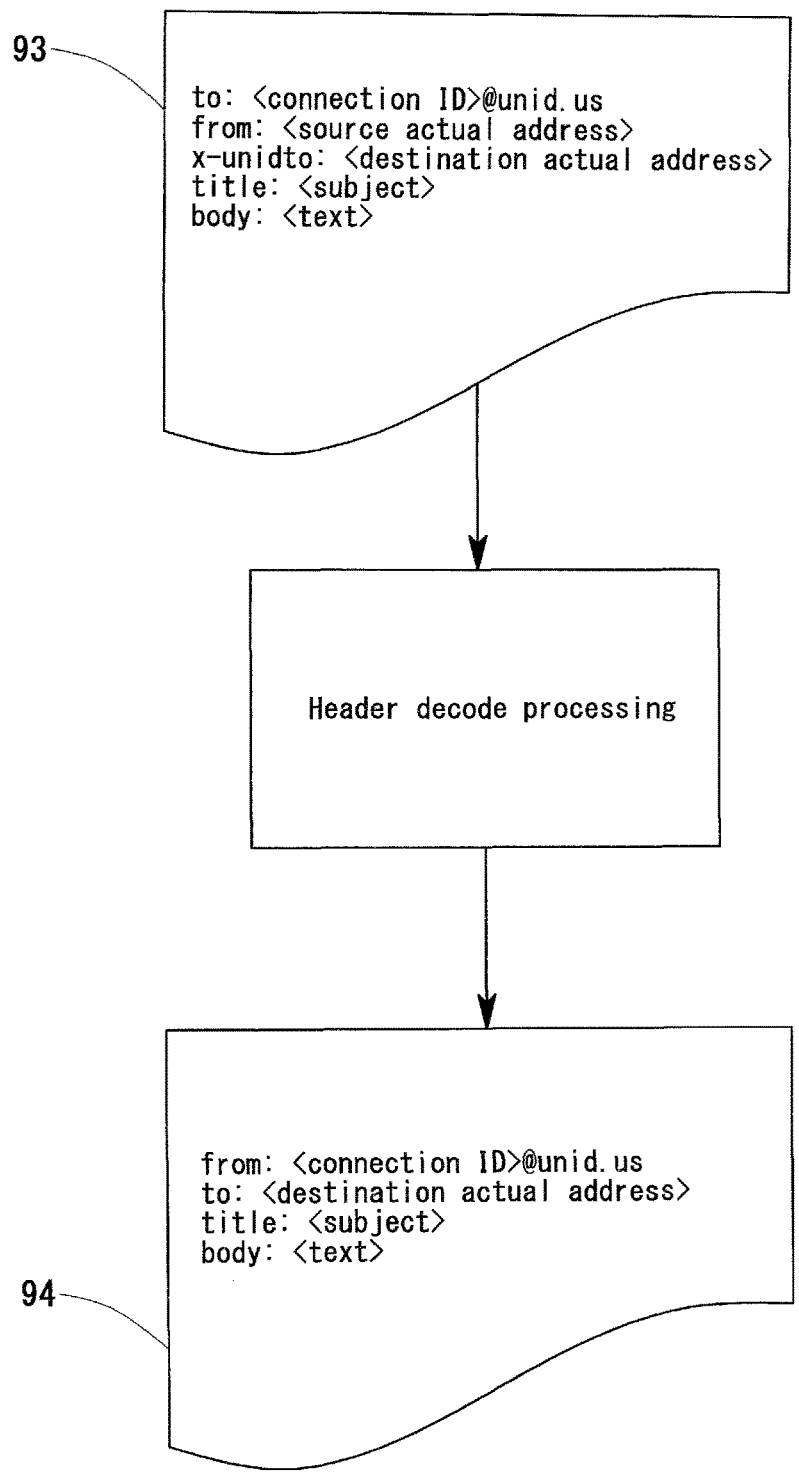
FIG. 13 is a drawing which describes processing content in the header decode processing shown in FIG. 8.
Figure 14:
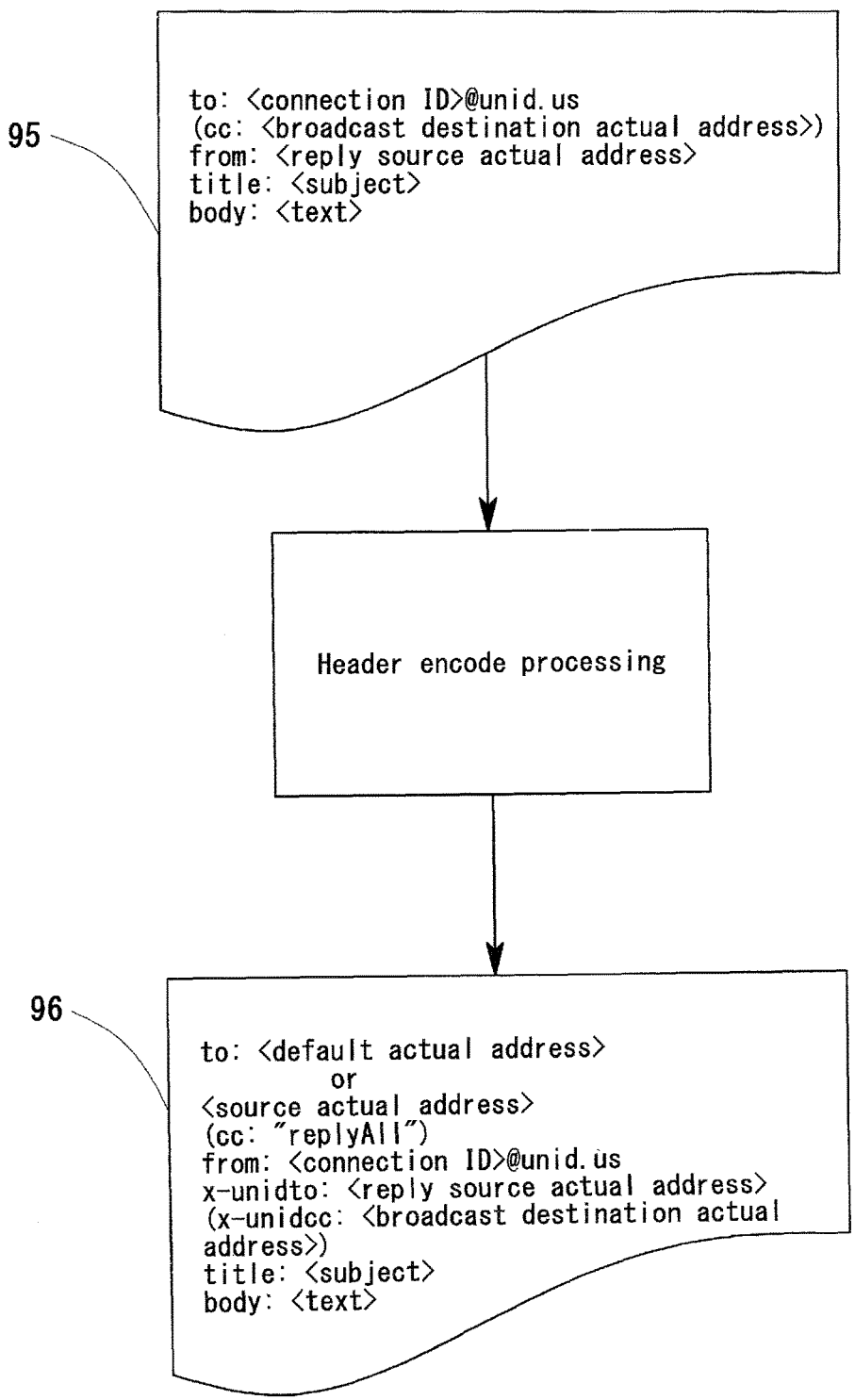
FIG. 14 is a drawing which describes processing content in the header encode processing shown in FIG. 9.

FIG. 12 is a drawing which describes processing content of the new connection generation processing shown in FIG. 6. FIG. 13 is a drawing which describes processing content of the header decode processing in FIG. 8. FIG. 14 is a drawing which describes processing content of the header encode processing shown in FIG. 9. FIG. 15 is a drawing which describes content of the header decode processing in FIG. 8 on retransmission (reply of a registered user to a target).

FIG. 11A is a drawing which shows one example of data arrangement in an account master table 26. FIG. 11B is a drawing which shows one example of data arrangement in a connection table 27.

As shown in FIG. 11A, the account master table 26 stores account information related to attributes of the registered user of the electronic mail communication system 2. Each of the records stored in the account master table 26 is referred to as an account record.

In the account master table 26, an unID account 26a denotes a user identification indicator.

In addition, in the present description, unless otherwise specified, the reference number (for example, an "unID account 26a") beside a field name in the database 25 (that is, the account master table 26 and the connection table 27) indicates data of the corresponding field.

A default actual address 26d denotes default electronic mail address of the registered user.

Figure 9:
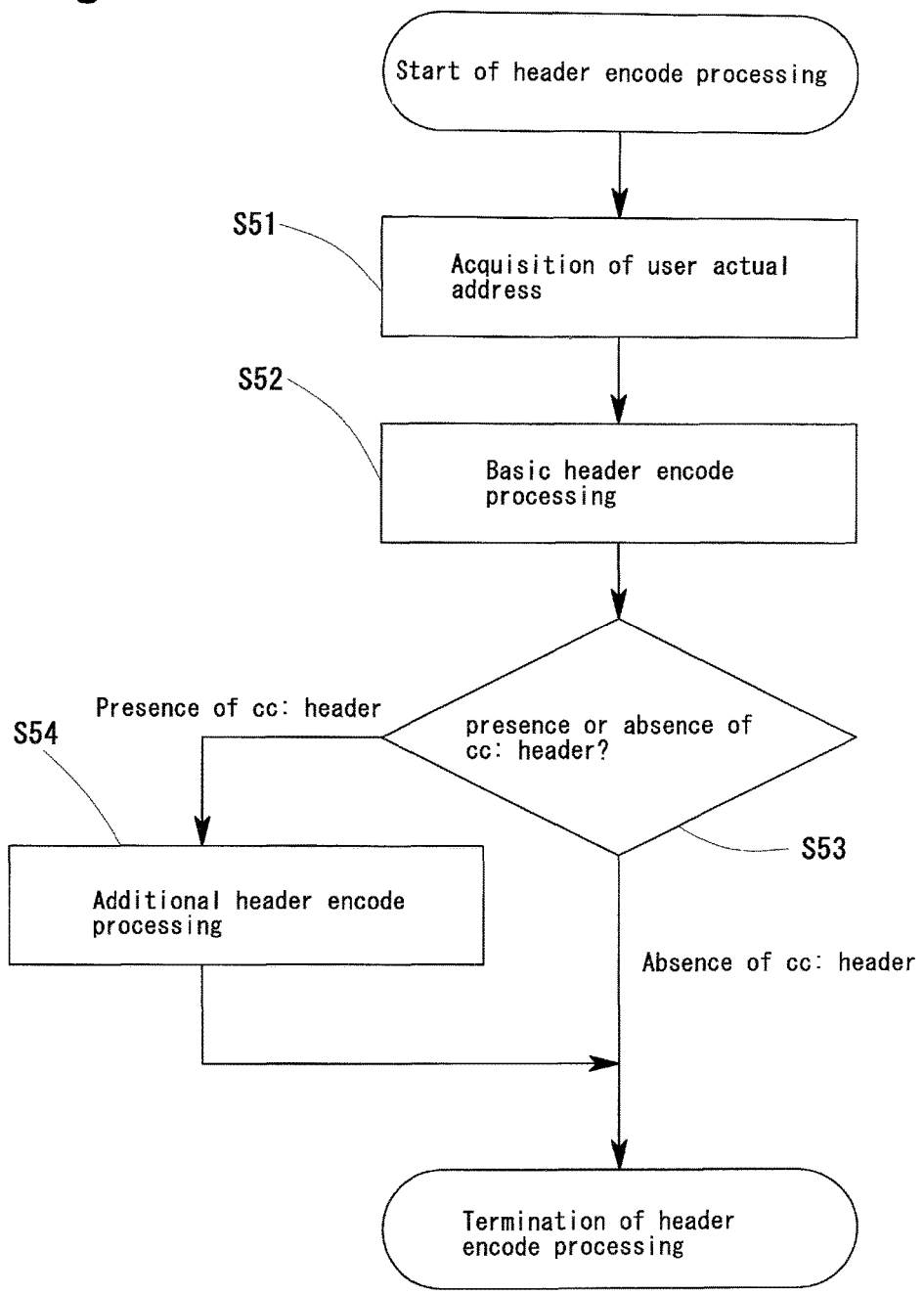
FIG. 9 is a flow chart which shows one example of detailed processing procedures in header encode processing shown in FIG. 5.

Reply destination address setting 26e of the account master table 26 designated by the registered user designates how to identify an electronic mail address as a destination of the user addressed forwarding mail (that is, a user actual address) in the header encode processing shown in FIG. 9.

When "default" is designated by the reply destination address setting 26e, the default actual address 26d is assigned as the user actual address. On the other hand, when "source" is designated, a source actual address 27e, which is one of the fields in the connection table 27 shown in FIG. 11B, is assigned as the user actual address.

In other words, the default actual address 26d of the account master table 26 or the source actual address 27e of the connection table 27 corresponds to the user actual address.

In the account master table 26, an extension period setting value 26f indicates an extension period of connection ID.

Next, the connection table 27 shown in FIG. 11B stores connection information related to a relationship between a registered user and a target. Each of records stored in the connection table 27 is referred to as a connection record.

In the connection table 27, the connection ID 27b indicates connection ID. The connection ID corresponds to a connection address which is a temporary electronic mail address of the registered user and, in most cases, unique data automatically given by the mail server device 4. In other words, the connection ID is an identification indicator which indicates a connection between a user and a target via electronic mail being set for each purpose.

In this example, the connection address comprises a local part made up of the connection ID and a domain name indicating the mail server device 4.

When the connection ID and the connection address are correlated uniquely (that is, in a one-to-one relationship), the connection address is not necessarily limited to a local part made up of the connection ID and a domain name indicating the mail server device 4. The connection ID and the connection address may be the same.

An unID account 27c of the connection table 27 is the same data as the unID account 26a of the account master table 26. The unIDaccount 27c and the unID account 26a are used to associate a connection record of the connection table 27 with an account record of the account master table 26.

The destination actual address 27d is a target actual address usually given by a registered user upon issuance of new connection ID. The destination actual address 27d, or a reply source actual address which is an electronic mail address constituting a field value in the source header of the user addressed mail, corresponds to a target actual address.

Next, the source actual address 27e is usually an electronic mail address of a source of the connection issuance requesting mail acquired by the mail server device 4, or a user actual address identified by the connection issuance/target addressed forwarding mail generation requesting signal.

In this example, the mail server device 4 is configured to additionally acquire an electronic mail address of a source of the received target addressed mail every time a target addressed mail is received from a registered user, and to update the source actual address 27e according to the acquired electronic mail address. Therefore, in this example, the source actual address 27e is the electronic mail address of a source of the immediate (newest) target addressed mail.

An expiration date 27g is an expiration date of connection ID (that is, an expiration date of the connection address).

Figure 7:
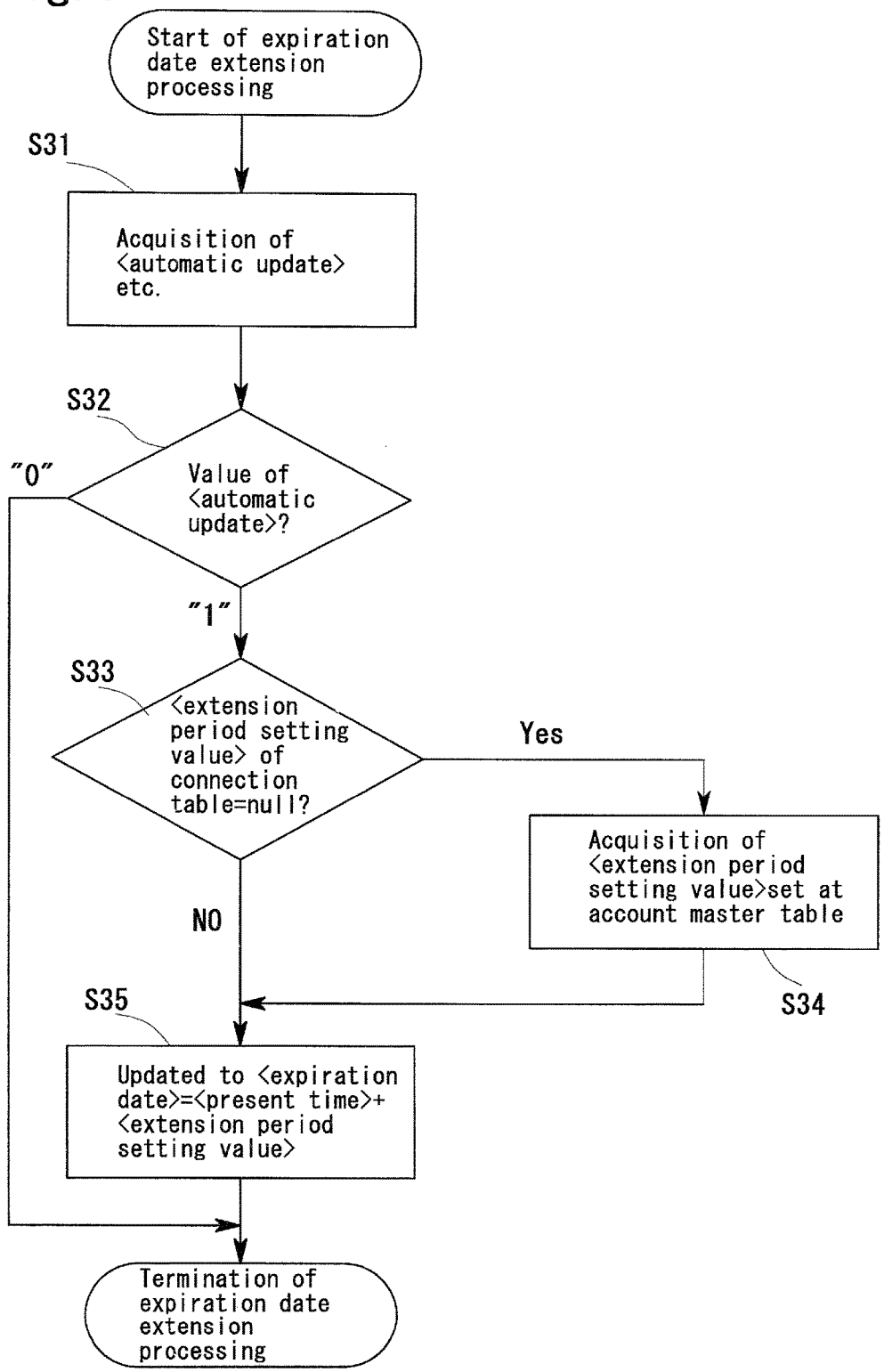
FIG. 7 is a flow chart which shows one example of detailed processing procedures in expiration date extension processing shown in FIG. 5.

An automatic update 27i shows whether or not the expiration date is automatically updated in the expiration date extension processing shown in FIG. 7. When the data is "1," automatic update is executed, and when it is "0," no automatic update is executed.

Nullification 27k shows whether or not the connection ID is invalid. When the data is "1," the connection ID is invalid. When the data is "0," the connection ID is valid. When the connection ID has expired or where a registered user cancels before an expiration date of the connection ID even within the expiration date, the nullification is "1" and thereafter, user addressed mail from a target will no longer be forwarded to the registered user.

It is acceptable that the determination of whether the connection ID is valid or invalid, based on the nullification 27k, is made at the same time, for example, as the determination of the expiration date by the validity determination means 13 shown in FIG. 2 (processing shown in Step S9 and Step S10 corresponding thereto and to be described later).

A field in the connection table 27 may comprise the same quality data as a field of the account master table 26, except the unID account 27c, for example, reply destination address setting 27f and extension period setting value 27h of the connection table 27 (in this example, the field name is also the same as that of the account master table 26).

Therefore, when significant data is described in these fields of the connection table 27, that data is used in the corresponding processing. When no significant data is described in the connection table 27 (for example, when the data concerned is "null"), data of the corresponding account master table 26 is used.

Next, a description will be given of processing procedures in the mail server device 4 with reference to FIG. 5 to FIG. 15.

In addition, in the drawings of the present application, a character string inside < > denotes an item name of data. Those indicated with <item name> indicate data of an item denoted by the item name, unless otherwise specified. When the item name is a field name of the database 25 (that is, the account master table 26 and the connection table 27), unless otherwise specified, <field name> (for example, <connection ID>) indicates data of the corresponding field of the database 25. Further, a character string described in " " indicate data in itself.

Figure 5:
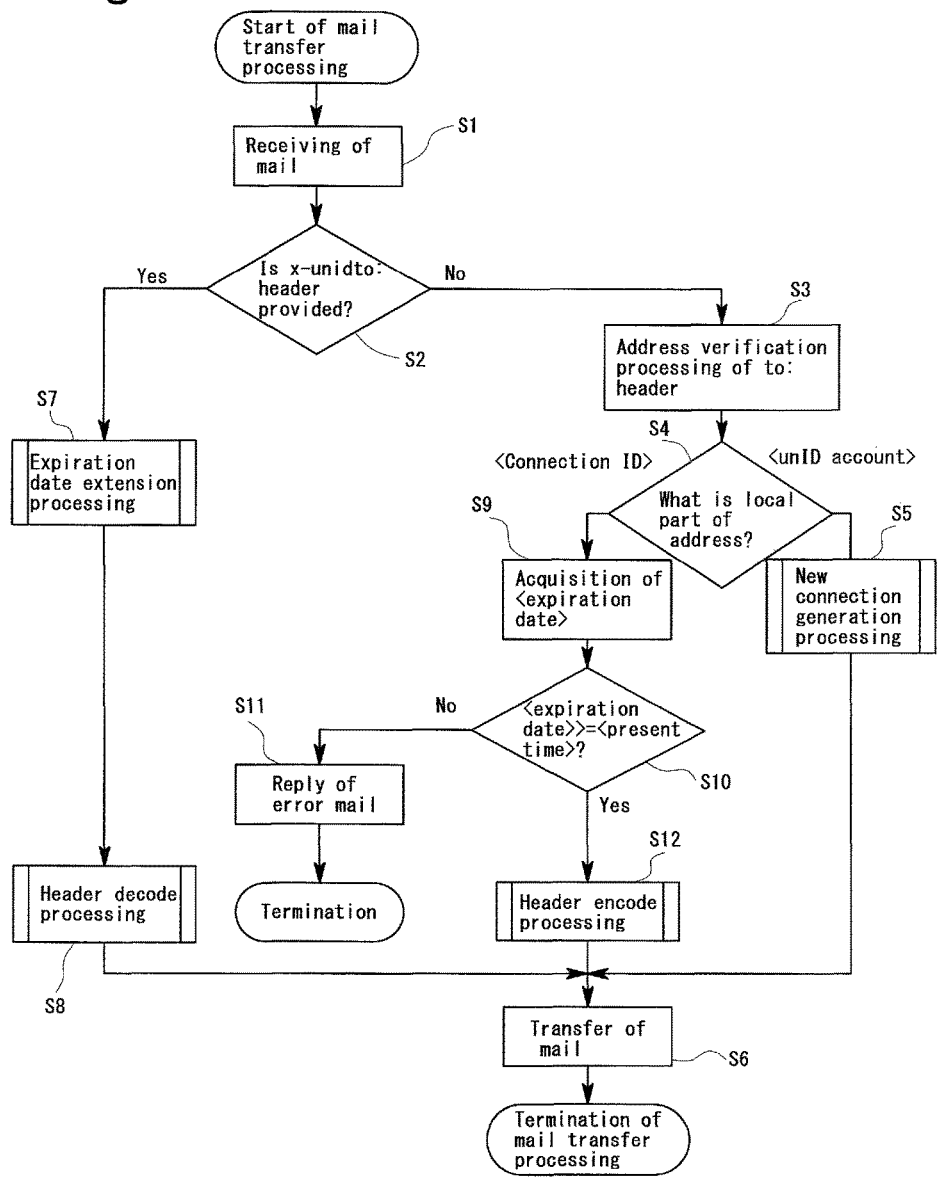
FIG. 5 is a flow chart which shows one example of processing procedures in the mail server device 4 which configures the mail communication system 2.

As shown in FIG. 5, the CPU 42 of the mail server device 4 (refer to FIG. 4) monitors incoming of electronic mail. Upon receiving of electronic mail (Step S1), the CPU 42 determines whether or not the electronic mail has an "x-unidto:" header which is a dedicated header (Step S2).

In Step S2, when the CPU 42 determines that the electronic mail has no "x-unidto:" header, a local part of a "to:" header, which is a destination header of the electronic mail, is verified with the unID account 26a of the account master table 26 (Step S3). If the information matches, the CPU 42 determines that the electronic mail is a connection issuance requesting mail from a registered user corresponding to the matched unID account 26a (Step S4) and executes new connection generation processing (Step S5).

FIG. 12 illustrates an arrangement of connection issuance requesting mail 91 transmitted from the mail transmitting/receiving device 6 of the registered user.

As shown in FIG. 6, in the new connection generation processing, the CPU 42 issues a new connection ID (Step S21) and registers a new connection record corresponding to the new connection ID in the connection table 27 (Step S22).

That is, new connection records comprising predetermined fields (such as the new connection ID 27b, the unID account 27c of the registered user, the destination actual address 27d identified in a text of the connection issuance requesting mail 91, the source actual address 27e which is a field value in a source header of the connection issuance requesting mail 91) are added to the connection table 27.

In this example, in which a destination actual address 27d is added to the connection table 27 in the new connection generation processing by the connection issuance requesting mail 91, there is illustrated a method for describing the destination actual address 27d in the text of the connection issuance requesting mail 91. However, there are no particular limitations on the identification or description of the destination actual address 27d by the connection issuance requesting mail 91.

For example, the destination actual address 27d may be described in a header of the connection issuance requesting mail 91. To be more specific, a general header such as a subject header indicating a subject may be used or a dedicated header may be provided to describe the destination actual address 27d as a field value in the header.

Further, in the example, as the source actual address 27e that is added to the connection table 27 in the new connection generation processing, a field value in a source header of the connection issuance requesting mail 91 may be used. However, there are no particular limitations on the source actual address 27e that can be added to the connection table 27 in the new connection generation processing.

For example, an electronic mail address which is designated arbitrarily by a registered user in the text or the header of the connection issuance requesting mail 91 (use of a general header or setting of a new dedicated header) may be used as the source actual address 27e that is added to the connection table 27 in the new connection generating processing. In some embodiments, an electronic mail address of a registered user which has been in advance stored in the database 25 (for example, the default actual address 26d of the account master table 26) may be used. The registered user may also be allowed to select one of the above described methods.

Moreover, when a field value of a source header of the connection issuance requesting mail 91 is used as the source actual address 27e added to the connection table 27 in the new connection generation processing, a desired electronic mail address can be selected from electronic mail addresses that are retained by the registered user (that is, mail accounts) and the connection issuance requesting mail 91 can be transmitted from the selected electronic mail address. Thereby, the registered user is able to receive template mail at a desired electronic mail address.

Regarding data of a field other than the fields described above in the connection record shown in FIG. 11B, data determined in advance may be generated in the mail server device 4. The data may be identified in the connection issuance requesting mail. The data may be directly transmitted to the mail server device 4 in the connection issuance requesting means 32 of the mail transmitting/receiving device 6 shown in FIG. 3. Or a combination of these methods may be used.

Next, the CPU 42 generates a template mail (Step S23) and transmits the template mail (FIG. 5, Step S6).

FIG. 12 illustrates an arrangement of the template mail 92 transmitted from the mail server device 4.

The template mail 92 transmitted from the mail server device 4 is transmitted to a source actual address of the mail transmitting/receiving device 6 of the registered user. The registered user who receives the mail rewrites the text of the template mail 92 and replies with the template mail, which is converted into a target addressed mail.

FIG. 13 illustrates an arrangement of the target addressed mail 93 replied from the mail transmitting/receiving device 6 of the registered user.

The target addressed mail 93 replied from the mail transmitting/receiving device 6 of the registered user is transmitted to a corresponding connection address of the registered user set in the mail server device 4.

As shown in FIG. 5, when the received electronic mail is determined to have the "x-unidto:" header in Step S2, the CPU 42 determines that the received electronic mail is the target addressed mail 93 and executes expiration date extension processing (Step S7).

In the expiration date extension processing shown in FIG. 7, the CPU 42 acquires necessary data such as automatic update 27*i* from a connection record corresponding to the connection ID, which constitutes a local part of the "to:" header of the target addressed mail 93 in the connection table 27 (Step S31), and determines whether the acquired automatic update 27*i* is "1" or "0" (Step S32).

When the CPU 42 determines that the automatic update 27*i* is "1," the expiration date 27*g* is updated. Further, the CPU 42 checks whether or not the data is described in an extension period setting value 27*h* of the connection table 27 (Step S33).

When the CPU 42 determines that the data is described in the extension period setting value 27*h* of the connection table 27, the CPU 42 updates the expiration date 27*g* of the connection table 27, for example, by adding the extension period setting value 27*h* to the present time (that is, data which indicates the present date retained in the mail server device 4) (Step S35).

On the other hand, when the CPU 42 determines that nothing is described in the extension period setting value 27*h* of the connection table 27 in Step S33, the CPU 42 acquires the extension period setting value 26*f* described in the account master table 26 (Step S34), and executes processing of above described Step S35 based on the acquired extension period setting value 26*f*.

As shown in FIG. 5, the CPU 42 then executes header decode processing (Step S8).

Figure 8:
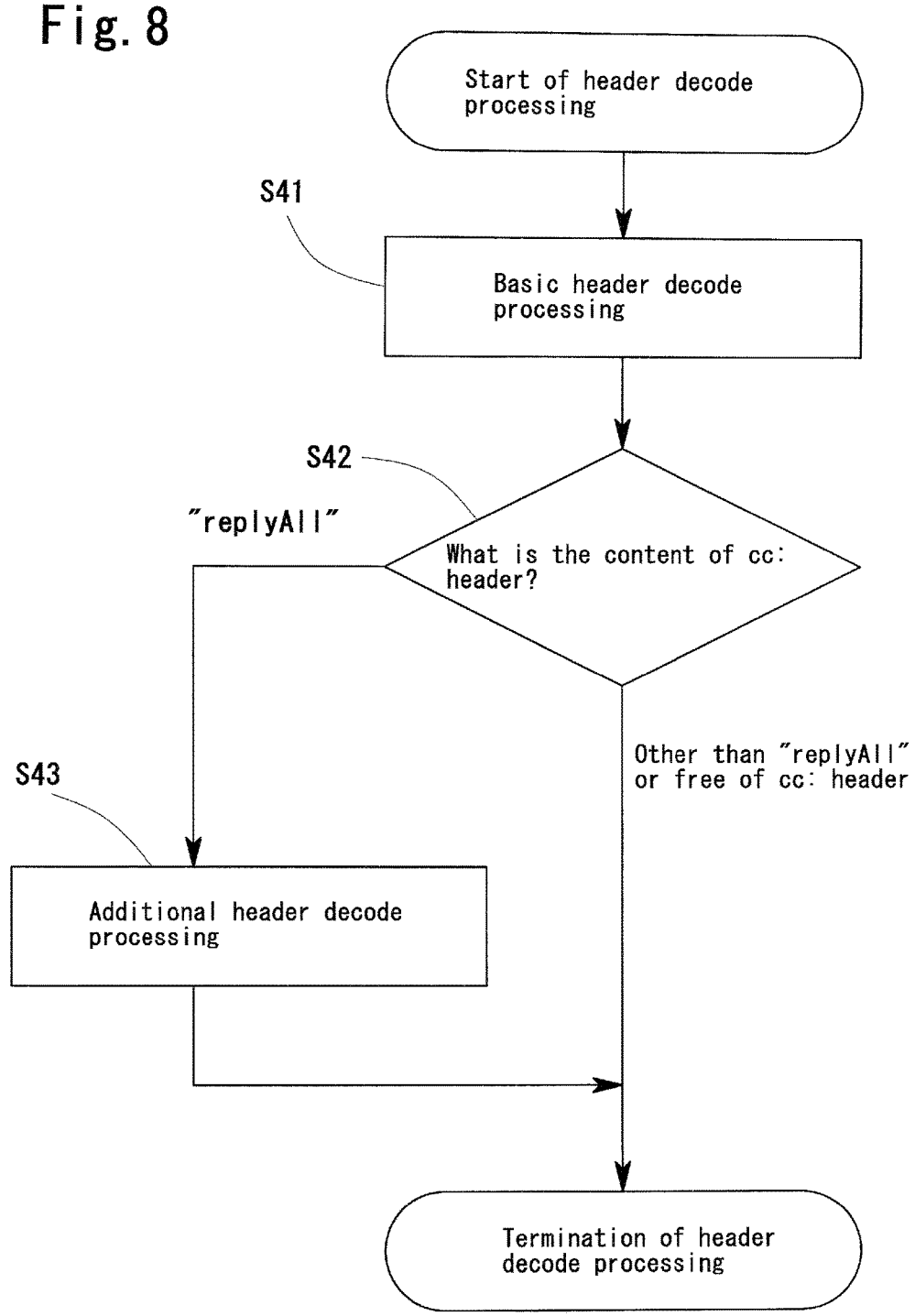
FIG. 8 is a flow chart which shows one example of detailed processing procedures in header decode processing shown in FIG. 5.

As shown in FIG. 8, the CPU 42 executes basic header decode processing (Step S41). In the basic header decode processing, first, a "from:" header of the received target addressed mail 93 (refer to FIG. 13) is deleted. The header name of "to:" header is changed to "from:", and the header name of "x-unidto:" header is changed to "to:."

Next, the CPU 42 checks a field value of a "cc:" header (Step S42). When the field value is other than "replyAll," or when the "cc:" header is not found, the CPU 42 terminates header decode processing. And when the field value is "replyAll," the CPU 42 executes additional header decode processing (Step S43) and then terminates the header decode processing. The additional header decode processing will be described later.

The CPU 42 transmits target addressed forwarding mail acquired from the header decode processing of the received target addressed mail 93 (FIG. 5, Step S6).

FIG. 13 illustrates an arrangement of target addressed forwarding mail 94.

The target addressed forwarding mail 94 transmitted from the mail server device 4 is transmitted to a destination actual address of the mail transmitting/receiving device 6 of a target. The target who receives the mail rewrites the text of the target addressed forwarding mail 94, and then replies via the mail, which is converted to a user addressed mail.

FIG. 14 illustrates an arrangement of the user addressed mail 95 that is a reply from the mail transmitting/receiving device 6 of the target.

A field value in the "from:" header of the user addressed mail 95 is <reply source actual address>, which indicates an electronic mail address of a source of the user addressed mail 95. When a target who receives the target addressed forwarding mail 94 (refer to FIG. 13) replies from the same electronic mail address at which the target addressed forwarding mail 94 is received, data constituting the <reply source actual address> corresponds to data of the destination actual address 27*d* stored in the connection table 27.

The user addressed mail 95, which is a reply from the mail transmitting/receiving device 6 of the target, is transmitted to a corresponding connection address of the registered user set in the mail server device 4. That is, the destination of the user addressed mail 95 is the same as the destination of the target addressed mail 93.

In addition, when the user addressed mail 95 is involved in broadcast transmission, a "cc:" header is added in which a broadcast destination actual address designated by the target is added as a field value.

As shown in FIG. 5, when the CPU 42 determines that the received electronic mail does not have the "x-unidto:" header in Step S2, and also that a local part of the "to:" header of the electronic mail is not matched with the unID account 26*a* of the account master table 26 in Step S4, the CPU 42 determines that the received electronic mail is the user addressed mail 95. The CPU 42 then acquires the expiration date 27*g*, which is a field of a corresponding connection record of the destination connection address from the connection table 27 (Step S9).

Next, the CPU 42 determines whether or not the present time is out of the expiration date 27*g* (Step S10). When the CPU 42 determines expiration of the date, the CPU 42 determines that the connection ID is out of date, and generates error mail communicating the expiration and transmits a reply message to a target (Step S11).

On the other hand, when the CPU 42 determines that the present time is not out of the expiration date 27*g* in Step S10, the CPU 42 determines that the connection ID is not out of date, and executes header encode processing (Step S12).

As shown in FIG. 9, in the header encode processing, the CPU 42 first acquires a user actual address which is associated with the connection ID and given as a forwarding destination of the user addressed mail 95 (Step S51).

That is, the CPU 42 checks the reply destination address setting 27*f* corresponding to the connection ID 27*b* in the connection table 27, and acquires the source actual address 27*e* from the connection table 27 where "source" is described in the reply destination address setting 27*f*, thereby giving the source actual address 27*e* as a user actual address.

On the other hand, when "default" is described in the reply destination address setting 27*f* of the connection table 27, the CPU 42 acquires from the account master table 26 a default actual address 26*d* of an account record corresponding to the unID account 26a corresponding to the connection ID 27b, thereby giving the default actual address 26d as a user actual address.

When nothing is described in the reply destination address setting 27f of the connection table 27, the CPU 42 refers to the account master table 26 and checks the reply destination address setting 26e for the unID account 26a corresponding to the connection ID 27b, executing a processing similar to the above described processing in accordance with data of the reply destination address setting 26e.

When the user actual address is determined as described above, basic header encode processing is executed (Step S52).

In the basic header encode processing, the "to:" header of the received user addressed mail 95 (refer to FIG. 14) is deleted and the "to:" header in which a field value is given as a user actual address (that is, the default actual address 26d or the source actual address 27e) is added. The header name of the "from:" header is changed to "x-unidto:", and the "from:" header in which a field value is given as a connection address corresponding to the connection ID is added.

Next, the CPU 42 checks the presence or absence of the "cc:" header (Step S53). When no "cc:" header is found, the CPU 42 terminates header encode processing. When the "cc:" header is found, the CPU 42 executes additional header encode processing and thereafter terminates the header encode processing (Step S54).

In the additional header encode processing, the header name of the "cc:" header of the received user addressed mail 95 is changed to "x-unidcc:", which indicates a dedicated header in which the broadcast destination actual address is given as a field value. A "cc:" header in which the field value is given as "replyAll" is added.

The CPU 42 transmits user addressed forwarding mail acquired by performing the header encode processing on the received user addressed mail 95 (FIG. 5, Step S6).

FIG. 14 illustrates an arrangement of the user addressed forwarding mail 96.

The user addressed forwarding mail 96 transmitted from the mail server device 4 is transmitted to a user actual address (that is, the default actual address 26d or the source actual address 27e) of the mail transmitting/receiving device 6 of a registered user.

Further, a description will be given of an embodiment where a registered user receiving the mail rewrites a text thereof and retransmits the mail (that is, the mail is replied to a target). In the electronic mail communication system 2 according to the present disclosure, electronic mail retransmitted from the registered user is also handled as target addressed mail and subjected to processing similar to the above described target addressed mail 93 (refer to FIG. 13).

FIG. 15 illustrates an arrangement of target addressed mail 97 retransmitted (replied) from the mail transmitting/receiving device 6 of the registered user. In this example, the user actual address of the registered user is regarded as a source actual address 27e. Further, when the user addressed mail 95 (refer to FIG. 14) from the target is involved in broadcast transmission, it is assumed that the registered user will reply to all the broadcast destination actual addresses.

In this case, in Step S42 of the header decode processing shown in FIG. 8, a field value of the "cc:" header is determined to be "replyAll" and additional header decode processing is executed.

In the additional header decode processing, the "cc:" header of the target addressed mail 97 is deleted, and the header name of the "x-unidcc:" header is changed to "cc:."

FIG. 15 illustrates an arrangement of the target addressed forwarding mail 98.

In the electronic mail communication system 2 according to the present disclosure, electronic mail retransmitted (replied) from a registered user to a target or even mail replied to the above mail is subjected to processing similar to that of the first target addressed mail or first user addressed mail, irrespective of the number of times.

That is, when the mail transmitting/receiving device 6 of the registered user or that of the target is provided only with general mail client means 31 (refer to FIG. 3), it is possible to repeat transmission of electronic mail from the registered user to the target, reply from the target, retransmission (a reply to a previous reply), another reply (reply in response to retransmission) and others.

Figure 17:
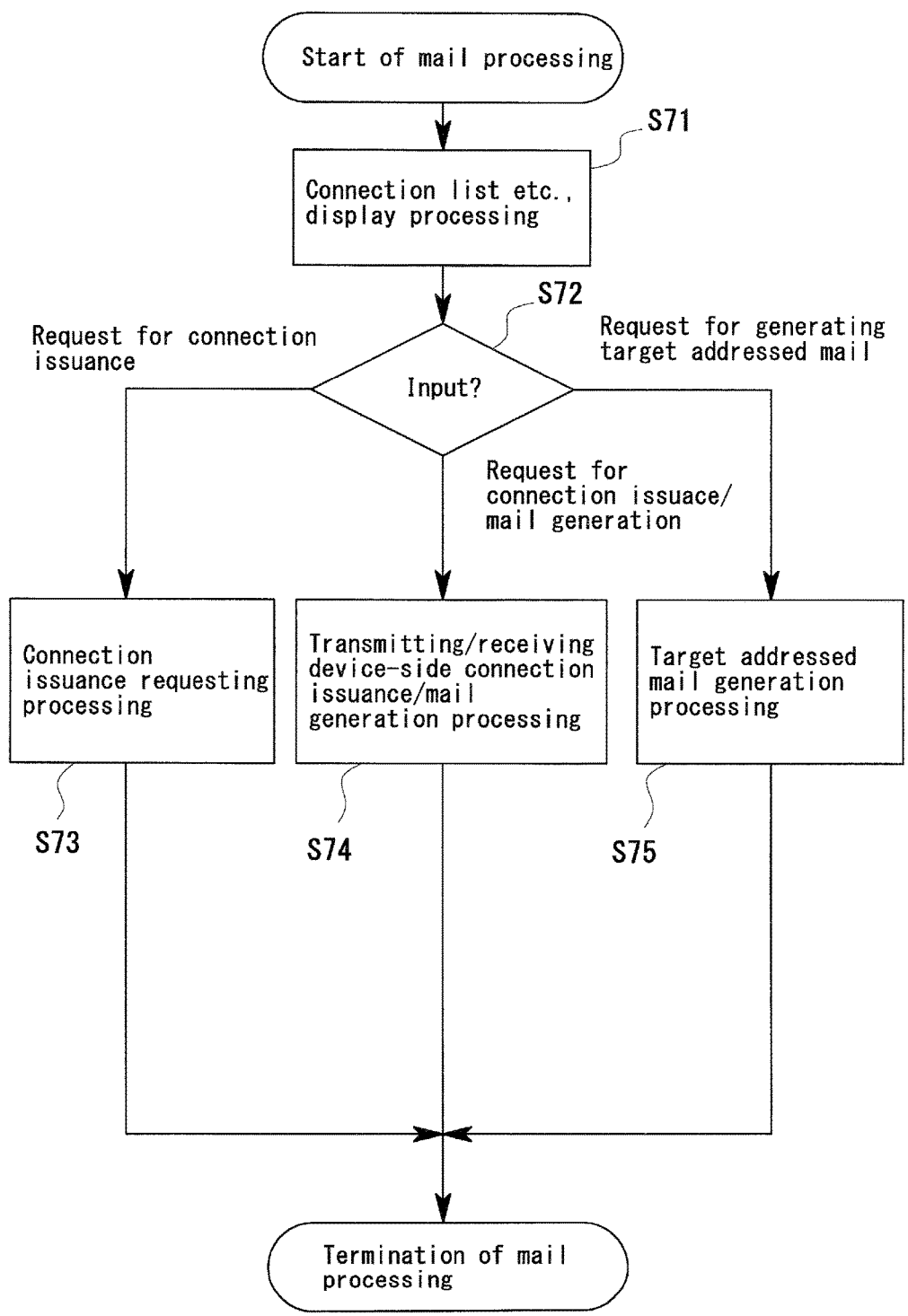
FIG. 17 is a flowchart which shows one example of processing procedures in the mail transmitting/receiving device 6 of a registered user which configures the mail communication system 2.

On the other hand, when new electronic mail (target addressed mail) is generated and transmitted to a target with already registered connection ID, the mail transmitting/receiving device 6 of the registered user may be used to execute, for example, target addressed mail generation processing to be described later (FIG. 17, Step S75).

Next, a description will be given of server-side connection issuance/target addressed forwarding mail generation processing with reference to FIG. 10.

The CPU 42 of the mail server device 4 monitors a connection issuance/target addressed forwarding mail generation requesting signal. Upon receiving of a signal requesting generation of the connection issuance/target addressed forwarding mail, by which a destination actual address as a target actual address and data to-be-transmitted are identified, via the information communication means 8 from the mail transmitting/receiving device 6 of the registered user, the CPU 42 issues a new connection ID (Step S61), and also registers a new connection record corresponding to the new connection ID in the connection table 27 (Step S62).

That is, new connection record is added to the connection table 27. The new connection record may be made up of predetermined fields such as a new connection ID 27b, an unID account 27c of the registered user, a destination actual address 27d identified by the connection issuance/target addressed forwarding mail generation requesting signal and a source actual address 27e etc.

In this example, in the server-side connection issuance/target addressed forwarding mail generation processing, as the source actual address 27e to be added to the connection table 27, an electronic mail address of the mail transmitting/receiving device 6, which is a source of the requesting signal, may be used (this can be realized, for example, by allowing an electronic mail address used mainly in the mail transmitting/receiving device 6 which is a source of the requesting signal to be included in the connection issuance/target addressed forwarding mail generation requesting signal). However, the source actual address 27e added to the connection table 27 in the server-side connection issuance/target addressed forwarding mail generation processing shall not be limited thereto.

In the server-side connection issuance/target addressed forwarding mail generation processing, for example, an electronic mail address arbitrarily designated by a registered user may be used as the source actual address 27e to be added to the connection table 27 (this can be realized, for example, by allowing the electronic mail address arbitrarily designated by the registered user to be included in the requesting signal). In some embodiments, an electronic mail address of the registered user stored in advance in the database 25 may also be used as the source actual address

27e, (for example, the default actual address 26d of the account master table 26). In some embodiments, the registered user is able to select one of these methods.

Similar to the above described new connection generation processing (refer to FIG. 6), regarding data of fields in the connection record shown in FIG. 11B, other than those described above, it is acceptable that predetermined data is generated in the mail server device 4. It is also acceptable that these data are identified by the connection issuance/target addressed forwarding mail generation requesting signal. A combination of these methods may be used in some embodiments.

Next, the CPU 42 generates an electronic mail in which the destination actual address 27d is a field value of the destination header, a connection address corresponding to the new connection ID 27b is a field value of the source header, and data to-be-transmitted is a text (Step S63), and then transmits the mail (Step S64).

In Step S64 unlike a case where it is transmitted via the new connection generation processing (refer to FIG. 6), the electronic mail which has been transmitted from the mail server device 4 is transmitted to the destination actual address 27d of the mail transmitting/receiving device 6 of the target by a single operation of the mail transmitting/receiving device 6 of the registered user, that is, transmitting/receiving device-side connection issuance/mail generation processing to be described later (FIG. 17, Step S74).

An arrangement of the electronic mail is the same as that of the target addressed forwarding mail 94 shown in FIG. 13. In the electronic mail communication system 2 according to the present disclosure, the mail is processed in the same manner as the target addressed forwarding mail 94. Therefore, unless otherwise specified, the above described electronic mail is described as the target addressed forwarding mail 94.

Next, FIG. 16 is a drawing which shows one example of data arrangement of a local connection table 37 in the local database 35 of the mail transmitting/receiving device 6. The data arrangement of the local connection table 37 is the same as the data arrangement of the connection table 27 shown in FIG. 11B, except that data corresponding to the unID account 27c is not included. However, the local connection table 37 stores only the connection record related to the registered user identified by the unID account 27c of the connection table 27.

The data of the local connection table 37 and the data of the connection table 27 are subject to synchronization via the information communication means 8, whenever necessary, and the identification is kept.

FIG. 17 is a flowchart which shows one example of processing procedures of the mail transmitting/receiving device 6 of the registered user in the electronic mail communication system 2 according to the present disclosure.

FIG. 18 is a drawing illustrating the processing shown in FIG. 17, and a display screen 80 displayed on a display device 64 of the mail transmitting/receiving device 6.

Next, with reference to FIG. 17, the processing procedures in the mail transmitting/receiving device 6 of the registered user will be described.

As shown in FIG. 17, a CPU 62 (refer to FIG. 4) of the mail transmitting/receiving device 6 displays the display screen 80 on the display device 64 (Step S71) and monitors input from an input device 66 (Step S72).

Each of the connection names (for example, "e-mate query") described in the connection name buttons 81a, 81b, etc. in a connection list 81 displayed on the display screen 80 may be acquired by extracting a connection name 27j corresponding to connection ID related to the registered user from the connection table 27 of the mail server device 4. However, in this embodiment, all the connection names 37j stored in the local connection table 37 of the mail transmitting/receiving device 6 are to be acquired.

Here, upon selection of the new connection button 82 of the display screen 80, the CPU 62 determines that a registered user has requested connection issuance, thereby requesting input of a destination actual address of a target. Upon this input, the CPU 62 generates a connection issuance requesting mail 91 (refer to FIG. 12) based on the destination actual address and transmits the mail via the information communication means 8 to the mail server device 4 (Step S73).

As described above, when the mail server device 4 receives the connection issuance requesting mail 91, new connection generation processing is executed (refer to FIG. 6) and a template mail 92 (refer to FIG. 12) is transmitted to a source actual address of the registered user.

In Step S72, upon selection of a new connection/mail generating button 83 of the display screen 80, the CPU 62 determines that the registered user has requested generation of connection issuance/target addressed forwarding mail, thereby requesting input of a destination actual address of the target, data to-be-transmitted which is a text of electronic mail, and data which is a subject of electronic mail. Upon input, the CPU 62 generates the above described connection issuance/target addressed forwarding mail generation requesting signal based on the input data and transmits the signal via the information communication means 8 to the mail server device 4 (Step S74).

As described above, when the mail server device 4 which receives the connection issuance/target addressed forwarding mail generation requesting signal, server-side connection issuance/target addressed forwarding mail generation processing is executed (refer to FIG. 10), and target addressed forwarding mail 94 is transmitted to the destination actual address of the target.

In Step S72, upon selection of any one of connection name buttons 81a, 81b, etc. in the connection list 81 of the display screen 80, target addressed mail generation processing is executed (Step S75).

A reason why the target addressed mail generation processing is required will be described.

As described above, when an electronic mail in which a field value in the "from:" header of a source header is a connection address and the "x-unidto:" header of a dedicated header is present, a template mail 92 (refer to FIG. 12) and a user addressed forwarding mail 96 (refer to FIG. 14) are retained in the mail transmitting/receiving device 6 of the registered user, the target addressed mail 93 shown in FIG. 13 is generated by replying to the electronic mail, which makes it possible to generate and transmit the target addressed mail 93 shown in FIG. 13 any number of times (in the case of retransmission shown in FIG. 15, target addressed mail 97 is included).

However, in a case where the template mail 92 or the user addressed forwarding mail 96 is not retained in the mail transmitting/receiving device 6 of the registered user, for example, when the electronic mail has been already deleted from the mail transmitting/receiving device 6 or when the electronic mail is desired to be transmitted from a different mail transmitting/receiving device 6 from the mail transmitting/receiving device retaining the electronic mail, it is impossible to generate and transmit the target addressed mail 93 by replying to the electronic mail.

The target addressed mail generation processing (Step S75) enables generation and transmission of the target addressed mail 93 by using an existing connection address in the mail transmitting/receiving device 6, even in the above described cases.

Now, in the target addressed mail generation processing, the CPU 62 determines that the registered user has requested generation of the target addressed mail, thereby requesting input of data to-be-transmitted which is a text of electronic mail, and input of data which is a subject of the electronic mail.

Upon input, the CPU 62 generates the target addressed mail described in the "x-unidto:" header of a dedicated header based on these input data, a connection ID corresponding to the selected connection name button, and a destination actual address corresponding to the connection ID, and transmits the mail via the information communication means 8 to the mail server device 4 (Step S75).

The destination actual address corresponding to the connection ID may be acquired from the connection table 27 of the mail server device 4. However, in this embodiment, the acquired destination actual address 37*d* may be stored at the local connection table 37 of the mail transmitting/receiving device 6.

As described so far, the target addressed mail which has been transmitted to the mail server device 4 is configured similarly as that of the target addressed mail 93 in which the text and the subject of the template mail 92 (refer to FIG. 12) are rewritten and replied (refer to FIG. 13). In the electronic mail communication system 2 according to the present disclosure, the mail is processed similarly as the target addressed mail 93. Therefore, the target addressed mail which has been generated and transmitted in Step S75 is also described as the target addressed mail 93.

Thereafter, in the mail server device 4 which has received the target addressed mail 93, expiration date extension processing (refer to FIG. 7) and header decode processing (refer to FIG. 8) are executed, and the target addressed forwarding mail 94 (refer to FIG. 13) is transmitted to the destination actual address of the target.

The target addressed mail generation processing in Step S75 shall not be limited to the above described method.

For example, the template mail 92 generated by the new connection generation processing (refer to FIG. 5, Step S5) and received by the mail transmitting/receiving device 6 (refer to FIG. 12) may be stored and retained in a storage device of the mail transmitting/receiving device 6 (for example, a main storage device 68 or an auxiliary storage device 70 shown in FIG. 4). It is preferable that the template mail 92 is kept non-erasable.

Then, upon selection of any one of the connection name buttons 81*a*, 81*b*, etc. in the connection list 81 of the display screen 80, the CPU 62 determines that the registered user has requested generation of target addressed mail, thereby requesting input of data to-be-transmitted which is a text of electronic mail, and data which is a subject of the electronic mail.

Upon input, the CPU 62 reads out template mail 92 corresponding to a connection ID corresponding to the selected connection name button from the template mail stored in the storage device, rewrites the text of the template mail 92 into the data to-be-transmitted, writes the input data as the subject, generates target addressed mail, and the target addressed mail is transmitted as a reply via the information communication means 8 to the mail server device 4.

According to the above arrangement, execution of the target addressed mail generation processing shown in Step S75 the need for a processing step to add the "x-unidto:" header or a dedicated header in the mail transmitting/receiving device 6 is eliminated. As a result, it is not necessary to provide the mail transmitting/receiving device 6 with dedicated electronic mail generating functions. There may be used, for example, functions of the mail client means 31 shown in FIG. 3.

Electronic mail which is kept non-erasable may not be necessarily the template mail 92. For example, it may be the (newest) user addressed forwarding mail 96. In brief, the electronic mail which is kept non-erasable may contain, as a field value in the "from:" header of a source header, a connection address and the "x-unidto:" header of a dedicated header.

However, the target addressed mail generation processing described at the beginning is advantageous in that the processing can be executed even where the template mail 92 or the user addressed forwarding mail 96 is not retained in the mail transmitting/receiving device 6.

Described above is a case where the electronic mail generated by the connection issuance/mail generating means in which the transmitting/receiving device-side connection issuance/mail generating means 33 shown in FIG. 3, is target addressed forwarding mail. Next, a case where the electronic mail generated by the connection issuance/mail generating means is target addressed mail will be described.

In this case, the connection issuance/mail generating means is referred to as connection issuance/target addressed mail generating means, and means on the side of the mail transmitting/receiving device 6 is referred to as transmitting/receiving device-side connection issuance/target addressed mail generating means. That is, the transmitting/receiving device-side connection issuance/mail generating means 33 shown in FIG. 3 denotes transmitting/receiving device-side connection issuance/target addressed mail generating means.

That is, upon input of a signal, which identifies a target actual address and the data to-be-transmitted, to request issuance of a connection ID and generation of target addressed mail, the transmitting/receiving device-side connection issuance/mail generating means 33 as transmitting/receiving device-side connection issuance/target addressed mail generating means identifies the target actual address, generates a signal requesting issuance of the connection ID, and inputs the signal into the connection issuance requesting means 32. The signal, which identifies the target actual address and the data to-be-transmitted, to request issuance of the connection identification indicator and generation of the target addressed mail is input, for example, from an input device 66 of the mail transmitting/receiving device 6.

Then, the template mail 92 is received. The template mail 92 has been generated and transmitted by the mail server device 4 based on the connection issuance requesting mail 91, which has been generated and transmitted by the connection issuance requesting means 32. The text of the received template mail 92 is rewritten into the data to-be-transmitted and then replied. The electronic mail thus transmitted is the target addressed mail 93.

A description will be given of the transmitting/receiving device-side connection issuance/mail generation processing (FIG. 17, Step S74) in a case where the transmitting/receiving device-side connection issuance/mail generating means 33 shown in FIG. 3 is the transmitting/receiving device-side connection issuance/target addressed mail generating means. The processing is referred to as transmitting/receiving device-side connection issuance/target addressed mail generation processing.

Figure 19:
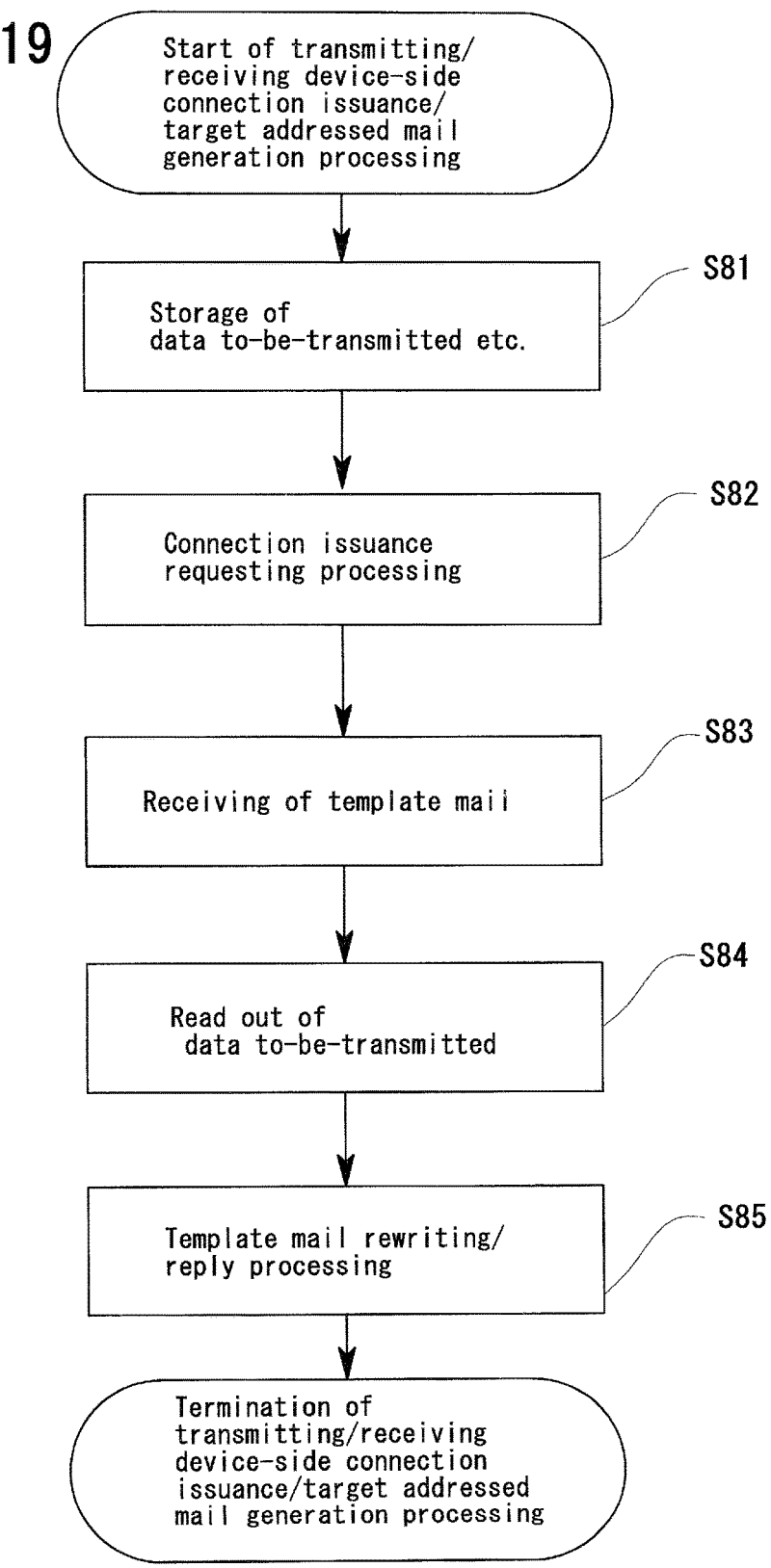
FIG. 19 is a flow chart which shows one example of procedures for transmitting/receiving device-side connection issuance/target addressed mail generation processing.

FIG. 19 is a flow chart which shows one example of the transmitting/receiving device-side connection issuance/target addressed mail generation processing. Hereinafter, a description will be given with reference to FIG. 19.

In this case, in Step S72 (refer to FIG. 17), upon selection of the new connection/mail generating button 83 (refer to FIG. 18) in the display screen 80, the CPU 62 determines that the registered user has requested generation of connection issuance/target addressed mail, and executes storage processing of the data to-be-transmitted etc. (Step S81).

In storage processing of the data to-be-transmitted etc., the CPU 62 requests input of a destination actual address of a target, data to-be-transmitted which is a text of electronic mail, and data which is a subject of the electronic mail. Upon input, the CPU 62 temporarily stores the input data in the storage device (the main storage device 68 or the auxiliary storage device 70) of the mail transmitting/receiving device 6.

Next, the CPU 62 executes connection issuance requesting processing (Step S82).

During the connection issuance requesting processing in Step S82, the connection issuance requesting mail 91 (refer to FIG. 12) is generated and transmitted based on a destination actual address stored in the above described storage device. The processing is similar to the connection issuance requesting processing in Step S73 (refer to FIG. 17).

The connection issuance requesting mail 91 (refer to FIG. 12), which has been generated and transmitted in the connection issuance requesting processing, is received by the mail server device 4. New connection generation processing is executed in the mail server device 4 (FIG. 5, Step S5).

Upon receipt of the template mail 92 (refer to FIG. 12), which has been generated and transmitted in the new connection generation processing (FIG. 5, Step S5) (Step S83), the CPU 62 reads out the data to-be-transmitted which is a text of electronic mail, and the data which is a subject of the electronic mail. As described above, the data to-be-transmitted which is a text of electronic mail, and the data which is a subject of the electronic mail, have been temporarily stored in the storage device (Step S84). The CPU 62 rewrites the template mail 92 based on the above-described data that have been read out from the storage device. The CPU 62 generates and transmits the target addressed mail 93 (refer to FIG. 13) (Step S85).

As described above, according to the transmitting/receiving device-side connection issuance/target addressed mail generation processing shown in FIG. 19, a series of processing from issuance and registration of new connection ID to generation and transmission of the target addressed mail 93 can be executed by a single operation in the mail transmitting/receiving device 6 of the registered user.

The generated and transmitted target addressed mail 93 is subject to expiration date extension processing (refer to FIG. 7) and header decode processing (refer to FIG. 8) in the mail server device 4. The generated and transmitted target addressed mail 93 is generated as the target addressed forwarding mail 94 (refer to FIG. 13). The generated and transmitted target addressed mail 93 is transmitted to the target (FIG. 5, Step S6).

In each of the above-described embodiments, the mail transmitting/receiving device 6 of the registered user is provided with all the arrangements shown in FIG. 3. However, as described above, an arrangement of the mail transmitting/receiving device 6 of the registered user shall not be limited thereto. The present disclosure is also applicable, for example, to a case where the mail transmitting/receiving device 6 of the registered user is provided only with the mail client means 31, of all the arrangements shown in FIG. 3.

In this case, the processing which generates and transmits the connection issuance requesting mail 91 (refer to FIG. 12) (that is, processing equivalent to processing by the connection issuance requesting means 32 shown in FIG. 3) can be executed according to the following method.

As a precondition of the processing, a user identification indicator of the registered user (that is, unID account 26a) and a domain name which indicates the mail server device 4 (in this example, "unid.us") are already known to the registered user.

In this case, the registered user uses the mail client means 31 of the mail transmitting/receiving device 6 to generate a new electronic mail. In the new electronic mail, a destination actual address, which is a target actual address, is given as a text. Further, an electronic mail address having the unID account 26a as a local part, and a domain name of "unid.us" are given as a field value of a destination header. The new electronic mail is transmitted accordingly. This is received as the connection issuance requesting mail 91 by the mail server device 4.

As described above, in the mail server device 4 which has received the connection issuance requesting mail 91, the template mail 92 having the "x-unidto:" header (refer to FIG. 12) is generated and transmitted to a source actual address of the registered user. The mail client means 31 of the mail transmitting/receiving device 6 is used to reply to the template mail 92, thereby generating the target addressed mail 93 (refer to FIG. 13).

Hereinafter, receiving of a reply from a target, retransmission to the target, receiving of mail replied again from the target and others can be carried out by using only the mail client means 31 as described above.

Now, processing which generates and transmits the target addressed mail 93 (refer to FIG. 13) (that is, processing equivalent to processing by the target addressed mail generating means 34 shown in FIG. 3) can be executed according to the following method.

As a precondition of this processing, a connection address which is used in electronic mail communications with the target is already known to the registered user.

For example, at first, the registered user uses the mail client means 31 of the mail transmitting/receiving device 6 to generate new electronic mail (it is acceptable that a text and a subject are kept blank) and transmit the electronic mail to the connection address. Since the electronic mail is free of the "x-unidto:" header, it is determined by the mail server device 4 to be the user addressed mail 95 (refer to FIG. 14) and the header encode processing (refer to FIG. 5, Step 12) is executed.

As a result, the user addressed forwarding mail 96 (refer to FIG. 14) to which the "x-unidto:" header is added is generated in the mail server device 4 and forwarded (returned) to the source actual address or the default actual address of the registered user.

The registered user uses the mail client means 31 of the mail transmitting/receiving device 6 to receive the mail and replies after the text and the subject are written. Then, this mail is given as the target addressed mail 93 (refer to FIG. 13).

Further, where the template mail 92 (refer to FIG. 12) transmitted from the mail server device 4 on new connection generation processing is retained in the mail client means 31 of the mail transmitting/receiving device 6 of the registered user, the mail client means 31 of the mail transmitting/ receiving device 6 is used to reply to the template mail 92. Then, this is generated as the target addressed mail 93.

Even where the mail transmitting/receiving device 6 is provided only with a general use mail client program (that is, the mail client means 31) devoid of functions to impart the "x-unidto:" header which is a dedicated header to electronic mail, the mail transmitting/receiving device 6 can function as the mail transmitting/receiving device 6 of the registered user and configure the electronic mail receiving system 2 of the present disclosure.

In each of the previously described embodiments, whether or not an electronic mail received by the mail server device 4 is target addressed mail or user addressed mail is determined by the presence or absence of the "x-unidto:" header which is a dedicated header. A reference has been also made to an arrangement in which determination is made based on a field value of the source header ("from:" header) or a general header. However, whether the received electronic mail is target addressed mail or user addressed mail may be determined by whether or not specific data acting as a mark (hereinafter referred to as "mark data") is included in a field value of the header. This embodiment will be described next.

Figure 21:
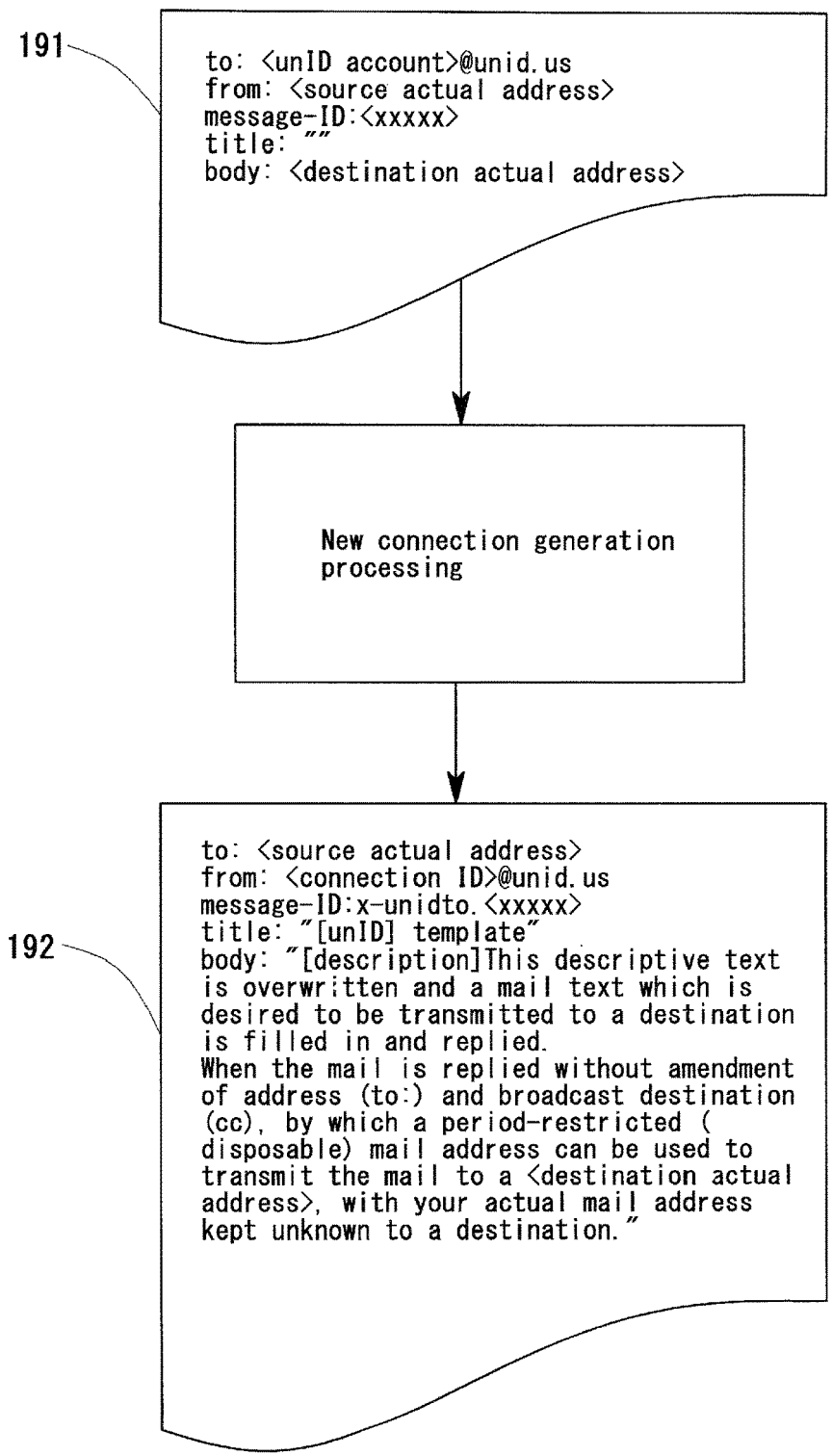
FIG. 21 is a drawing which describes processing content of new connection generation processing in another embodiment of the present disclosure.
Figure 22:
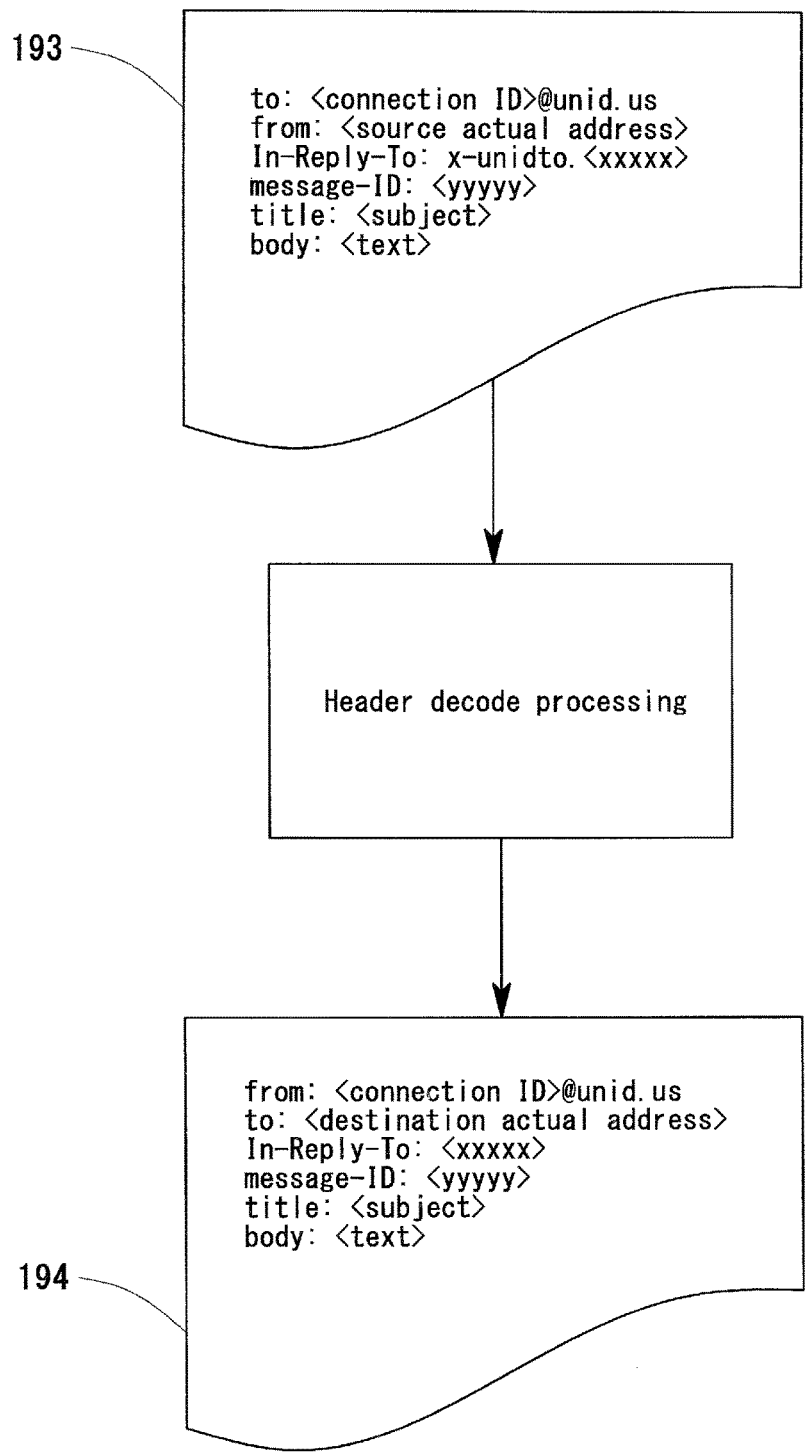
FIG. 22 is a drawing which describes processing content of header decode processing in another embodiment of the present disclosure.
Figure 23:
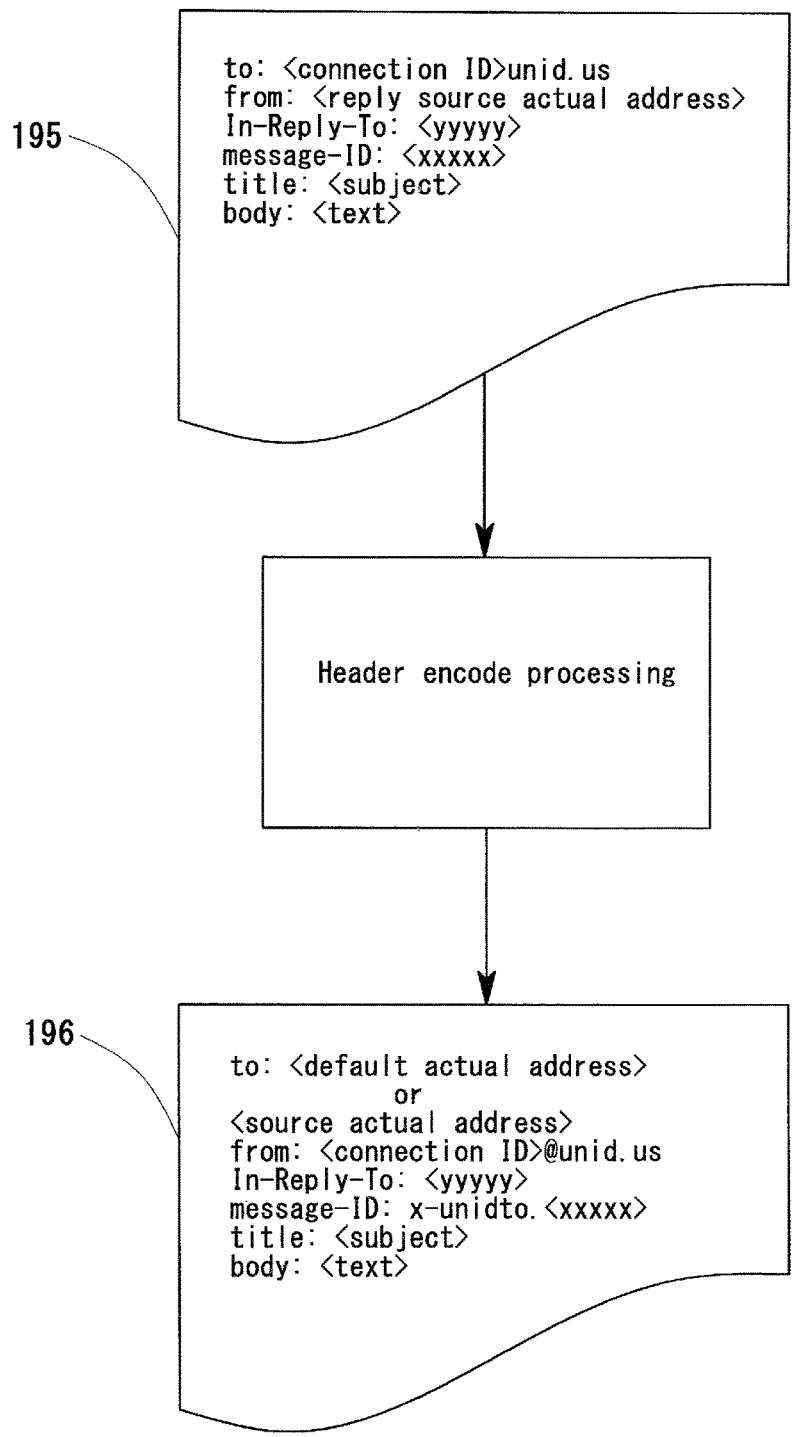
FIG. 23 is a drawing which describes processing content of header encode processing in another embodiment of the present disclosure.

FIG. 21 is a drawing which describes the new connection generation processing according to such an embodiment. FIG. 22 is a drawing which describes the header decode processing according to such an embodiment. FIG. 23 is a drawing which describes the header encode processing according to such an embodiment.

Whether the mail is target addressed mail or user addressed mail is determined by whether mark data is included in a field value of one of the headers, or whether no mark is included in a field value of any headers. In this example, a description will be given of a case where determination is made based on whether or not mark data is included in a field value of a specific header. This is because determination can be made more quickly and easily.

The above-described specific header may be either a dedicated header or a general header. However, in this embodiment, a description will be given of a case where as the specific header, there is used a general header, and in particular, a so-called standard general header. This is because the standard general header cannot be deleted by a general mail client program or a general mail server.

Further, here, a description will be given of a case where, of standard general headers, a header which is not arbitrarily changed in general by a registered user or a target is used, for example, an "In-Reply-To:" header is used as the above-described specific header.

When the received electronic mail is electronic mail which has been transmitted as a reply to or forwarded from certain electronic mail (original electronic mail), that is, reply mail or forwarded mail, the "In-Reply-To:" header identifies the original electronic mail. In this embodiment, a header such as the "In-Reply-To:" header may be referred to as a "reply original mail identification header" in the sense that it is a header for identifying electronic mail which is a source of a reply mail or forwarded mail (hereinafter, may be simply referred to as "reply original mail").

In general, as a field value of the "In-Reply-To:" header of reply mail or forwarded mail, a field value of a "message-ID:" header of the above-described original electronic mail (reply original mail) is transcripted. The "Message-ID:" header is a header for identifying each electronic mail. In this embodiment, a header such as the "Message-ID:" header is from time to time referred to as a "mail identification header." It is noted that the "Message-ID:" header is also one of standard general headers.

In this embodiment, the "x-unidto:" header, which is a dedicated header used in the previously described embodiment, is not used and whether the electronic mail received by the mail server device 4 is target addressed mail or user addressed mail is determined based on whether or not mark data is included in a field value of the "In-Reply-To:" header.

In the case of the above arrangement, the basic arrangement and processing will be determined in a similar manner as an embodiment where the mail is target addressed mail or user addressed mail with reference to the presence or absence of the "x-unidto:" header, with some differences. The differences will be described next.

First, in the mail determination means 12 shown in FIG. 2, when mark data is included in a field value of the "In-Reply-To:" header of the received electronic mail, the electronic mail is determined to be target addressed mail. When mark data is not included, the mail is determined to be user addressed mail.

In the decode means 17, upon generation of target addressed forwarding mail, mark data is deleted from a field value of the "In-Reply-To:" header of the target addressed mail. It is noted that processing which generates the target addressed forwarding mail based on the target addressed mail may be referred to as "outbound transfer processing."

In the encode means 14, upon generation of user addressed forwarding mail, mark data is added to a field value of the "message-ID:" header of the user addressed mail. It is noted that processing which generates the user addressed forwarding mail based on the user addressed mail may be referred to as"inbound transfer processing."

In the connection generation means 19, upon generation of template mail, mark data is added to a field value of the "message-ID:" header of connection issuance requesting mail.

In Step S2 shown in FIG. 5, the CPU 42 of the mail server device 4 determines whether or not mark data is included in a field value of the "In-Reply-To:" header of the received electronic mail.

When no mark data is included in the field value of the "In-Reply-To:" header, processing is executed in a similar manner as an embodiment where no "x-unidto:" header is provided. When mark data is included in the field value of the "In-Reply-To:" header, processing is executed in a similar manner as an embodiment where the "x-unidto:" header is provided.

FIG. 21 illustrates an arrangement of connection issuance requesting mail 191 which has been transmitted from the mail transmitting/receiving device 6 of the registered user, and arrangement of template mail 192 which has been transmitted from the mail server device 4.

In the new connection generation processing shown in FIG. 6, upon generation of template mail, mark data is added to a field value of the "message-ID:" header of the connection issuance requesting mail 191 and used as a field value of the "message-ID:" header. In this example, a character string of "x-unidto." is added as the mark data before a field value of the "message-ID:" header of the connection issuance requesting mail 191 is given as a field value of the "message-ID:" header of the template mail.

As described above, the template mail 192 which has been transmitted from the mail server device 4 is transmitted to a source actual address of the mail transmitting/receiving device 6 of a registered user. The registered user who has received the template mail 192 rewrites the text and replies and, this is generated as target addressed mail. Upon reply, the field value of the "message-ID:" header of the template mail is transcripted as a field value of the "In-Reply-To:" header of the target addressed mail.

FIG. 22 illustrates an arrangement of target addressed mail 193 replied from the mail transmitting/receiving device 6 of the registered user, and an arrangement of target addressed forwarding mail 194.

In the header decode processing shown in FIG. 8, in basic header decode processing (Step S41), mark data is deleted from the field value of the "In-Reply-To:" header of the received target addressed mail 193 (refer to FIG. 22). This is generated as a field value of the "In-Reply-To:" header of the target addressed forwarding mail 194.

Then, a header name of a "to:" header of the target addressed mail 193 is changed to "from:", and added is the "to:" header in which a field value is a destination actual address 27d. In this embodiment, irrespective of what is a reply source actual address which is an actual source of user addressed mail, as a field value of the "to:" header of target addressed forwarding mail which is a reply to the user addressed mail, a destination actual address 27d registered in the connection table 27 is used. That is, in this embodiment, only the destination actual address corresponds to the above described target actual address.

According to the above described arrangement, for example, even when target addressed forwarding mail is illegally acquired by a third party and user addressed mail is transmitted to the registered user from an electronic mail address of the third party, a reply to the user addressed mail from the registered user is transmitted to the destination actual address 27d registered in the connection table 27. Therefore, fraud can be found earlier to prevent damage from spreading.

Then, when a reply source actual address of the user addressed mail is an electronic mail address other than the destination actual address 27d registered in the connection table 27, the reply source actual address is added to a part of the user addressed forwarding mail, for example, to a first line of the text.

The above arrangement has been made, with consideration given to such a possibility that a target who has received the target addressed forwarding mail may reply from an electronic mail address other than the destination actual address 27d registered in the connection table 27. Further, the above arrangement makes it possible to promote awareness of a registered user who has received the user addressed forwarding mail.

In the basic header decode processing shown in FIG. 8, there is no change in field value of the "message-ID:" header.

In this embodiment, of the header decode processing shown in FIG. 8, processing related to the "cc:" header (Step S42 and Step S43) is not executed.

FIG. 23 illustrates an arrangement of user addressed mail 195 replied from the mail transmitting/receiving device 6 of a target to the target addressed forwarding mail 194 and an arrangement of user addressed forwarding mail 196.

Of the header encode processing shown in FIG. 9, in basic header encode processing (Step S52), the mark data is added to a field value of the "message-ID:" header of the received user addressed mail 195 (refer to FIG. 23), which is used as a field value of the "message-ID:" header of the user addressed forwarding mail 196.

In the basic header encode processing, the "In-Reply-To:" header is not changed in field value.

In this embodiment, of the header encode processing shown in FIG. 9, processing related to the "cc:" header (Step S53 and Step S54) is not executed.

When the target addressed forwarding mail 194 shown in FIG. 22 is replied from the mail transmitting/receiving device 6 of a target, a field value of the "message-ID:" header of the target addressed forwarding mail 194 is transcripted as a field value of the "In-Reply-To:" header of the user addressed mail 195. This is similar to a case of reply to the above described template mail 192.

A registered user who has received the user addressed forwarding mail 196 rewrites the text thereof. Electronic mail retransmitted (that is, replied to the target) is also handled as target addressed mail and processed in a similar manner as the above described target addressed mail 193 (refer to FIG. 22).

In reply to a target with regard to the user addressed forwarding mail 196, a field value of the "message-ID:" header of the user addressed forwarding mail 196 is transcripted as a field value of the "In-Reply-To:" header of the target addressed mail 193. This is similar to a case of a reply to the above described target addressed forwarding mail 194.

Now, in this embodiment, a series of electronic mail exchanged between the mail transmitting/receiving device 6 of the registered user and the mail transmitting/receiving device 6 of the target is configured to display a so-called thread in which, for example, a correlation (parent-child relationship) of reply or forwarding is listed in a tree structure on the display device 64 of the mail transmitting/receiving device 6.

Figure 31A:
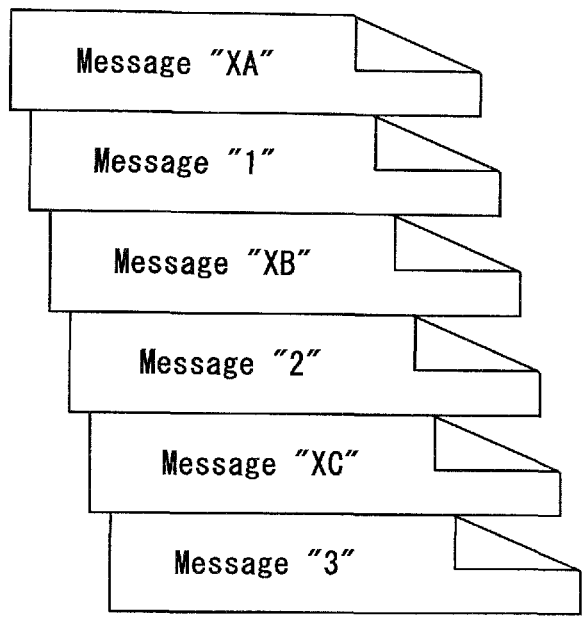
FIG. 31A is a drawing which shows one example of a thread normally displayed on the mail transmitting/receiving device 6 of the registered user.
Figure 31B:
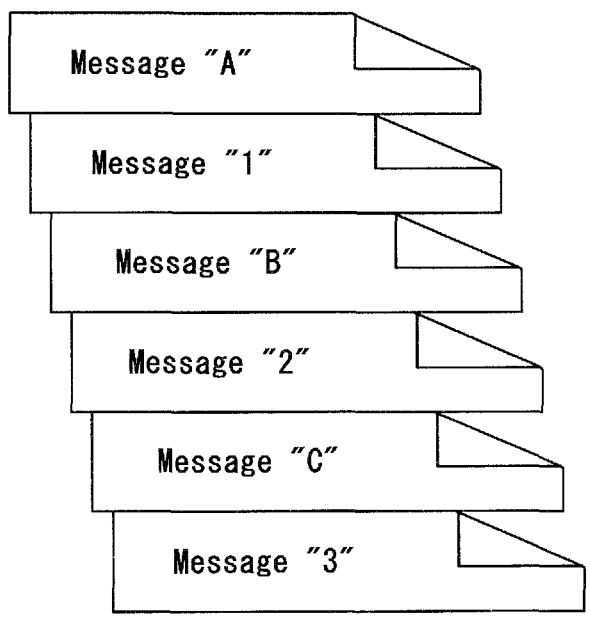
FIG. 31B is a drawing which shows one example of a thread normally displayed on the mail transmitting/receiving device 6 of the target.

FIG. 31A is a drawing which shows one example of a thread which is normally displayed on the mail transmitting/receiving device 6 of the registered user. FIG. 31B is a drawing which shows one example of a thread which is normally displayed on the mail transmitting/receiving device 6 of the target.

Various methods for displaying the thread are available. However, in this embodiment, a description will be given of a case where a "References:" header is used.

Where the received electronic mail is reply mail or forwarded mail, the "References:" header is a header for identifying the reply original mail of reply mail or forwarded mail (original electronic mail) and where the reply original mail is reply mail or forwarded mail, the "References:" header is a header for sequentially describing identification of the reply original mail of the received electronic mail in a retrospective manner so as to identify reply original mail of the reply original mail concerned and soon. In this embodiment, a header such as the "References:" header is from time to time referred to as a "reply original mail identification history header."

In general, as a field value of the "References:" header of the reply mail or forwarded mail, a field value of the "In-Reply-To:" header of the reply mail or forwarded mail is added in a sequential manner.

As described above, as a field value of the "In-Reply-To:" header, a field value of the message-ID:" header of the reply original mail is transcripted. Thus, in the end, as a field value of the "References:" header, field values of the "message-ID:" header of each reply original mail up to the electronic mail concerned are to be enlisted in a sequential manner.

Figure 29:
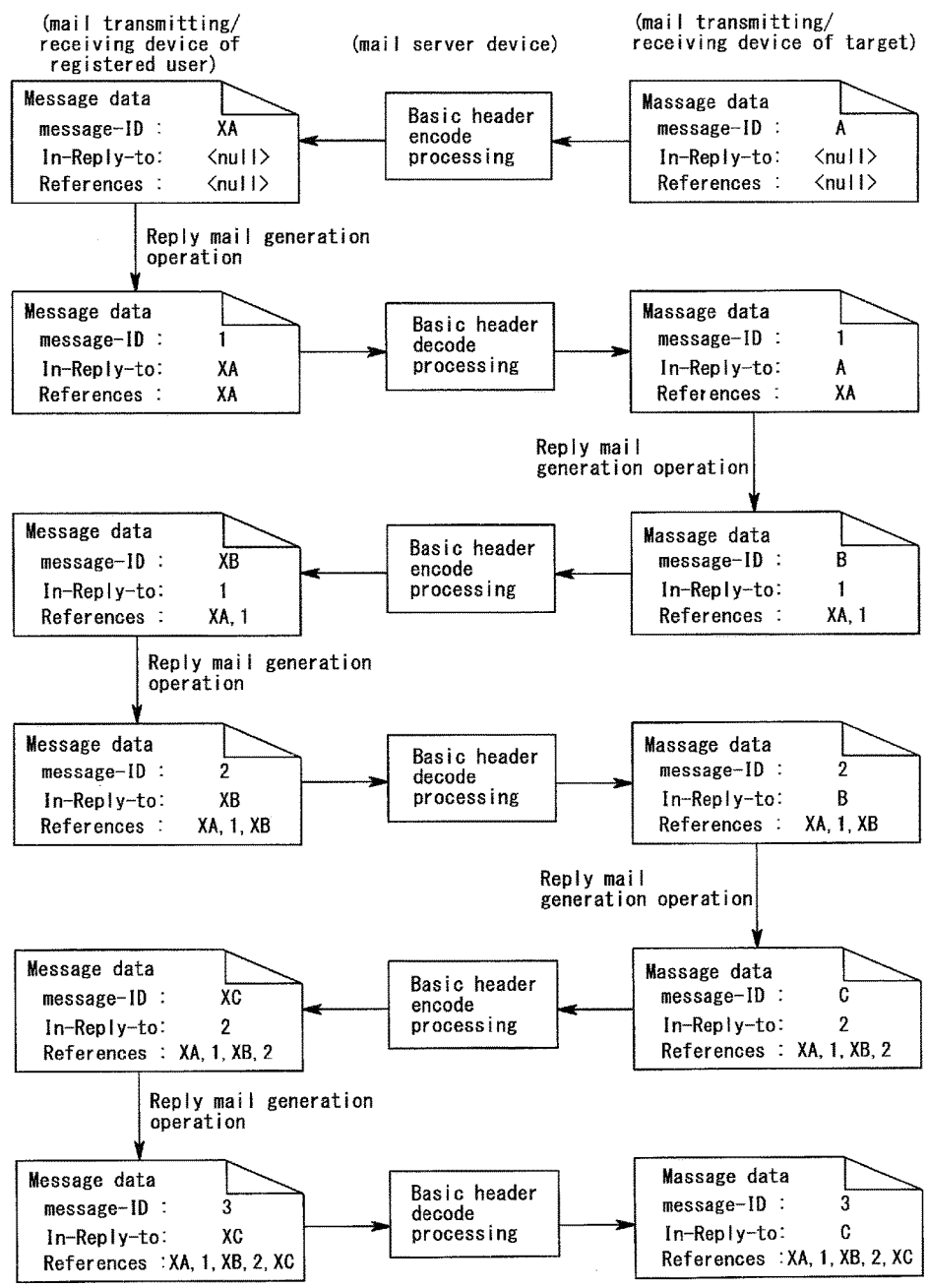
FIG. 29 is a drawing which describes a situation on the assumption that reply of a message is iterated between the mail transmitting/receiving device 6 of a target and the mail transmitting/receiving device 6 of a registered user without execution of any special processing.

FIG. 29 is a drawing which describes an embodiment in which, without executing special processing to be described later, electronic mail (hereinafter, may be referred to as "message") is replied repeatedly between the mail transmitting/receiving device 6 of the target and the mail transmitting/receiving device 6 of the registered user. FIG. 29 is also a drawing which describes headers of messages at each step during the transmission and receiving of electronic mail.

In FIG. 29, for the sake of description, of data which configures messages at each stage of processing (hereinafter may be referred to as "message data"), only the "message-ID:" header, the "In-Reply-To:" header and the "References:" header are described.

FIG. 29 shows an example in which messages have been transmitted to and received from continuously three times, beginning with a message of the uppermost right side and ending with a message of the lowermost right side, between the mail transmitting/receiving device 6 of the target and the mail transmitting/receiving device 6 of the registered user. In this example, for the sake of description, field values of the "message-ID:" header of the user addressed mail are given in sequence as "A," "B" and "C," and field values of the "message-ID:" header of the target addressed mail are given in sequence as "1," "2" and "3," with the mark data given as "X."

Therefore, message data of the message of the uppermost right side given in FIG. 29 (equivalent to "user addressed mail") is expressed as follows:
message-ID: A
In-Reply-To: <null>
References: <null>

Message data of the message of the uppermost left side given in FIG. 29 (equivalent to "user addressed forwarding mail") acquired by subjecting the user addressed mail to the basic header encode processing is expressed as follows:
message-ID: XA
In-Reply-To: <null>
References: <null>

Message data of the message of the second-stage left side given in FIG. 29 (equivalent to "target addressed mail") generated as reply mail to the user addressed forwarding mail is expressed as follows:
message-ID: 1
In-Reply-To: XA
References: XA Message data of the message of the second-stage right side given in FIG. 29 (equivalent to "target addressed forwarding mail") acquired by subjecting the target addressed mail to the basic header decode processing is expressed as follows:
message-ID: 1
In-Reply-To: A
References: XA Further, message data of the message of the third-stage right side given in FIG. 29 (equivalent to "user addressed mail") generated as reply mail to the target addressed forwarding mail is expressed as follows:
message-ID: B
In-Reply-To: 1
References: XA, 1

Similar processing is repeated hereinafter. As a result, the mail transmitting/receiving device 6 of the target on the right side of FIG. 29 stores three transmitted messages (user addressed mail) with respective field values of the "message-ID:" header of "A," "B" and "C", and three received messages (target addressed forwarding mail) with respective field values of the "message-ID:" header of "1," "2" and "3," for a total of six messages.

On the other hand, the mail transmitting/receiving device 6 of the registered user on the left side of FIG. 29 stores three received messages (user addressed forwarding mail) with respective field values of the "message-ID:" header of "XA," "XB" and "XC," and three transmitted messages (target addressed mail) with respective field values of the "message-ID:" header of "1," "2" and "3," for a total of six messages.

In this embodiment, for the sake of description, field values of the "message-ID:" header may be used to identify a message. For example, messages in which field values of the "message-ID:" header are given as "A," "XA" and "1" may be respectively expressed as a message "A," a message "XA" and a message "1."

Now, a thread expression in the mail transmitting/receiving device 6 of the registered user upon complete transmission of the message "3" described at the lowermost stage left side in FIG. 29 is made according to field values of the "References:" header and those of the "message-ID:" header of the message. That is, six messages stored in the mail transmitting/receiving device 6 of the registered user are displayed in the order of a message "XA," a message "1," a message "XB," a message "2," a message "XC" and a message "3." Then, the thread is made up of these messages.

The thread thus displayed is, for example, as shown in FIG. 31A. The thread is displayed in a manner that indicates a parent-child relationship of each message making up the thread. In this example, a reply message (child message) to a message (parent message) is displayed by being placed on the right side so as to deviate from the parent message.

According to FIG. 31A, a reply to the message "XA" is the message "1," a reply to the message "1" is the message "XB," and a reply to the message "XC" is the message "3."

To display the thread, there are no particular limitations on what data of each message is to be displayed. For example, a "subject" and/or a "text" of each message can be displayed as data of each message which configures the thread.

Next, a description will be given of the display of the thread in the mail transmitting/receiving device 6 of the target upon completely receiving of the message "3" described on the lowermost right side in FIG. 29.

Field values of the "References:" header of the message "3" stored in the mail transmitting/receiving device 6 of the target are the same as the field values of the "References:" header of the message "3" stored in the mail transmitting/receiving device 6 of the registered user, that is, "XA, 1, XB, 2, XC." A field value of the "message-ID:" header is "3." However, as described above, the messages stored in the mail transmitting/receiving device 6 of the target are the message "A," the message "B," the message "C," the message "1," the message "2" and the message "3," but the message "XA," the message "XB" and the message "XC" are not stored.

The message "XA," the message "XB" and the message "XC" stored in the mail transmitting/receiving device 6 of the registered user are those in which mark data "X" is added to the field values of the "message-ID:" header by the above-described basic header encode processing. They are substantially the same messages as the message "A," the message "B" and the message "C", respectively, which are stored in the mail transmitting/receiving device 6 of the target.

Although they are substantially the same messages, if each of which has a different field value in the "message-ID:" header, they are determined to be a different message. Thus, in the mail transmitting/receiving device 6 of the target, there is found a disadvantage that a message identified by a field value of the "References:" header does not exist as an actually stored message, that is, a disadvantage that the message does not conform to an actually stored message. Thus, there is a problem that the thread may not be properly displayed.

Therefore, in this embodiment, special processing is executed for avoiding the above-described disadvantage. That is, both in the mail transmitting/receiving device 6 of the registered user and the mail transmitting/receiving device 6 of the target, processing is executed such that field values of the "References:" header are respectively adjusted so as to conform to the actually stored messages (this processing is referred to as "reply original mail identification history header adjustment processing").

Figure 30:
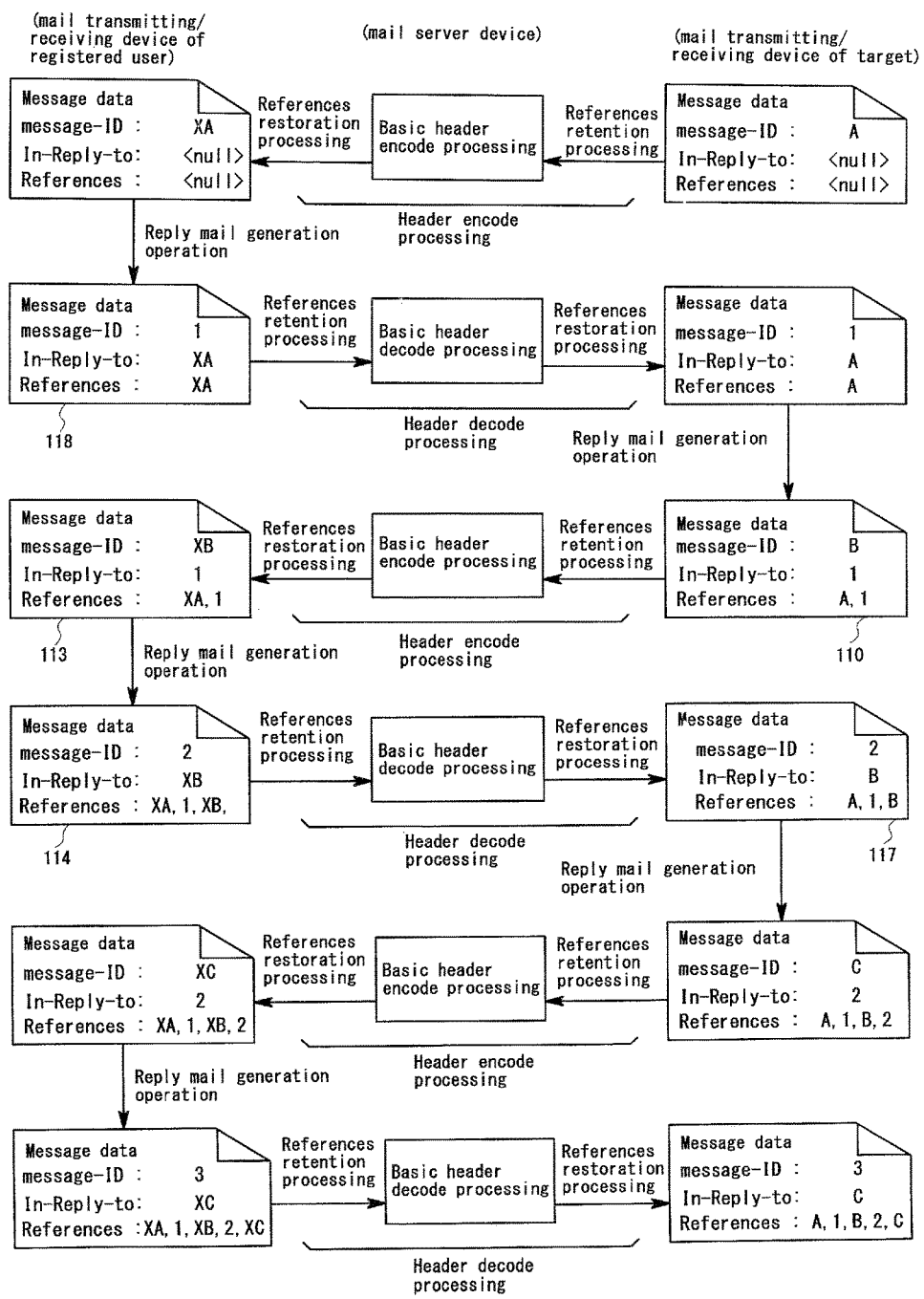
FIG. 30 is a drawing which describes a situation that during execution of the reply original mail identification history header adjustment processing, reply of a message is iterated between the mail transmitting/receiving device 6 of the target and the mail transmitting/receiving device 6 of the registered user.

FIG. 30 is a drawing which describes an embodiment where, while the reply original mail identification history header adjustment processing is executed, messages are transmitted to and received from repeatedly between the mail transmitting/receiving device 6 of the target and the mail transmitting/receiving device 6 of the registered user. This corresponds to FIG. 29.

In an example shown in FIG. 30, an arrangement is made such that References retention processing is executed each time prior to the basic header encode processing and the basic header decode processing. References restoration processing is also executed each time after the basic header encode processing and the basic header decode processing. The References retention processing and References restoration processing correspond to the reply original mail identification history header adjustment processing.

That is, in the example shown in FIG. 30, both the header encode processing and the header decode processing are configured to include the reply original mail identification history header adjustment processing.

Figure 24:
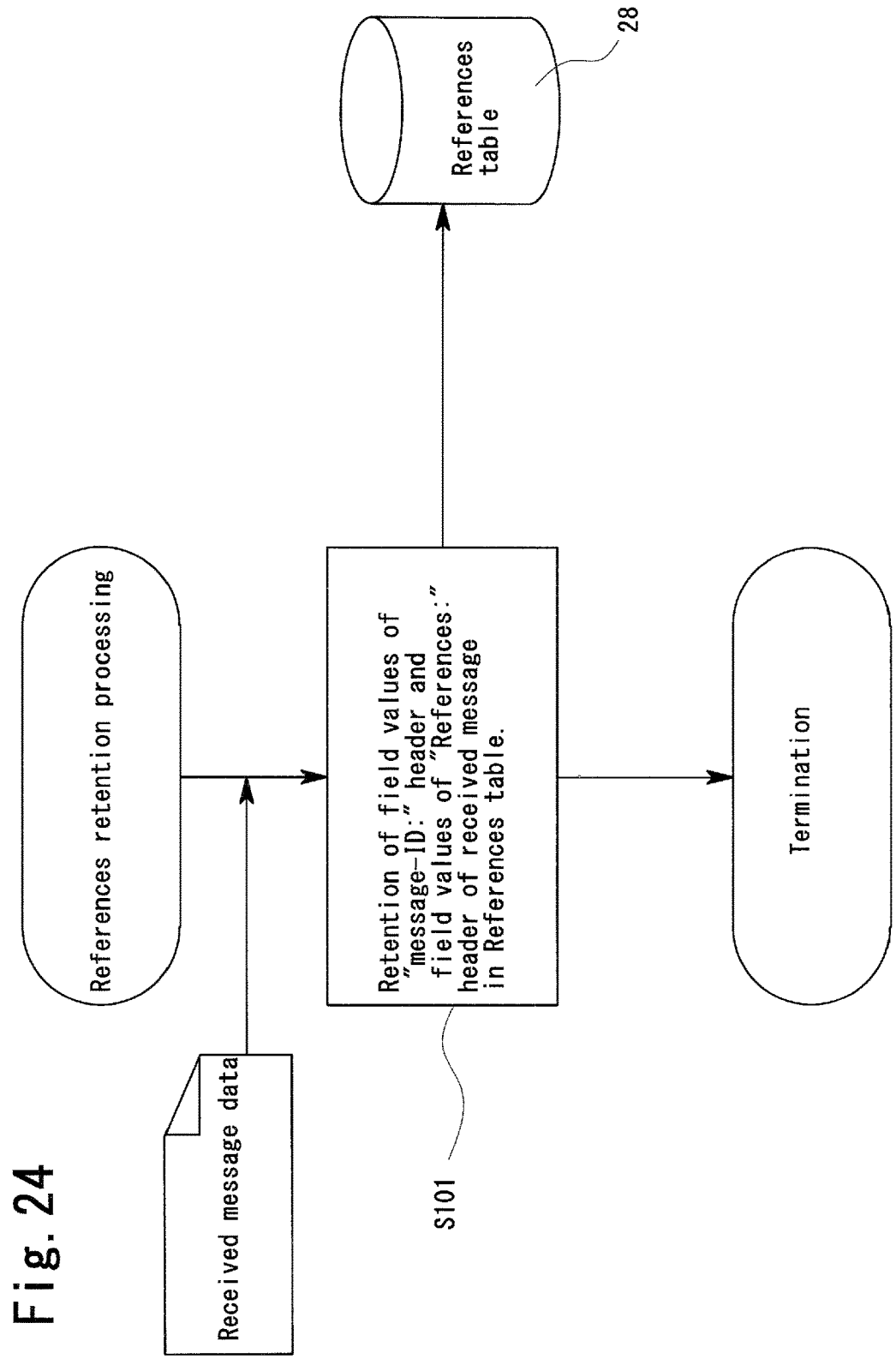
FIG. 24 is a flowchart which shows one example of References retention processing which configures reply original mail identification history header adjustment processing.
Figure 25:
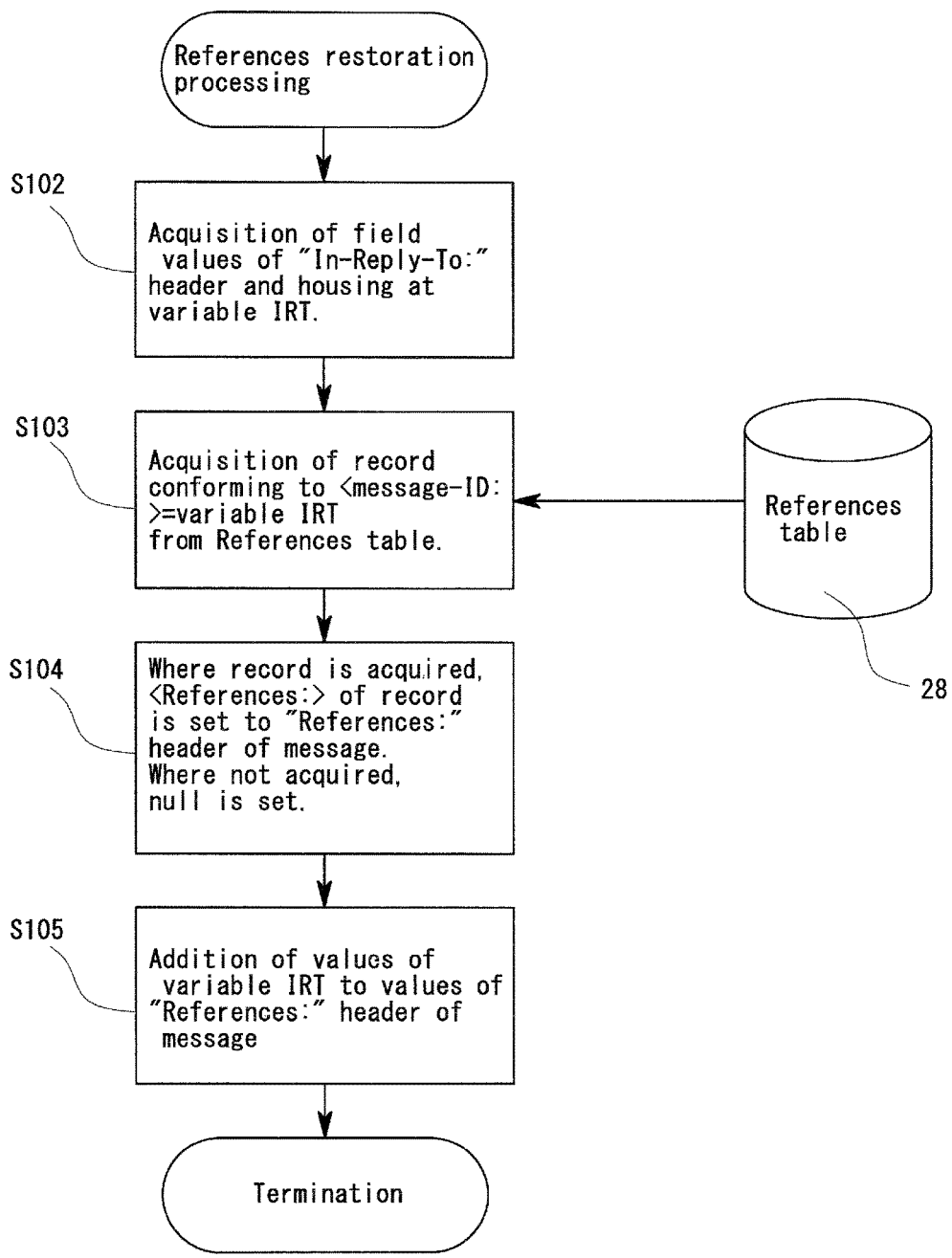
FIG. 25 is a flow chart which shows one example of References restoration processing which configures reply original mail identification history header adjustment processing.

FIG. 24 is a flow chart which shows one example of the References retention processing which configures the reply original mail identification history header adjustment processing. FIG. 25 is a flow chart which shows one example of the References restoration processing which configures the reply original mail identification history header adjustment processing. FIG. 26 is a drawing which shows one example of data arrangement of the References table 28 used in the reply original mail identification history header adjustment processing.

A description will be given of the reply original mail identification history header adjustment processing based on FIG. 24 to FIG. 26, and FIG. 30. As shown in FIG. 30, the References retention processing is executed each time prior to the basic header encode processing and the basic header decode processing.

As shown in FIG. 24, in the References retention processing, field values of the "message-ID:" header and field values of the "References:" header of a received message are mutually associated to give a record. And the record is retained in the References table 28 which configures the database 25 (Step S01).

As shown in FIG. 30, after the References retention processing, the basic header encode processing and the basic header decode processing are individually executed. Subsequently, each of the processing is subjected to the References restoration processing.

As shown in FIG. 25, in the References restoration processing, at first, a field value of the "In-Reply-To:" header is stored as a variable IRT (Step S102).

Next, from data retained in the References table 28, there is extracted a record in which the field value of the "message-ID:" header is equal in value to the variable IRT (Step S103).

In Step S103, where a corresponding record is found, a field value of the "References:" header of the record concerned is set as a field value of the "References:" header of the message concerned (Step S104).

In Step S103, where a corresponding record is not found, "null" is set as a field value of the "References:" header of the message concerned (Step S104).

Next, the same value as the variable IRT is added to the field value of the "References:" header of the message concerned (Step S105).

Figure 27:
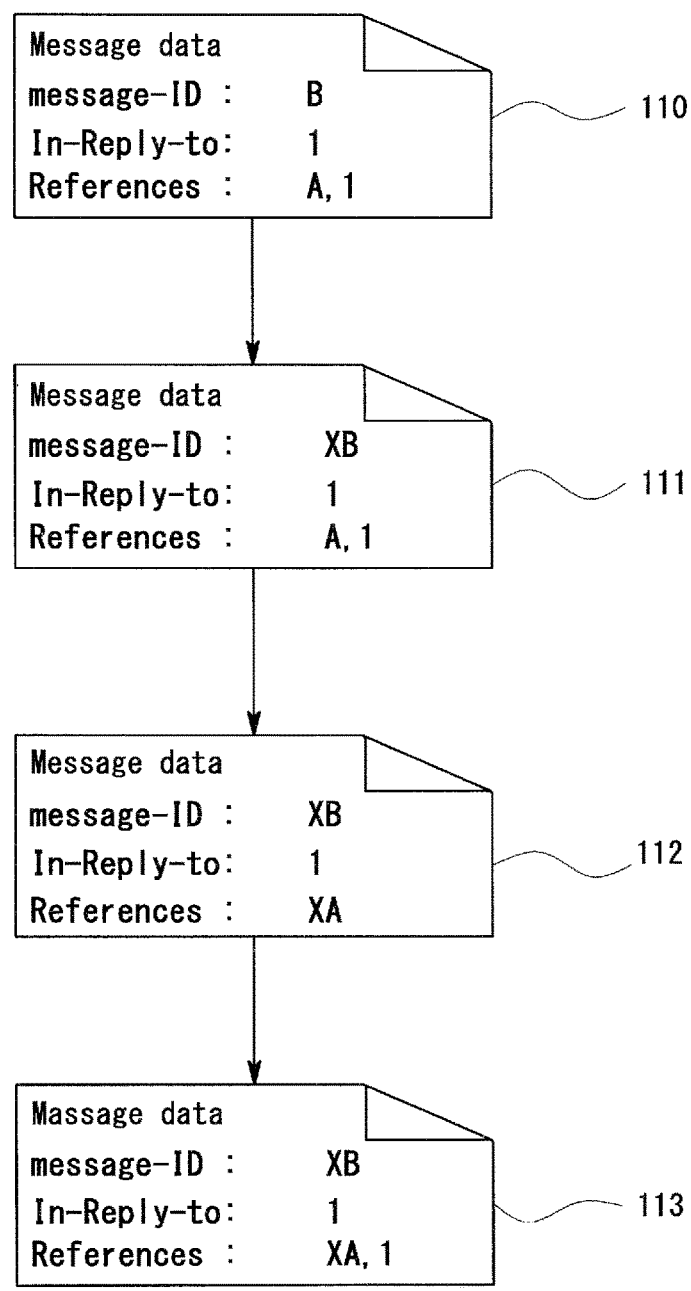
FIG. 27 is a drawing which describes transition of message data in the reply original mail identification history header adjustment processing which is executed in the header encode processing.
Figure 28:
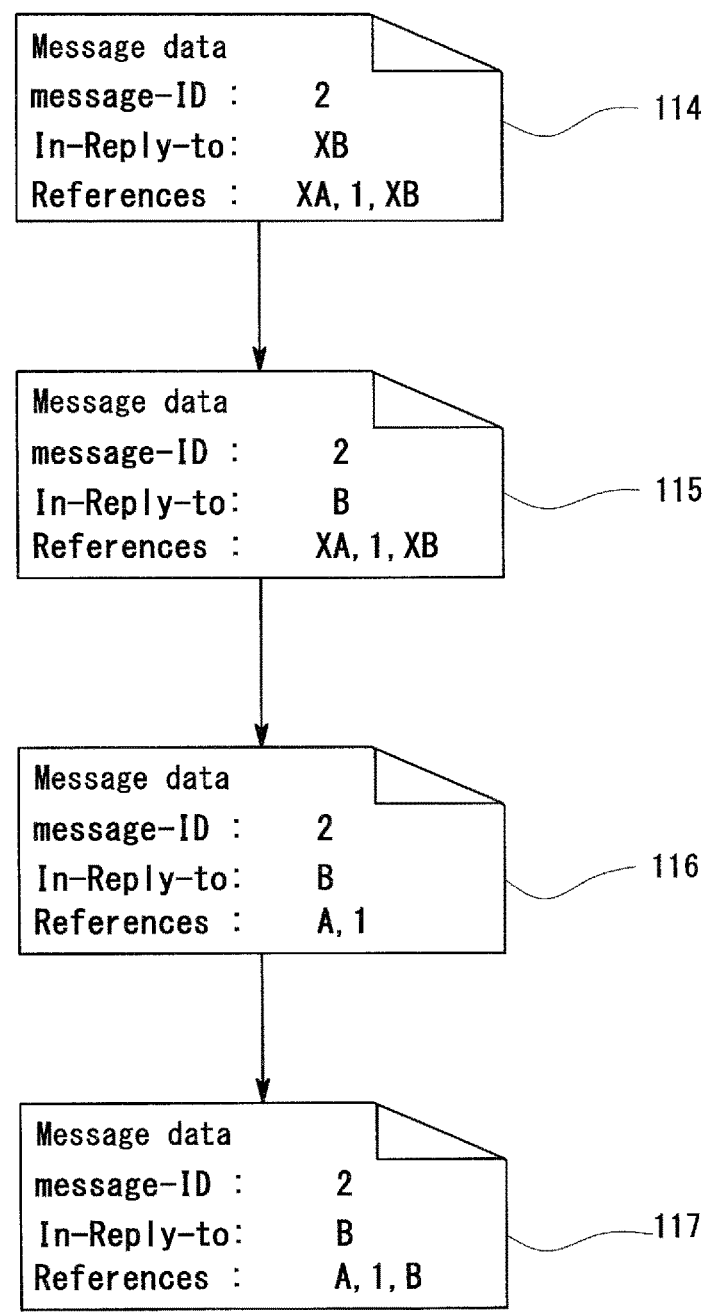
FIG. 28 is a drawing which describes transition of message data in the reply original mail identification history header adjustment processing which is executed in the header decode processing.

FIG. 27 is a drawing which describes transition of message data in the reply original mail identification history header adjustment processing executed in the header encode processing. FIG. 28 is a drawing which describes transition of message data in the reply original mail identification history header adjustment processing executed on the header decode processing.

As shown in FIG. 27, in the reply original mail identification history header adjustment processing executed in the header encode processing, the message data undergoes transition from message data 110 to message data 113.

The message data 110 is message data before and after execution of the References retention processing (Step S101). The message data 111 is message data after execution of the basic header encode processing (Step S52). The message data 112 is message data after execution of Step S104 in the References restoration processing. The message data 113 is message data after execution of Step S105 in the References restoration processing.

As shown in FIG. 28, in the reply original mail identification history header adjustment processing executed on the header decode processing, message data undergoes transition from message data 114 to message data 117.

The message data 114 is message data before and after the References retention processing (Step S101). The message data 115 is message data after execution of the basic header decode processing (Step S41). The message data 116 is message data after execution of Step S104 in the References restoration processing. The message data 17 is message data after execution of Step S105 in the References restoration processing.

As shown in FIG. 30, the reply original mail identification history header adjustment processing is executed, by which field values of the "References:" header of the message "3" stored in the mail transmitting/receiving device 6 of the target are given as "A, 1, B, 2, C" and conformable to the message "A," the message "B," the message "C" the message "1" and the message "2" stored in the mail transmitting/receiving device 6 of the target.

Further, field values of the "References:" header of the message "3" stored in the mail transmitting/receiving device 6 of the registered user are given as "XA, 1, XB, 2, XC" and conformable to the message "XA," the message "XB," the message "XC," the message "1" and the message "2" which are stored in the mail transmitting/receiving device 6 of the registered user.

As described above, the reply original mail identification history header adjustment processing is executed in the header encode processing and the header decode processing. Therefore, both in the mail transmitting/receiving device 6 of the registered user and the mail transmitting/receiving device 6 of the target, the respective field values of the "References:" header are conformable to the actually stored messages. As a result, the thread is normally displayed both in the mail transmitting/receiving device 6 of the registered user and the mail transmitting/receiving device 6 of the target (refer to FIG. 31A and FIG. 31B).

In this embodiment, the reply original mail identification history header adjustment processing is configured with the References retention processing and the References restoration processing. The References retention processing is executed each time prior to the basic header encode processing and the basic header decode processing, and the References restoration processing is executed each time after the basic header encode processing and the basic header decode processing. However, the reply original mail identification history header adjustment processing shall not be limited to the above-described arrangement.

The reply original mail identification history header adjustment processing may be performed as follows.

The reply original mail identification history header adjustment processing is such that in the header encode processing (more commonly, inbound transfer processing), field values of the "In-Reply-To:" header (reply original mail identification header) of the user addressed forwarding mail 113, that is, field values of the "message-ID:" header (mail identification header) of the target addressed mail 118, are added to field values of the "References:" header (reply original mail identification history header) of target addressed mail 118 corresponding to reply original mail of user addressed forwarding mail 113. The results thus obtained are provided as the field values of the "References:" header of the user addressed forwarding mail 113. In the header decode processing (more commonly, outbound transfer processing), field values of the "In-Reply-To:" header of the target addressed forwarding mail 117, that is, field values of the "message-ID:" header of the user addressed mail 110 are added to field values of the "References:" header of user addressed mail 110 corresponding to reply original mail of target addressed forwarding mail 117. The results thus obtained are provided as field values of the "References:" header of the target addressed forwarding mail 117.

Further, the reply original mail identification history header adjustment processing shall not be limited to the above described processing. In brief, in the header encode processing (more commonly, inbound transfer processing) and/or the header decode processing (more commonly, outbound transfer processing), the respective field values of the "References:" header may be adjusted so as to be conformable to the actually stored messages both in the mail transmitting/receiving device 6 of the registered user and the mail transmitting/receiving device 6 of the target.

In each of the above-described embodiments, each of the mail server device and the mail transmitting/receiving device is configured with one computer. The present disclosure shall not be, however, limited thereto. The mail server device may be made up of two or more computers. In this case, the two or more computers may be connected via the above-described information communication means 8.

Further, the mail transmitting/receiving device can be configured with two or more computers. In this case as well, the two or more computers may be connected via the information communication means 8.

Figure 20:
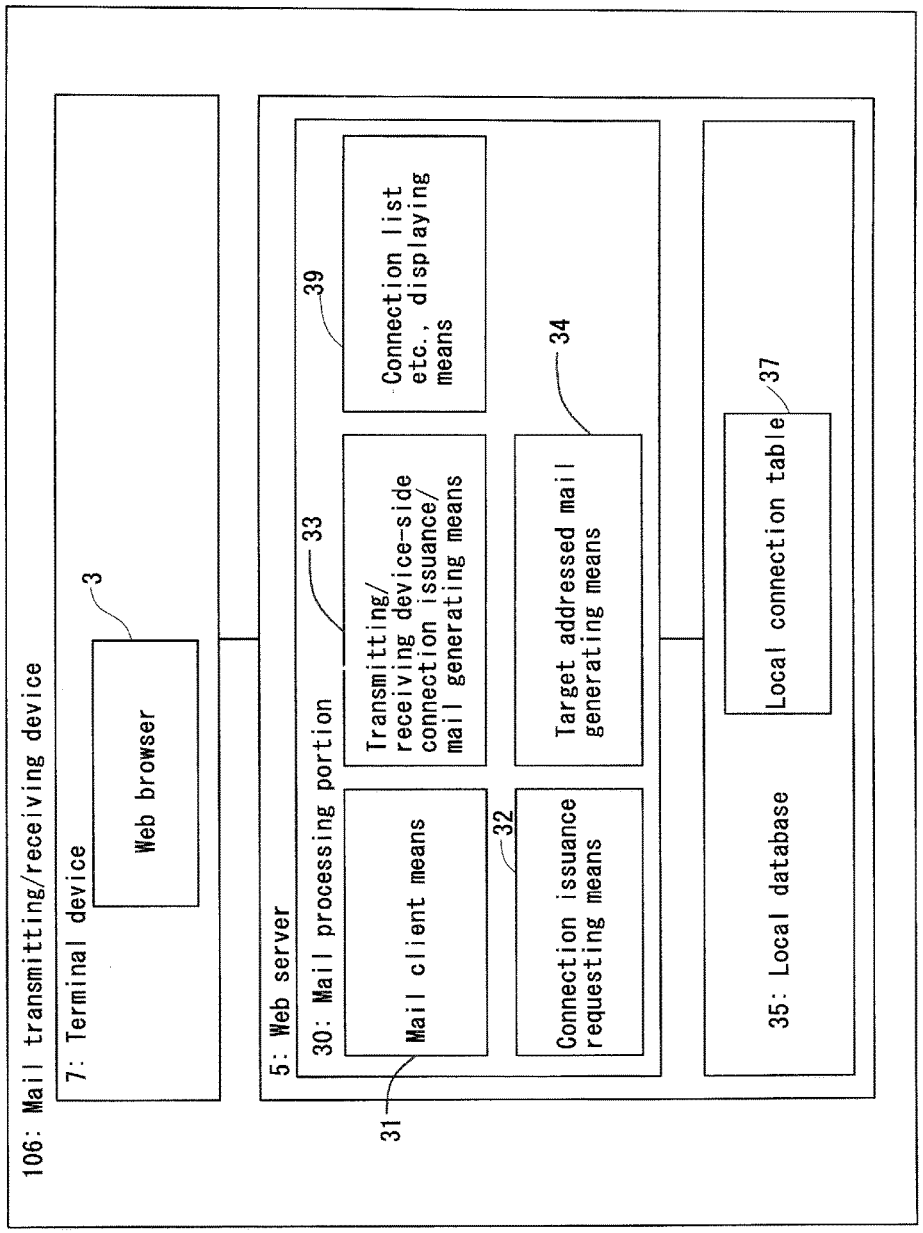
FIG. 20 is a block diagram which illustrates an arrangement of a mail transmitting/receiving device 106 configured with two or more computers.

FIG. 20 is a block diagram which shows an example of a mail transmitting/receiving device 106 that is configured with two or more computers. The mail transmitting/receiving device 106 is provided with a terminal device 7 and a web server 5.

A hardware arrangement of the terminal device 7 is similar to that of the mail transmitting/receiving device 6 shown in FIG. 4. A hardware arrangement of the web server 5 is similar to that of the mail server device 4 shown in FIG. 4, where the web server is configured with one computer.

When the web server 5 is configured with two or more computers, an arrangement of each computer is similar to that of the mail server device 4 shown in FIG. 4.

For example, the terminal device 7 is able to communicate with the web server 5 via the information communication means 8. When the web server 5 is configured with two or more computers, these computers are able to communicate with each other, for example, via the information communication means 8.

The terminal device 7 is provided with a web browser 3.

FIG. 20 shows a state where a registered user logs onto a web page dedicated to the registered user (hereinafter, referred to as "dedicated page") on the web server 5 via the web browser 3 of the terminal device 7.

In this state, the web server 5 is configured to perform similar functions as those of the mail processing portion 30 and the local database 35 of the mail transmitting/receiving device 6 shown in FIG. 3. As shown in FIG. 20, components of the web server 5 having similar functions as the components of the mail transmitting/receiving device 6 shown in FIG. 3 are given the same reference numerals. The local database 35 is made up of only data related to the registered user concerned.

That is, in the mail transmitting/receiving device 106, functions corresponding to the mail processing portion 30 and the local database 35 of the mail transmitting/receiving device 6 are provided from the web server 5 according to an ASP (Application Service Provider) method.

In other words, in a state where the registered user logs onto a dedicated page of the registered user, on execution of the above-described mail processing (refer to FIG. 17 and FIG. 19), the mail transmitting/receiving device 106 made up of the terminal device 7 and the web server 5 is a device which is equivalent to the mail transmitting/receiving device 6 shown in FIG. 3.

The mail transmitting/receiving device 106 is used in the following manner. Here, it is assumed that an identification indicator (hereinafter, referred to as "log-in ID") and a log-in password are provided in advance in order to log onto the dedicated page of the registered user.

The registered user inputs the log-in ID and the log-in password via the web browser 3 of the terminal device 7, by which the user is able to log onto the dedicated page of the registered user.

When the registered user logs onto the dedicated page, a dedicated page is displayed on a display device of the terminal device 7 of the registered user. The dedicated page is similar to, for example, a display screen 80 shown in FIG. 18.

The registered user interacts (click or tap) with the dedicated page via the web browser 3 of the terminal device 7, by which mail processing similar to that by the mail transmitting/receiving device 6 is executed by the web server 5. The processing progress and results are displayed via the web browser 3 of the terminal device 7 on the display device.

As described so far, the terminal device 7 of the registered user and the web server 5 are integrated to configure the mail transmitting/receiving device 106 of the registered user. The registered user is not aware of the existence of the web server 5 and is able to perform operation as if the terminal device 7 itself would be the above-described mail transmitting/receiving device 6.

An arrangement shown in FIG. 20 illustrates the mail transmitting/receiving device 106 based on the ASP method. However, the arrangement of the mail transmitting/receiving device 106 shall not be limited thereto. For example, in FIG.

20, all functions of the mail processing portion 30 and the local database 35 of the mail transmitting/receiving device 106 are configured to be executed by the web server 5. However, these functions may also be processed in a collaborative manner between the web server 5 and the terminal device 7.

For example, in the mail processing portion 30, mail client means 31 may be installed on the terminal device 7, while other means are installed on the web server 5.

Even in the case of the above arrangement, when the registered user logs onto the dedicated page of the registered user, the mail transmitting/receiving device 106 made up of the terminal device 7 and the web server 5 is a device equivalent to the mail transmitting/receiving device 6 in terms of executing the above described mail processing.

The target is also able to transmit and receive electronic mail by using the mail transmitting/receiving device (for the sake of convenience, this is also referred to as the mail transmitting/receiving device 106) which is similar to the mail transmitting/receiving device 106. However, means other than the mail client means 31 are not required in the mail processing portion 30 of the mail transmitting/receiving device 106 of the target.

Further, in the electronic mail communication system 2 according to the present disclosure, both the registered user and the target are able to use the mail transmitting/receiving device 106, or one of them is able to use the mail transmitting/receiving device 106 and the other is able to use the mail transmitting/receiving device 6. Furthermore, they may use any one of the mail transmitting/receiving device 106 and the mail transmitting/receiving device 6, depending on the situation.

Step S1 shown in FIG. 5 corresponds to the mail receiving means 11 which configures the transfer processing portion 10 of the mail server device 4 shown in FIG. 2. Step S2 to Step S4 correspond to the mail determination means 12. Step S5 corresponds to the connection generation means 19. Step S7 corresponds to the expiration date update means 16. Step S8 corresponds to the decode means 17. Step S9 to Step S10 correspond to the validity determination means 13. Step S11 corresponds to the error mail transmitting means 18. Step S12 corresponds to the encode means 14.

Figure 10:
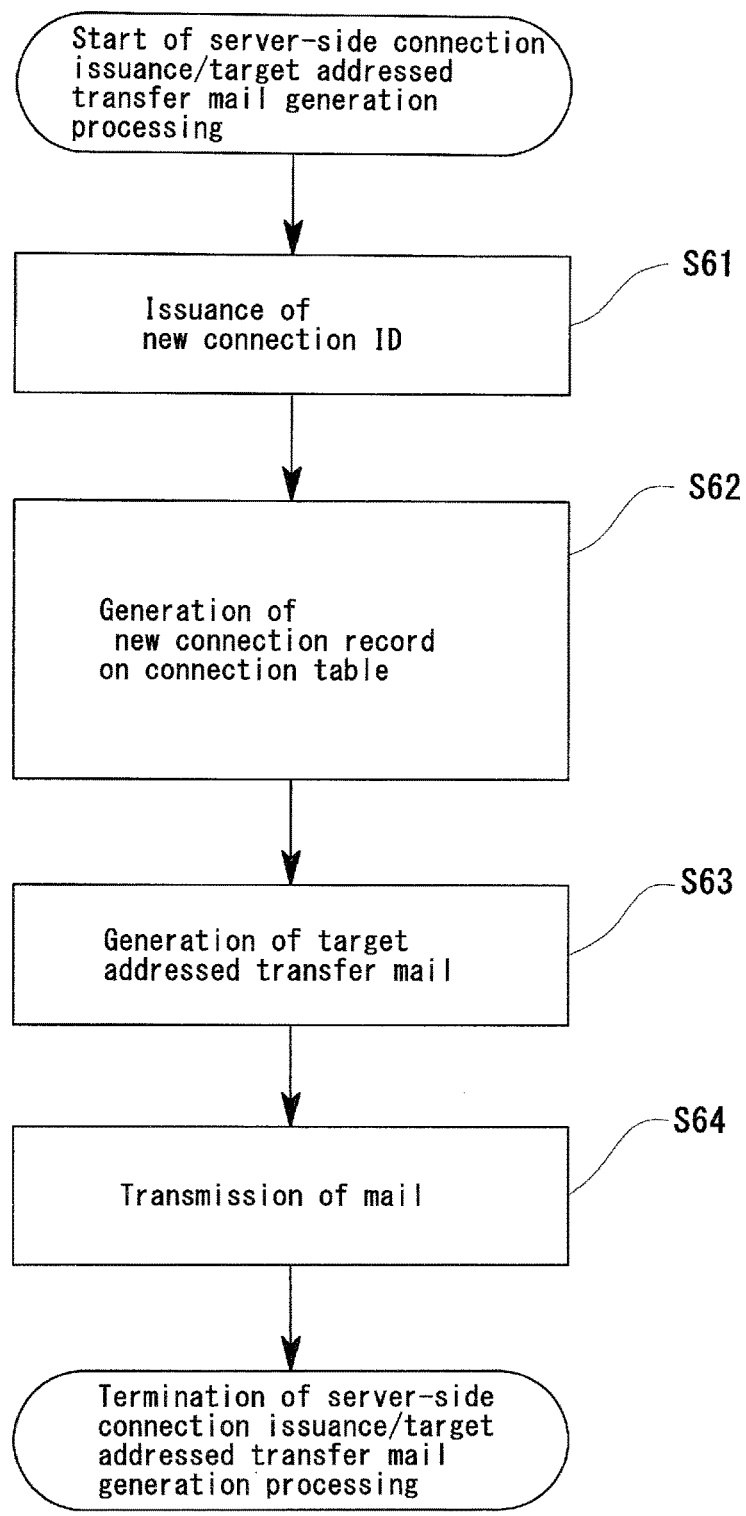
FIG. 10 is a flow chart which shows one example of server-side connection issuance/target addressed forwarding mail generation processing procedures in the mail server device 4.

Step S61 to Step S63 shown in FIG. 10 correspond to the connection generation/decode means 20. Then, Step S6 shown in FIG. 5 and Step S64 shown in FIG. 10 correspond to the mail transmitting means 15.

Step S71 shown in FIG. 17 corresponds to the displaying means 39 which configures the mail processing portion 30 of the mail transmitting/receiving device 6 shown in FIG. 3 or the mail transmitting/receiving device 106 shown in FIG. 20. Step S73 corresponds to the connection issuance requesting means 32. Step S75 corresponds to the target addressed mail generating means 34.

Step S74 shown in FIG. 17 (including Step S81 to Step S85 shown in FIG. 19) corresponds to the transmitting/receiving device-side connection issuance/mail generating means 33.

In this embodiment, as a record medium which stores programs on the side of the mail server device 4 of the electronic mail communication system 2 and as a record medium which stores programs on the side of the mail transmitting/receiving device 106, a hard disk attached to a HDD may be used. As a record medium which stores programs on the side of the mail transmitting/receiving device 6, a flash memory attached to a SSD may be used. However, a record medium which stores programs shall not be limited thereto. A record medium which stores programs includes, for example, an external memory card, a CD-ROM, a DVD-ROM, a flexible disk and an electromagnetic tape. A main storage device can also be used as a record medium which stores programs.

There are no particular limitations on a distributing mode of a program. The program may be distributed in a state where the program is stored in a record medium, or the program may be distributed via wire or wireless information communication means.

There are no particular limitations on a recording mode of a program. The program may be stored in a record medium or distributed so as to be directly executed. Alternatively, for example, the program may be stored in a record medium or distributed in a state of compression so as to be used after decompression.

In each of the above-described embodiments, a computer is used to perform each of the functions shown in FIG. 2 and FIG. 3 or FIG. 20. However, a part or a whole of the functions may also be configured by using hardware logic.

Further, the above-described block diagrams, arrangements of hardware, flow charts, arrangements of database, arrangements of electronic mail etc., are only examples. The present disclosure shall not be limited thereto.

The electronic mail communication system according to the first embodiment as described in the present disclosure is provided with a plurality of mail transmitting/receiving devices, each of which has a mail processing portion configured to transmit and receive electronic mail, and a mail server device configured to communicate with the mail transmitting/receiving device via information communication means. The mail server device is provided with a database which stores a target actual address, which is an electronic mail address of a target for transmitting electronic mail. The database also stores a user actual address, which is an electronic mail address of a registered user for receiving electronic mail replied from the target in association with a connection identification indicator corresponding to a connection address, which is a temporary electronic mail address of the registered user and an electronic mail address under the control of the mail server device. Each mail transmitting/receiving device is also provided with a transfer processing portion which executes forwarding of electronic mail based on data stored in the database. The transfer processing portion is provided with mail receiving means which receives electronic mail from the mail transmitting/receiving device via the information communication means. The transfer processing portion is also provided with a mail determination means which determines whether the electronic mail received by the mail receiving means is target addressed mail to be transmitted from the registered user to the target, or user addressed mail to be transmitted from the target to the registered user, based on header information of the electronic mail. The transfer processing portion is also provided with a decode means which generates a target addressed forwarding mail, which is electronic mail in which a field value of a destination header indicating a destination of the target addressed mail is provided as the target actual address, and a field value of a source header indicating a source is provided as a connection address corresponding to the connection identification indicator. In this case, the mail determination means determines that the electronic mail is the target addressed mail. The transfer processing portion is also provided with an encode means which generates a user addressed forwarding mail, in which a field value of a destination header of the user addressed mail is provided as the user actual address, that is, user addressed forwarding mail in which a text of the user addressed forwarding mail is rewritten in the mail transmitting/receiving device which has received the user addressed forwarding mail and replied to generate the target addressed mail. In this case, the mail determination means determines that the electronic mail is the user addressed mail. The transfer processing portion is also provided with a mail transmitting means which transmits electronic mail generated in the decode means or the encode means, via the information communication means, according to the header information of the electronic mail.

Therefore, a field value of the source header of the target addressed mail transmitted from the registered user is rewritten into a connection address corresponding to a connection identification indicator to generate a target addressed forwarding mail, and the mail is transmitted to a target. When the target who has received the target addressed forwarding mail replies, a field value of a destination header of the user addressed mail which has been replied is rewritten into the user actual address to generate a user addressed forwarding mail and the mail can be forwarded to the registered user.

For this reason, if the target actual address is known, the registered user of the system stores in the database the target actual address and the personal user actual address in association with a connection identification indicator. It is therefore possible to transmit and receive electronic mail with any target who does not have a membership registration of the system, without disclosure of the personal user actual address to the target.

Further, the connection identification indicator corresponding uniquely to the connection address can be generated for each target actual address, or can be generated for each purpose even for the same target actual address.

For this reason, with regard to a target or a purpose for which information exchange by electronic mail is no longer needed, only a connection identification indicator corresponding thereto may be discharged. Thus, acceptance or rejection of mail for each target or each purpose can be controlled easily.

That is, it is possible to transmit and receive electronic mail with a target who does not have a membership registration without disclosure of a personal electronic mail address. Thus, it is also possible to devise an electronic mail communication system which allows easy control of the acceptance or rejection of mail.

Further, the user addressed forwarding mail is configured so that a text of the user addressed forwarding mail is rewritten by the mail transmitting/receiving device which has received the user addressed forwarding mail and replied, which is then given as target addressed mail.

Therefore, a general mail client program which is installed in the mail transmitting/receiving device of a registered user is used to rewrite the text of the received user addressed forwarding mail and to perform reply operation, thus making it possible to retransmit target addressed mail to a target (reply to the target).

For this reason, it is possible to exchange electronic mail easily and any times by using a mail transmitting/receiving device having a general mail client program with a target who does not have a membership registration without disclosure of a personal electronic mail address.

In an electronic mail communication system according to the second embodiment as described in the present disclosure, the encode means is configured so that a field value of the source header of the user addressed forwarding mail is provided as the connection address.

Therefore, when a registered user replies to the received user addressed forwarding mail to retransmit target addressed mail to a target (reply to the target), the retransmitted target addressed mail is inevitably transmitted via the mail server device, irrespective of a mail server designated by the mail client program of the mail transmitting/receiving device of the registered user which is used for retransmission.

For this reason, on re-transmission of the target addressed mail, the registered user is able to exchange electronic mail easily through any given personal electronic mail address (that is, mail account) with a target having no membership registration without disclosure of the personal electronic mail address by using the mail transmitting/receiving device with a general mail client program installed.

Further, the field value of the source header of the target addressed forwarding mail and the field value of the source header of the user addressed forwarding mail are given as the same connection address. Therefore, with regard to both the user addressed mail replied to the target addressed forwarding mail and the target addressed mail replied to the user addressed forwarding mail, an electronic mail address thereof to be transmitted is the same connection address.

For this reason, as compared with a case where each of the user addressed mail and the target addressed mail is controlled separately with an electronic mail address to be transmitted, the electronic mail address can be controlled easily. As a result, acceptance or rejection of mail for each target or each purpose can be controlled more easily.

In an electronic mail communication system according to the third embodiment as described in the present disclosure, the mail determination means is further configured to determine whether or not the electronic mail received by the mail receiving means is connection issuance requesting mail, in which a registered user identifies the target actual address to request the mail server device for issuing a connection identification indicator based on header information of the electronic mail. The transfer processing portion is further provided with a connection generation means. When the mail determination means determines that the electronic mail is connection issuance requesting mail, a new connection identification indicator is issued, a target actual address identified by the connection issuance requesting mail and the user actual address identified by the connection issuance requesting mail or data stored in advance in the database are stored in the database in association with the new connection identification indicator, and a template mail is generated which is electronic mail having the written user actual address as a field value of the destination header and a template mail which is provided as the target addressed mail when a text of the template mail is rewritten and replied in the mail transmitting/receiving device which has received the template mail. The mail transmitting means is further configured to transmit the electronic mail generated by the connection generation means via the information communication means according to the header information of the electronic mail.

Therefore, the registered user only transmits the connection issuance requesting mail with the identified target actual address to the mail server device, by which the new connection identification indicator is automatically issued. And, the target actual address and the user actual address are stored in the database in association with the new connection identification indicator.

Further, since the template mail is transmitted from the mail server device to the user actual address, the registered user who has received the template mail only rewrites a text of the template mail into a content which is desired to be transmitted to a target and performs reply operation, thus making it possible to transmit the target addressed mail. For this reason, first target addressed mail to the target can also be transmitted by using a mail transmitting/receiving device with a general mail client program installed.

In an electronic mail communication system according to the fourth embodiment as described in the present disclosure, the mail processing portion of the mail transmitting/receiving device is further provided with connection issuance requesting means, in which upon input of a signal which identifies the target actual address to request issuance of the connection identification indicator, the connection issuance requesting mail is generated and transmitted to the mail server device via the information communication means. Transmitting/receiving device-side connection issuance/target addressed mail generating means is provided which, upon input of a signal which identifies the target actual address and data to-be-transmitted to request issuance of the connection identification indicator and generation of target addressed mail, a signal which identifies the target actual address to request issuance of the connection identification indicator is input into the connection issuance requesting means, there is received the template mail generated and transmitted by the mail server device based on the connection issuance requesting mail generated and transmitted by the connection issuance requesting means, and a text of the thus received template mail is rewritten into the data to-be-transmitted and replied.

Therefore, the registered user only identifies the target actual address and data to-be-transmitted and inputs into the mail transmitting/receiving device a signal which requests issuance of the connection identification indicator and generation of the target addressed mail, by which the new connection identification indicator is automatically issued at the mail server device. And, the target actual address and the user actual address are stored in the database in association with the new connection identification indicator. Further, the target addressed mail in which the data to-be-transmitted is given as a text is automatically generated and transmitted in the mail transmitting/receiving device.

For this reason, even if the mail server device is devoid of dedicated processing functions, the mail transmitting/receiving device is able to perform a series of processing from issuance and registration of the new connection identification indicator to generation and transmission of the target addressed mail by single operation.

In an electronic mail communication system according to the fifth embodiment as described in the present disclosure, the transfer processing portion is further provided with a connection generation/decode means. A connection issuance/target addressed forwarding mail generation requesting signal which identifies the target actual address and data to-be-transmitted is received from the mail transmitting/receiving device of the registered user via the information communication means to issue a new connection identification indicator. The target actual address identified by the requesting signal and the user actual address identified by the requesting signal or data stored in advance in the database are stored in the database in association with the new connection identification indicator. An electronic mail is generated in which a field value of the destination header is given as the target actual address, a field value of the source header is given as a connection address corresponding to the new connection identification indicator and a text is given as the data to-be-transmitted. The mail transmitting means is further configured so that the electronic mail generated by the connection generation/decode means is transmitted via the information communication means according to the header information of the electronic mail.

Therefore, the registered user only transmits the connection issuance/target addressed forwarding mail generation requesting signal which identifies the target actual address and the data to-be-transmitted from the mail transmitting/receiving device to the mail server device, by which the new connection identification indicator is issued automatically in the mail server device. And, the target actual address and the user actual address are stored in the database in association with the new connection identification indicator. Further, electronic mail similar to the target addressed forwarding mail which is generated in the decode means is generated and transmitted to the target actual address.

For this reason, a program which generates and transmits the connection issuance/target addressed forwarding mail generation requesting signal is installed on the mail transmitting/receiving device. The program enables the mail transmitting/receiving device to perform a series of processing from issuance and registration of the new connection identification indicator to generation and transmission of the electronic mail similar to the target addressed forwarding mail by single operation in the mail transmitting/receiving device.

In an electronic mail communication system according to the sixth embodiment as described in the present disclosure, the database further stores an expiration date of the connection identification indicator set for each connection identification indicator. The transfer processing portion is further provided with validity determination means. When the mail determination means determines that the electronic mail is the user addressed mail, determination is made as to whether or not an expiration date of the connection identification indicator corresponding to the user addressed mail has expired, based on data stored in the database. When the expiration date is determined not to have expired, control of the user addressed mail is shifted to the encode means. The transfer processing portion is also provided with an error mail transmitting means. When the validity determination means determines that the expiration date has expired, the error mail transmitting means transmits an electronic mail, which communicates that the user addressed mail has been erroneously transmitted, to a source of the user addressed mail.

Therefore, the expiration date is set for the connection identification indicator, by which after elapse of the expiration date, unwanted electronic mail from a target can be automatically blocked.

Further, any given expiration date is set for each connection identification indicator, thus making it possible to make the expiration date different depending on a relationship with a target and a purpose. For this reason, it is possible to control the acceptance or rejection of electronic mail by simple operation in a more thoughtful manner.

In an electronic mail communication system according to the seventh embodiment as described in the present disclosure, the database further stores information on whether or not the expiration date of the connection identification indicator set for each connection identification indicator is automatically updated. The transfer processing portion is further provided with expiration date update means. When the mail determination means determines that the electronic mail is target addressed mail, determination is made as to whether or not the expiration date of the connection identification indicator corresponding to the target addressed mail is automatically updated, based on data stored in the database. When the expiration date is determined to be updated, the expiration date of the connection identification indicator stored in the database is updated. When the expiration date is determined not to be updated, the expiration date of the connection identification indicator stored in the database is not updated.

Therefore, the expiration date of the connection identification indicator is set so as to be automatically updated. It is, thereby, possible to automatically extend the expiration date of the connection identification indicator only where electronic mail is transmitted from a registered user to a target.

For this reason, where electronic mail is transmitted from a target one-sidedly, the expiration date is not extended. After the expiration date lapses, unwanted electronic mail from the target is automatically blocked. Meanwhile, for example, where it is necessary to transmit electronic mail from a registered user to a target and wait for the reply, the expiration date is automatically extended, thus making it possible to prevent inadvertent blockage of electronic mail from a target.

Further, whether or not the expiration date is automatically updated can be set for each connection identification indicator. Therefore, a necessity for automatic update of the expiration date can be decided depending on a relationship with a target or a purpose. For this reason, it is also possible to control the acceptance or rejection of electronic mail by simple operation in a more thoughtful manner.

A mail server device according to the eighth embodiment as described in the present disclosure, is used in the electronic mail communication system according to any one of the first to the third or the fifth to the seventh embodiment as described above.

Therefore, use of the mail server device in the electronic mail communication system makes it possible to provide effects similar to those obtained in the first to the third or the fifth to the seventh embodiment.

A mail transmitting/receiving device according to the ninth embodiment as described in the present disclosure is used in the electronic mail communication system according to the fourth embodiment as described above.

Therefore, use of the mail transmitting/receiving device in the electronic mail communication system makes it possible to provide effects similar to those obtained in the fourth embodiment described above.

The program according to the tenth embodiment as described in the present disclosure allows a computer to function as the transfer processing portion of the mail server device according to the eighth embodiment as described above or as the mail processing portion of the mail transmitting/receiving device according to the ninth embodiment described above.

Therefore, the program is executed by the computer, thereby providing the effects similar to those obtained in the eighth or the ninth embodiment described above.

The record medium according to the eleventh embodiment as described in the present disclosure stores a program according to the tenth embodiment as described in the present application.

Therefore, the program stored in the record medium is executed by the computer, thereby providing effects similar to those obtained in the tenth embodiment.

Further, the method for electronic mail communication according to the twelfth embodiment as described in the present disclosure is a method for electronic mail communication. An electronic mail communication system is provided with a plurality of mail transmitting/receiving devices, each of which is provided with a mail processing portion configured to transmit and receive electronic mail, and a computer configured to communicate with the mail transmitting/receiving device via information communication means. That is, the computer includes a database which stores a target actual address which is an electronic mail address of a target for transmitting electronic mail, and a user actual address which is an electronic mail address of a registered user for receiving electronic mail replied from the target in association with a connection identification indicator corresponding to a connection address, which is a temporary electronic mail address of the registered user and an electronic mail address under control of the computer. The electronic mail communication system is used to execute transfer processing of electronic mail based on data stored in the database. The method for electronic mail communication which includes a mail receiving step, in which the computer receives electronic mail from the mail transmitting/receiving device via the information communication means; a mail determination step, in which the computer determines whether the electronic mail received in the mail receiving step is target addressed mail which is to be transmitted to a target from a registered user or user addressed mail which is to be transmitted from the target to the registered user based on header information of the electronic mail; a decode step in which when the electronic mail is determined to be the target addressed mail in the mail determination step, the computer generates target addressed forwarding mail which is electronic mail in which a field value of the destination header which indicates a destination of the target addressed mail is given as a target actual address and a field value of the source header indicating a source is given as a connection address corresponding to the connection identification indicator; an encode step in which when the electronic mail is determined to be user addressed mail in the mail determination step, the computer generates user addressed forwarding mail which is electronic mail in which a field value of the destination header of the user addressed mail is given as a user actual address, that is, user addressed forwarding mail which is given as the target addressed mail when a text of the user addressed forwarding mail is rewritten and replied in the mail transmitting/receiving device which has received the user addressed forwarding mail; and a mail transmission step in which the computer transmits the electronic mail generated in the decode step or in the encode step via the information communication means according to the header information of the electronic mail.

Therefore, the method is used by the computer and the mail transmitting/receiving device, thereby providing effects similar to those acquired in the first embodiment.

Description has been made of the preferred embodiments of the present disclosure. The terminology employed herein is for the purpose of illustration but not of limitation. It should be understood that many changes and modification can be made within the scope of the appended claims without departing from the scope and spirit of the present disclosure. Also, while only typical embodiments have been described in detail, it will be understood by those skilled in the art that various modifications may be made therein without departing from the novel teaching and advantages of the present disclosure. Thus, such modifications are all included in the scope of the present disclosure.

What is claimed is:

1. An electronic mail communication system, comprising: a user electronic mail transmitting/receiving device, and the user electronic mail transmitting/receiving device comprising a display;

at least one target electronic mail transmitting/receiving device; and a central electronic mail server device coupled, via an information communication means, to the at least one target electronic mail transmitting/receiving device and the user electronic mail transmitting/receiving device, wherein the user electronic mail transmitting/receiving device is configured to present, in a user interface of the display, at least a first user-selectable item for allowing a user to transmit a connection issuance request for requesting that an electronic mail connection be established between the user electronic mail transmitting/receiving device and the at least one target electronic mail transmitting/receiving device, wherein the central electronic mail server device is configured to:

receive a first connection issuance request from the user for requesting that a first electronic mail connection be established between the user electronic mail transmitting/receiving device and a first target electronic mail transmitting/receiving device;

establish the first electronic mail connection between the user electronic mail transmitting/receiving device and the first target electronic mail transmitting/receiving device by assigning a first temporary connection address to the user electronic mail transmitting/receiving device from which the user electronic mail transmitting/receiving device transmits electronic mails to or receives electronic mails from the first target electronic mail transmitting/receiving device;

receive a first electronic mail from the user electronic mail transmitting/receiving device or the first target electronic mail transmitting/receiving device;

determine whether the first electronic mail is (i) a target addressed electronic mail to be transmitted from the user electronic mail transmitting/receiving device to the first target electronic mail transmitting/receiving device, (ii) a user addressed electronic mail to be transmitted from the first target electronic mail transmitting/receiving device to the user electronic mail transmitting/receiving device, or (iii) a second connection issuance request for requesting that a second electronic mail connection be established between the user electronic mail transmitting/receiving device and a second target electronic mail transmitting/receiving device;

when the first electronic mail is the target addressed electronic mail, generate a target addressed forwarding electronic mail comprising a source header that identifies the first temporary connection address;

when the first electronic mail is the user addressed electronic mail, generate a user addressed forwarding electronic mail comprising a source header that identifies the first temporary connection address; and when the first electronic mail is the second connection issuance request, establish the second electronic mail connection between the user electronic mail transmitting/receiving device and the second target electronic mail transmitting/receiving device by assigning a second temporary connection address to the user electronic mail transmitting/receiving device from which the user electronic mail transmitting/receiving device transmits electronic mails to or receives electronic mails from the second target electronic mail transmitting/receiving device, and wherein the generating of the user addressed forwarding electronic mail comprises adding mark data to a field value of a message-ID header of the user addressed electronic mail, and the generating of the target addressed forwarding electronic mail comprises deleting the mark data from a field value of an In-Reply-To header of the target addressed electronic mail.

2. The electronic mail communication system according to claim 1, wherein the central electronic mail server device is configured to determine whether the first electronic mail is the second connection issuance request based on header information of the first electronic mail, and when the first electronic mail is the second connection issuance request, the central electronic mail server device is configured to:

assign a connection identification indicator corresponding to the second electronic mail connection, store information relating to an address of the second target electronic mail transmitting/receiving device and an address of the user electronic mail transmitting/receiving device in a database in association with the connection identification indicator, generate a template electronic mail comprising a destination header that identifies the address of the user electronic mail transmitting/receiving device, generate a second target addressed electronic mail when a text of the template electronic mail is rewritten and replied in the user electronic mail transmitting/receiving device which has received the template electronic mail, and transmit the template electronic mail via the information communication means according to header information of the template electronic mail.

3. The electronic mail communication system according to claim 2, wherein the user electronic mail transmitting/receiving device is configured to:

detect a signal which identifies the address of the second target electronic mail transmitting/receiving device and data-to-be transmitted to request issuance of the connection identification indicator, and generate and transmit the second connection issuance request via the information communication means, and upon the detection of the signal, transmit to the central electronic mail server a signal which identifies the address of the second target electronic mail transmitting/receiving device to request issuance of the connection identification indicator, and receive the template electronic mail generated and transmitted by the central electronic mail server device, so that the text of the template electronic mail can be rewritten and replied.

4. The electronic mail communication system according to claim 2, wherein the central electronic mail server device is further configured to:

receive a signal which identifies an address of the first target electronic mail transmitting/receiving device and data to-be-transmitted from the user electronic mail transmitting/receiving device via the information communication means to issue a connection identification indicator corresponding to the first electronic mail connection, store the address of the first target electronic mail transmitting/receiving device identified by the signal and the address of the user electronic mail transmitting/receiving device identified by the signal in a database are stored in the database in association with the connection identification indicator, and generate the first electronic mail comprising a destination header that identifies the address of the first target electronic mail transmitting/receiving device, a source header that identifies the first temporary connection address corresponding to the connection identification indicator, and data to-be-transmitted comprising a text, and transmit via the information communication means according to header information of the first electronic mail.

5. The electronic mail communication system according to claim 1, wherein the central electronic mail server device is further configured to:

receive a signal which identifies an address of the first target electronic mail transmitting/receiving device and data to-be-transmitted from the user electronic mail transmitting/receiving device via the information communication means to issue a connection identification indicator corresponding to the first electronic mail connection, store the address of the first target electronic mail transmitting/receiving device identified by the signal and an address of the user electronic mail transmitting/receiving device identified by the signal in a database in association with the connection identification indicator, and generate the first electronic mail comprising a destination header that identifies the address of the first target electronic mail transmitting/receiving device, a source header that identifies the first temporary connection address corresponding to the connection identification indicator, and data to-be-transmitted comprising a text, and transmit the first electronic mail via the information communication means according to header information of the first electronic mail.

6. The electronic mail communication system according to claim 1, further comprising a database, wherein the database is configured to store an expiration date of a connection identification indicator set for at least one connection identification indicator, the at least one connection identification indicator corresponding to an electronic mail connection, and wherein the central electronic mail server device is configured so that when the first electronic mail is determined to be the user addressed electronic mail, the central electronic mail server determines whether or not an expiration date of a connection identification indicator corresponding to the user addressed electronic mail has expired based on data stored in the database, when the expiration date is determined not to have expired, proceed to generate the user addressed forwarding electronic mail, and when the expiration date is determined to have expired, transmit to a source of the user addressed electronic mail an electronic mail indicating that the user addressed electronic mail has been erroneously transmitted.

7. The electronic mail communication system according to claim 6, wherein the database is further configured to store information on whether or not the expiration date of the connection identification indicator set for the connection identification indicator is automatically updated, and the central electronic mail server device is configured so that when the first electronic mail is determined to be the target addressed electronic mail, the central electronic mail server device determines whether or not an expiration date of a connection identification indicator corresponding to the target addressed electronic mail is automatically updated based on data stored in the database, when the expiration date is determined to be automatically updated, the expiration date of the connection identification indicator stored in the database is updated, and when the expiration date is determined not to be automatically updated, the expiration date of the connection identification indicator stored in the database is not updated.

8. The electronic mail communication system according to claim 1, wherein:

the central electronic mail server device is configured to determine whether the first electronic mail is the target addressed electronic mail or the user addressed electronic mail based on mark data in a field value in an In-Reply-To header of the first electronic mail, when the In-Reply-To header includes the mark data, the first electronic mail is determined to be the target addressed electronic mail, and when the In-Reply-To header does not include the mark data, the first electronic mail is determined to be the user addressed electronic mail.

9. An electronic mail server device for an electronic mail communication system, the electronic mail server device being configured to be coupled to a user electronic mail transmitting/receiving device, and at least one target electronic mail transmitting/receiving device, the electronic mail server device comprising a memory and a processor coupled to the memory, the processor being configured to:

receive a first connection issuance request from a user for requesting that a first electronic mail connection be established between the user electronic mail transmitting/receiving device and a first target electronic mail transmitting/receiving device;

establish the first electronic mail connection between the user electronic mail transmitting/receiving device and the first target electronic mail transmitting/receiving device by assigning a first temporary connection address to the user electronic mail transmitting/receiving device from which the user electronic mail transmitting/receiving device transmits electronic mails to or receives electronic mails from the first target electronic mail transmitting/receiving device;

receive a first electronic mail from the user electronic mail transmitting/receiving device or the first target electronic mail transmitting/receiving device;

determine whether the first electronic mail is (i) a target addressed electronic mail to be transmitted from the user electronic mail transmitting/receiving device to the first target electronic mail transmitting/receiving device, (ii) a user addressed electronic mail to be transmitted from the first target electronic mail transmitting/receiving device to the user electronic mail transmitting/receiving device, or (iii) a second connection issuance request for requesting that a second electronic mail connection be established between the user electronic mail transmitting/receiving device and a second target electronic mail transmitting/receiving device;

when the first electronic mail is the target addressed electronic mail, generate a target addressed forwarding electronic mail comprising a source header that identifies the first temporary connection address;

when the first electronic mail is the user addressed electronic mail, generate a user addressed forwarding electronic mail comprising a source header that identifies the first temporary connection address; and when the first electronic mail is the second connection issuance request, establish the second electronic mail connection between the user electronic mail transmitting/receiving device and the second target electronic mail transmitting/receiving device by assigning a second temporary connection address to the user electronic mail transmitting/receiving device from which the user electronic mail transmitting/receiving device transmits or receives electronic mails from the second target electronic mail transmitting/receiving device, wherein the generating of the user addressed forwarding electronic mail comprises adding mark data to a field value of a message-ID header of the user addressed electronic mail, and the generating of the target addressed forwarding electronic mail comprises deleting the mark data from a field value of an In-Reply-To header of the target addressed electronic mail.

10. An electronic mail transmitting/receiving device that is configured to couple to the electronic mail server device according to claim 9, the electronic mail transmitting/receiving device comprising a memory and a processor coupled to the memory, the processor being configured so that the electronic mail transmitting/receiving device can request that an electronic mail connection be established between the electronic mail transmitting/receiving device and another electronic mail transmitting/receiving device.

11. A method for electronic mail communication, comprising;

receive a first connection issuance request from a user requesting that a first electronic mail connection be established between a user electronic mail transmitting/receiving device and a first target electronic mail transmitting/receiving device;

establish the first electronic mail connection between the user electronic mail transmitting/receiving device and the first target electronic mail transmitting/receiving device by assigning a first temporary connection address to the user electronic mail transmitting/receiving device from which the user electronic mail transmitting/receiving device transmits or receives electronic mails from the first target electronic mail transmitting/receiving device;

receive a first electronic mail from the user electronic mail transmitting/receiving device or the first target electronic mail transmitting/receiving device;

determine whether the first electronic mail is (i) a target addressed electronic mail to be transmitted from the user electronic mail transmitting/receiving device to the first target electronic mail transmitting/receiving device, (ii) a user addressed electronic mail to be transmitted from the first target electronic mail transmitting/receiving device to the user electronic mail transmitting/receiving device, or (iii) a second connection issuance request for requesting that a second electronic mail connection be established between the user electronic mail transmitting/receiving device and a second target electronic mail transmitting/receiving device;

when the first electronic mail is the target addressed electronic mail, generate a target addressed forwarding electronic mail comprising a source header that identifies the first temporary connection address;

when the first electronic mail is the user addressed electronic mail, generate a user addressed forwarding electronic mail comprising a source header that identifies the first temporary connection address;

when the first electronic mail is the second connection issuance request, establish the second electronic mail connection between the user electronic mail transmitting/receiving device and the second target electronic mail transmitting/receiving device by assigning a second temporary connection address to the user electronic mail transmitting/receiving device from which the user electronic mail transmitting/receiving device transmits or receives electronic mails from the second target electronic mail transmitting/receiving device; and transmit the user addressed forwarding electronic mail or the target addressing forwarding electronic mail via the information communication means according to header information of the user addressed forwarding electronic mail or the target addressing forwarding electronic mail, wherein the generating of the user addressed forwarding electronic mail comprises adding mark data to a field value of a message-ID header of the user addressed electronic mail, and the generating of the target addressed forwarding electronic snail comprises deleting the mark data from a field value of an In-Reply-To header of the target addressed electronic mail.

12. A non-transient computer readable storage medium containing an executable program configured to cause a processor to perform the method according to claim 11.

* * * * *